(12) United States Patent
Karalis et al.

(10) Patent No.: US 8,076,801 B2
(45) Date of Patent: *Dec. 13, 2011

(54) WIRELESS ENERGY TRANSFER, INCLUDING INTERFERENCE ENHANCEMENT

(75) Inventors: Aristeidis Karalis, Boston, MA (US); Rafif E. Hamam, Cambridge, MA (US); John D. Joannopoulos, Belmont, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 254 days.

This patent is subject to a terminal disclaimer.

(21) Appl. No.: 12/466,065

(22) Filed: May 14, 2009

(65) Prior Publication Data

US 2009/0284083 A1 Nov. 19, 2009

Related U.S. Application Data

(60) Provisional application No. 61/127,661, filed on May 14, 2008.

(51) Int. Cl.
*H03H 9/00* (2006.01)
(52) U.S. Cl. ...................................................... 307/104
(58) Field of Classification Search .................. 307/104; 333/195, 219, 219.2
See application file for complete search history.

(56) References Cited

U.S. PATENT DOCUMENTS

| | | | |
|---|---|---|---|
| 645,576 A | 3/1900 | Tesla | |
| 649,621 A | 5/1900 | Tesla | |
| 787,412 A | 4/1905 | Tesla | |
| 1,119,732 A | 12/1914 | Tesla | |
| 2,133,494 A | 10/1938 | Waters | |
| 3,517,350 A | 6/1970 | Beaver | |
| 3,535,543 A | 10/1970 | Dailey | |
| 4,088,999 A | 5/1978 | Fletcher et al. | |
| 5,027,709 A | 7/1991 | Slagle | |
| 5,070,293 A | 12/1991 | Ishii et al. | |
| 5,118,997 A | 6/1992 | El-Hamamsy | |
| 5,216,402 A | 6/1993 | Carosa | |
| 5,341,083 A | 8/1994 | Klontz et al. | |
| 5,367,242 A | 11/1994 | Hulman | |
| 5,437,057 A | 7/1995 | Richley et al. | |
| 5,493,691 A | 2/1996 | Barrett | |
| 5,528,113 A | 6/1996 | Boys et al. | |
| 5,550,452 A | 8/1996 | Shirai et al. | |

(Continued)

FOREIGN PATENT DOCUMENTS

CA 142352 8/1912

(Continued)

OTHER PUBLICATIONS

PCT International Search Report and Written Opinion for PCT/US09/59244, Dec. 7, 2009, 12 pages.

(Continued)

*Primary Examiner* — Albert W Paladini
(74) *Attorney, Agent, or Firm* — Fish & Richardson P.C.

(57) ABSTRACT

Disclosed is an apparatus for use in wireless energy transfer, which includes a first resonator structure configured for energy transfer with a second resonator structure over a distance D larger than characteristic sizes, $L_1$ and $L_2$, of the first and second resonator structures. A power generator is coupled to the first structure and configured to drive the first resonator structure or the second resonator structure at an angular frequency away from the resonance angular frequencies and shifted towards a frequency corresponding to an odd normal mode for the resonator structures to reduce radiation from the resonator structures by destructive far-field interference.

67 Claims, 32 Drawing Sheets

U.S. PATENT DOCUMENTS

| | | | |
|---|---|---|---|
| 5,898,579 A | 4/1999 | Boys et al. | |
| 5,986,895 A | 11/1999 | Stewart et al. | |
| 5,999,308 A | 12/1999 | Nelson et al. | |
| 6,184,651 B1 | 2/2001 | Fernandez et al. | |
| 6,436,299 B1 | 8/2002 | Baarman et al. | |
| 6,450,946 B1 | 9/2002 | Forsell | |
| 6,452,465 B1 | 9/2002 | Brown et al. | |
| 6,515,878 B1 | 2/2003 | Meins et al. | |
| 6,597,076 B2 | 7/2003 | Scheible et al. | |
| 6,664,770 B1 | 12/2003 | Bartels | |
| 6,673,250 B2 | 1/2004 | Kuennen et al. | |
| 6,731,071 B2 | 5/2004 | Baarman | |
| 6,749,119 B2 | 6/2004 | Scheible et al. | |
| 6,798,716 B1 | 9/2004 | Charych | |
| 6,806,649 B2 | 10/2004 | Mollema et al. | |
| 6,812,645 B2 | 11/2004 | Baarman | |
| 6,825,620 B2 | 11/2004 | Kuennen et al. | |
| 6,831,417 B2 | 12/2004 | Baarman | |
| 6,844,702 B2 | 1/2005 | Giannopoulos et al. | |
| 6,856,291 B2 | 2/2005 | Mickle | |
| 6,906,495 B2 | 6/2005 | Cheng et al. | |
| 6,917,163 B2 | 7/2005 | Baarman | |
| 6,917,431 B2 | 7/2005 | Soljacic et al. | |
| 6,937,130 B2 | 8/2005 | Scheible et al. | |
| 6,960,968 B2 | 11/2005 | Odendaal et al. | |
| 6,975,198 B2 | 12/2005 | Baarman | |
| 7,042,196 B2 | 5/2006 | Ka-Lai et al. | |
| 7,069,064 B2 | 6/2006 | Gevorgian et al. | |
| 7,116,200 B2 | 10/2006 | Baarman et al. | |
| 7,118,240 B2 | 10/2006 | Baarman et al. | |
| 7,126,450 B2 | 10/2006 | Baarman et al. | |
| 7,132,918 B2 | 11/2006 | Baarman et al. | |
| 7,147,604 B1 | 12/2006 | Allen et al. | |
| 7,180,248 B2 | 2/2007 | Kuennen et al. | |
| 7,191,007 B2 | 3/2007 | Desai et al. | |
| 7,212,414 B2 | 5/2007 | Baarman | |
| 7,239,110 B2 | 7/2007 | Cheng et al. | |
| 7,248,017 B2 | 7/2007 | Cheng et al. | |
| 7,375,492 B2 | 5/2008 | Calhoon et al. | |
| 7,375,493 B2 | 5/2008 | Calhoon et al. | |
| 7,378,817 B2 | 5/2008 | Calhoon et al. | |
| 7,382,636 B2 | 6/2008 | Baarman et al. | |
| 7,385,357 B2 | 6/2008 | Kuennen et al. | |
| 7,462,951 B1 | 12/2008 | Baarman | |
| 7,466,213 B2 | 12/2008 | Lobl et al. | |
| 7,474,058 B2 | 1/2009 | Baarman | |
| 7,492,247 B2 | 2/2009 | Schmidt et al. | |
| 7,514,818 B2 | 4/2009 | Abe et al. | |
| 7,518,267 B2 | 4/2009 | Baarman | |
| 7,525,283 B2 | 4/2009 | Cheng et al. | |
| 7,599,743 B2 | 10/2009 | Hassler, Jr. et al. | |
| 7,615,936 B2 | 11/2009 | Baarman et al. | |
| 7,639,514 B2 | 12/2009 | Baarman | |
| 7,795,708 B2 | 9/2010 | Katti | |
| 7,825,543 B2 | 11/2010 | Karalis et al. | |
| 7,843,288 B2 | 11/2010 | Lee et al. | |
| 2002/0032471 A1 | 3/2002 | Loftin et al. | |
| 2002/0105343 A1 | 8/2002 | Scheible et al. | |
| 2002/0118004 A1 | 8/2002 | Scheible et al. | |
| 2003/0038641 A1 | 2/2003 | Scheible | |
| 2003/0062794 A1 | 4/2003 | Scheible et al. | |
| 2003/0062980 A1 | 4/2003 | Scheible et al. | |
| 2003/0199778 A1 | 10/2003 | Mickle et al. | |
| 2003/0214255 A1 | 11/2003 | Baarman et al. | |
| 2004/0000974 A1 | 1/2004 | Odenaal et al. | |
| 2004/0113847 A1 | 6/2004 | Qi et al. | |
| 2004/0130915 A1 | 7/2004 | Baarman | |
| 2004/0130916 A1 | 7/2004 | Baarman | |
| 2004/0150934 A1 | 8/2004 | Baarman | |
| 2004/0201361 A1 | 10/2004 | Koh et al. | |
| 2004/0222751 A1 | 11/2004 | Mollema et al. | |
| 2004/0232845 A1 | 11/2004 | Baarman | |
| 2004/0267501 A1 | 12/2004 | Freed et al. | |
| 2005/0007067 A1 | 1/2005 | Baarman et al. | |
| 2005/0085873 A1 | 4/2005 | Gord et al. | |
| 2005/0093475 A1 | 5/2005 | Kuennen et al. | |
| 2005/0104064 A1 | 5/2005 | Hegarty et al. | |
| 2005/0116650 A1 | 6/2005 | Baarman | |
| 2005/0122058 A1 | 6/2005 | Baarman et al. | |
| 2005/0122059 A1 | 6/2005 | Baarman et al. | |
| 2005/0127849 A1 | 6/2005 | Baarman et al. | |
| 2005/0127850 A1 | 6/2005 | Baarman et al. | |
| 2005/0127866 A1 | 6/2005 | Hamilton et al. | |
| 2005/0156560 A1 | 7/2005 | Shimaoka et al. | |
| 2005/0288739 A1 | 12/2005 | Hassler, Jr. et al. | |
| 2005/0288740 A1 | 12/2005 | Hassler, Jr. et al. | |
| 2006/0022636 A1 | 2/2006 | Xian et al. | |
| 2006/0061323 A1 | 3/2006 | Cheng et al. | |
| 2006/0132045 A1 | 6/2006 | Baarman | |
| 2006/0181242 A1 | 8/2006 | Freed et al. | |
| 2006/0185809 A1 | 8/2006 | Elfrink et al. | |
| 2006/0205381 A1 | 9/2006 | Beart et al. | |
| 2006/0270440 A1 | 11/2006 | Shearer et al. | |
| 2007/0021140 A1 | 1/2007 | Keyes, IV et al. | |
| 2007/0064406 A1 | 3/2007 | Beart | |
| 2007/0145830 A1 | 6/2007 | Lee et al. | |
| 2007/0171681 A1 | 7/2007 | Baarman | |
| 2007/0178945 A1 | 8/2007 | Cook et al. | |
| 2007/0182367 A1 | 8/2007 | Partovi | |
| 2007/0222542 A1 | 9/2007 | Joannopoulos et al. | |
| 2007/0267918 A1 | 11/2007 | Gyland | |
| 2007/0276538 A1 | 11/2007 | Kjellsson et al. | |
| 2008/0012569 A1 | 1/2008 | Hall et al. | |
| 2008/0014897 A1 | 1/2008 | Cook et al. | |
| 2008/0030415 A1 | 2/2008 | Homan et al. | |
| 2008/0067874 A1 | 3/2008 | Tseng | |
| 2008/0191638 A1 | 8/2008 | Kuennen et al. | |
| 2008/0197710 A1 | 8/2008 | Kreitz et al. | |
| 2008/0211320 A1 | 9/2008 | Cook et al. | |
| 2008/0265684 A1 | 10/2008 | Farkas | |
| 2008/0266748 A1 | 10/2008 | Lee | |
| 2008/0278264 A1 | 11/2008 | Karalis et al. | |
| 2009/0010028 A1 | 1/2009 | Baarman et al. | |
| 2009/0015075 A1 | 1/2009 | Cook et al. | |
| 2009/0033564 A1 | 2/2009 | Cook et al. | |
| 2009/0045772 A1 | 2/2009 | Cook et al. | |
| 2009/0051224 A1 | 2/2009 | Cook et al. | |
| 2009/0058189 A1 | 3/2009 | Cook et al. | |
| 2009/0067198 A1 | 3/2009 | Graham et al. | |
| 2009/0072627 A1 | 3/2009 | Cook et al. | |
| 2009/0072628 A1 | 3/2009 | Cook et al. | |
| 2009/0072629 A1 | 3/2009 | Cook et al. | |
| 2009/0079268 A1 | 3/2009 | Cook et al. | |
| 2009/0085408 A1 | 4/2009 | Bruhn | |
| 2009/0085706 A1 | 4/2009 | Baarman et al. | |
| 2009/0096413 A1 | 4/2009 | Patovi et al. | |
| 2009/0102292 A1 | 4/2009 | Cook et al. | |
| 2009/0108679 A1 | 4/2009 | Porwal | |
| 2009/0108997 A1 | 4/2009 | Petterson et al. | |
| 2009/0127937 A1 | 5/2009 | Widmer et al. | |
| 2009/0134712 A1 | 5/2009 | Cook et al. | |
| 2009/0146892 A1 | 6/2009 | Shimizu et al. | |
| 2009/0153273 A1 | 6/2009 | Chen | |
| 2009/0160261 A1 | 6/2009 | Elo | |
| 2009/0167449 A1 | 7/2009 | Cook et al. | |
| 2009/0174263 A1 | 7/2009 | Baarman et al. | |
| 2009/0179502 A1 | 7/2009 | Cook et al. | |
| 2009/0189458 A1 | 7/2009 | Kawasaki | |
| 2009/0195332 A1 | 8/2009 | Joannopoulos et al. | |
| 2009/0195333 A1 | 8/2009 | Joannopoulos et al. | |
| 2009/0212636 A1 | 8/2009 | Cook et al. | |
| 2009/0213028 A1 | 8/2009 | Cook et al. | |
| 2009/0224608 A1 | 9/2009 | Cook et al. | |
| 2009/0224609 A1 | 9/2009 | Cook et al. | |
| 2009/0224856 A1 | 9/2009 | Karalis et al. | |
| 2009/0230777 A1 | 9/2009 | Baarman et al. | |
| 2009/0237194 A1 | 9/2009 | Waffenschmidt et al. | |
| 2009/0243394 A1 | 10/2009 | Levine | |
| 2009/0243397 A1 | 10/2009 | Cook et al. | |
| 2009/0251008 A1 | 10/2009 | Sugaya | |
| 2009/0267558 A1 | 10/2009 | Jung | |
| 2009/0271047 A1 | 10/2009 | Wakamatsu | |
| 2009/0271048 A1 | 10/2009 | Wakamatsu | |
| 2009/0273242 A1 | 11/2009 | Cook | |
| 2009/0281678 A1 | 11/2009 | Wakamatsu | |
| 2009/0284082 A1 | 11/2009 | Mohammadian | |
| 2009/0284218 A1 | 11/2009 | Mohammadian et al. | |

| | | | | | | |
|---|---|---|---|---|---|---|
| 2009/0284220 A1 | 11/2009 | Toncich et al. | | 2010/0277120 A1 | 11/2010 | Cook et al. |
| 2009/0284227 A1 | 11/2009 | Mohammadian et al. | | 2010/0289341 A1 | 11/2010 | Ozaki et al. |
| 2009/0284245 A1 | 11/2009 | Kirby et al. | | 2010/0289449 A1 | 11/2010 | Elo |
| 2009/0284369 A1 | 11/2009 | Toncich et al. | | 2010/0295505 A1 | 11/2010 | Jung et al. |
| 2009/0286470 A1 | 11/2009 | Mohammadian et al. | | 2010/0295506 A1 | 11/2010 | Ichikawa |
| 2009/0286475 A1 | 11/2009 | Toncich et al. | | | | |
| 2009/0286476 A1 | 11/2009 | Toncich et al. | | FOREIGN PATENT DOCUMENTS | | |
| 2009/0289595 A1 | 11/2009 | Chen et al. | | DE | 38 24 972 | 1/1989 |
| 2009/0299918 A1 | 12/2009 | Cook et al. | | DE | 100 29147 | 12/2001 |
| 2010/0017249 A1 | 1/2010 | Fincham et al. | | DE | 103 04584 | 8/2004 |
| 2010/0033021 A1 | 2/2010 | Bennett | | DE | 10 2005 036290 | 2/2007 |
| 2010/0034238 A1 | 2/2010 | Bennett | | DE | 102006044057 | 4/2008 |
| 2010/0036773 A1 | 2/2010 | Bennett | | EP | 1335477 | 8/2003 |
| 2010/0038970 A1 | 2/2010 | Cook et al. | | WO | WO 92/17929 | 10/1992 |
| 2010/0045114 A1 | 2/2010 | Sample et al. | | WO | WO 93/23908 | 11/1993 |
| 2010/0052431 A1 | 3/2010 | Mita | | WO | WO 94/28560 | 12/1994 |
| 2010/0052811 A1 | 3/2010 | Smith et al. | | WO | WO 96/02970 | 2/1996 |
| 2010/0065352 A1 | 3/2010 | Ichikawa | | WO | WO 98/50993 | 11/1998 |
| 2010/0066349 A1 | 3/2010 | Lin et al. | | WO | WO 00/77910 | 12/2000 |
| 2010/0081379 A1 | 4/2010 | Cooper et al. | | WO | WO 00/79910 | 12/2000 |
| 2010/0094381 A1 | 4/2010 | Kim et al. | | WO | WO 03/092329 | 11/2003 |
| 2010/0109443 A1 | 5/2010 | Cook et al. | | WO | WO 03/096361 | 11/2003 |
| 2010/0109604 A1 | 5/2010 | Boys et al. | | WO | WO 03/096512 | 11/2003 |
| 2010/0115474 A1 | 5/2010 | Takada et al. | | WO | WO 2004/038888 | 5/2004 |
| 2010/0117454 A1 | 5/2010 | Cook et al. | | WO | WO 2004/055654 | 7/2004 |
| 2010/0117596 A1 | 5/2010 | Cook et al. | | WO | WO 2004/073150 | 8/2004 |
| 2010/0123452 A1 | 5/2010 | Amano et al. | | WO | WO 2004/073166 | 8/2004 |
| 2010/0123530 A1 | 5/2010 | Park et al. | | WO | WO 2004/073176 | 8/2004 |
| 2010/0127660 A1 | 5/2010 | Cook et al. | | WO | WO 2004/073177 | 8/2004 |
| 2010/0148723 A1 | 6/2010 | Cook et al. | | WO | WO 2004/112216 | 12/2004 |
| 2010/0151808 A1 | 6/2010 | Toncich et al. | | WO | WO 2005/024865 | 3/2005 |
| 2010/0156346 A1 | 6/2010 | Takada et al. | | WO | WO 2005/060068 | 6/2005 |
| 2010/0156570 A1 | 6/2010 | Hong et al. | | WO | WO 2005/109597 | 11/2005 |
| 2010/0164295 A1 | 7/2010 | Ichikawa et al. | | WO | WO 2005/109598 | 11/2005 |
| 2010/0181961 A1 | 7/2010 | Novak et al. | | WO | WO 2007/008646 | 1/2007 |
| 2010/0184371 A1 | 7/2010 | Cook et al. | | WO | WO 2007/020583 | 2/2007 |
| 2010/0187913 A1 | 7/2010 | Smith et al. | | WO | WO 2007/042952 | 4/2007 |
| 2010/0190435 A1 | 7/2010 | Cook et al. | | WO | WO 2007/084716 | 7/2007 |
| 2010/0190436 A1 | 7/2010 | Cook et al. | | WO | WO 2007/084717 | 7/2007 |
| 2010/0194206 A1 | 8/2010 | Burdo et al. | | WO | WO 2008/109489 | 9/2008 |
| 2010/0194207 A1 | 8/2010 | Graham | | WO | WO 2008/118178 | 10/2008 |
| 2010/0194334 A1 | 8/2010 | Kirby et al. | | WO | WO 2009/009559 | 1/2009 |
| 2010/0194335 A1 | 8/2010 | Kirby et al. | | WO | WO 2009/018568 | 2/2009 |
| 2010/0201189 A1 | 8/2010 | Kirby et al. | | WO | WO 2009/023155 | 2/2009 |
| 2010/0201201 A1 | 8/2010 | Mobarhan et al. | | WO | WO 2009/023646 | 2/2009 |
| 2010/0201202 A1 | 8/2010 | Kirby et al. | | WO | WO 2009/033043 | 3/2009 |
| 2010/0201204 A1 | 8/2010 | Sakoda et al. | | WO | WO 2009/070730 | 6/2009 |
| 2010/0201310 A1 | 8/2010 | Vorenkamp et al. | | WO | WO 2009/126963 | 10/2009 |
| 2010/0201313 A1 | 8/2010 | Vorenkamp et al. | | WO | WO 2009/149464 | 12/2009 |
| 2010/0201316 A1 | 8/2010 | Takada et al. | | WO | WO 2009/155000 | 12/2009 |
| 2010/0201513 A1 | 8/2010 | Vorenkamp et al. | | WO | WO 2010/030977 | 3/2010 |
| 2010/0210233 A1 | 8/2010 | Cook et al. | | WO | WO 2010/090538 | 8/2010 |
| 2010/0213770 A1 | 8/2010 | Kikuchi | | WO | WO 2010/090539 | 9/2010 |
| 2010/0213895 A1 | 8/2010 | Keating et al. | | WO | 2011/062827 | 5/2011 |
| 2010/0217553 A1 | 8/2010 | Von Novak et al. | | | | |
| 2010/0219695 A1 | 9/2010 | Komiyama et al. | | OTHER PUBLICATIONS | | |
| 2010/0219696 A1 | 9/2010 | Kojima | | | | |
| 2010/0222010 A1 | 9/2010 | Ozaki et al. | | | | |
| 2010/0225270 A1 | 9/2010 | Jacobs et al. | | | | |
| 2010/0225271 A1 | 9/2010 | Oyobe et al. | | | | |
| 2010/0225272 A1 | 9/2010 | Kirby et al. | | | | |
| 2010/0231163 A1 | 9/2010 | Mashinsky | | | | |
| 2010/0244576 A1 | 9/2010 | Hillan et al. | | | | |
| 2010/0244577 A1 | 9/2010 | Shimokawa | | | | |
| 2010/0244578 A1 | 9/2010 | Yoshikawa | | | | |
| 2010/0244579 A1 | 9/2010 | Sogabe et al. | | | | |
| 2010/0244580 A1 | 9/2010 | Uchida et al. | | | | |
| 2010/0244581 A1 | 9/2010 | Uchida | | | | |
| 2010/0244582 A1 | 9/2010 | Yoshikawa | | | | |
| 2010/0244583 A1 | 9/2010 | Shimokawa | | | | |
| 2010/0244839 A1 | 9/2010 | Yoshikawa | | | | |
| 2010/0248622 A1 | 9/2010 | Kirby et al. | | | | |
| 2010/0253281 A1 | 10/2010 | Li | | | | |
| 2010/0256831 A1 | 10/2010 | Abramo et al. | | | | |
| 2010/0259109 A1 | 10/2010 | Sato | | | | |
| 2010/0264746 A1 | 10/2010 | Kazama et al. | | | | |
| 2010/0276995 A1 | 11/2010 | Marzetta et al. | | | | |
| 2010/0277003 A1 | 11/2010 | Von Novak et al. | | | | |
| 2010/0277004 A1 | 11/2010 | Suzuki et al. | | | | |

"Intel CTO Says Gap between Humans, Machines Will Close by 2050", *Intel News Release*, (See intel.com/.../20080821comp. htm?iid=S...) (Printed Nov. 6, 2009).

Aristeidis Karalis et al., "Efficient Wireless *non-radiative mid-range* energy transfer", *Annals of Physics*, vol. 323, pp. 34-48 (2008).

Yoshihiro Konishi, *Microwave Electronic Circuit Technology*, Chapter 4, pp. 145-197 (Marcel Dekker, Inc., New York, NY 1998).

Andre Kurs et al., "Wireless Power Transfer via Strongly Coupled Magnetic Resonances", *Science* vol. 317, pp. 83-86 (Jul. 6, 2007).

MIT Team Experimentally Demonstrates Wireless Power Transfer, Potentially Useful for Power Laptops, Cell-Phones Without Cords—Goodbye Wires . . . , by Franklin Hadley, Institute for Soldier Nanotechnologies, Massachusetts Institute of Technology (Jun. 7, 2007).

O'Brien et al. "Analysis of Wireless Power Supplies for Industrial Automation Systems". IEEE, pp. 367-372, 2003.

Gary Peterson, "MIT WiTricity Not So Original After All", *Feed Line No. 9*, (See http://www.tfcbooks.com/articles/witricity.htm) printed Nov. 12, 2009.

"Physics Update, Unwired Energy", *Physics Today*, pp. 26, (Jan. 2007) (See http://arxiv.org/abs/physics/0611063.).

Soljacic. "Wireless Non-Radiative Energy Transfer—PowerPoint presentation". Massachusetts Institute of Technology, Oct. 6, 2005.

David H. Staelin et al., *Electromagnetic Waves*, Chapters 2, 3, 4, and 8, pp. 46-176 and 336-405 (Prentice Hall Upper Saddle River, New Jersey 1998).

Nikola Tesla, "High Frequency Oscillators for Electro-Therapeutic and Other Purposes", *The Electrical Engineer*, vol. XXVI, No. 50 (Nov. 17, 1898).

Nikola Tesla, "High Frequency Oscillators for Electro-Therapeutic and Other Purposes", *Proceedings of the IEEE*, vol. 87, No. 7, pp. 1282-1292 (Jul. 1999).

Thomsen et al., "Ultrahigh speed all-optical demultiplexing based on two-photon absorption in a laser diode," Electronics Letters, 34(19):1871-1872 (Sep. 17, 1998).

"Unwired energy questions asked, answered", *Physics Today*, pp. 16-17 (Sep. 2007).

David Vilkomerson et al., "Implantable Doppler System for Self-Monitoring Vascular Grafts", *IEEE Ultrasonics Symposium*, pp. 461-465 (2004).

"Wireless Energy Transfer Can Potentially Recharge Laptops, Cell Phones Without Cords", by Marin Soljacic of Massachusetts Institute of Technology and Davide Castelvecchi of American Institute of Physics (Nov. 14, 2006).

Clemens M. Zierhofer et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).

International Preliminary Report on Patentability with regard to International Application No. PCT/US2007/070892 dated Sep. 29, 2009.

"Recharging, The Wireless Way—Even physicists forget to recharge their cell phones sometimes." By Angela Chang—PC Magazine, *ABC News Internet Ventures*, (2006).

"Physics Promises Wireless Power" by Jonathan Fildes, Science and Technology Reporter, *BBC News*, (Nov. 15, 2006).

"Wireless energy promise powers up" by Jonathan Fildes, Science and Technology Report, BBC News, (See http://news.bbc.co.uk/2/hi/technology/6725955.stm) (Jun. 7, 2007).

"The technology with impact 2007", by Jonathan Fildes, *BBC News*, (Dec. 27, 2007).

"In pictures: A year in technology", *BBC News*, (Dec. 28, 2007).

"Man tries wirelessly boosting batteries", by Seth Borenstein, AP Science Writer, Boston.com, (See http://www.boston.com/business/technology/articles/2006/11/15/man_tries_wirelessly_b...) (Nov. 15, 2006).

"The vision of an MIT physicist: Getting rid of pesky rechargers" by Gareth Cooks, Globe Staff, Boston.com, (Dec. 11, 2006).

"MIT discovery could unplug your iPod forever", by Chris Reidy, Globe staff, Boston.com, (See http://www.boston.com/business/ticker/2007/06/mit_discovery_c.html) (Jun. 7, 2007).

"Scientists light bulb with 'wireless electricity' ", www.Chinaview.cn, (See http://news.xinhuanet.com/english/2007-06/08/content_6215681.htm) (Jun. 2007).

"Look, Ma—no wires!—Electricity broadcast through the air may someday run your home", by Gregory M. Lamb, Staff writer, The Christian Science Monitor, (See http://www.csmonitor.com/2006/1116/p14s01-stct.html) (Nov. 15, 2006).

"The end of the plug? Scientists invent wireless device that beams electricity through your home", by David Derbyshire, Daily Mail, (See http://www.dailymail.co.uk/pages/live/articles/technology/technology.html?in_article_id=4...) (Jun. 7, 2007).

"Lab report: Pull the plug for a positive charge", by James Morgan, *The Herald*, Web Issue 2680 (Nov. 16, 2006).

"Recharging gadgets without cables", *Infotech Online*, Printed from infotech.indiatimes.com (Nov. 17, 2006).

"Electro-nirvana? Not so fast", by Alan Boyle, *MSNBC*, (Jun. 8, 2007).

"'Evanescent coupling' could power gadgets wirelessly" by Celeste Biever, NewScientistsTech.com, (see http://www.newscientisttech.com/article.ns?id=dn10575&print=true) (Nov. 15, 2006).

"Wireless Energy", by Clay Risen, *The New York Times*, (Dec. 9, 2007).

"Wireless power transfer possible", PressTV, (See http://www.presstv.ir/detail.aspx?id=12754&sectionid=3510208) (Jun. 11, 2007).

"Outlets Are Out", by Phil Berardelli, ScienceNOW Daily News, Science Now, (See http://sciencenow.sciencemag.org/cgi/content/full/2006/1114/2) (Nov. 14, 2006).

"The Power of Induction—Cutting the last cord could resonate with our increasingly gadget-dependent lives", by Davide Castelvecchi, *Science News Online*, vol. 172, No. 3, (Week of Jul. 21, 2007).

"Wireless Energy Transfer May Power Devices at a Distance", ScientificAmerican.com, (Nov. 14, 2006).

"Wireless Energy Lights Bulb from Seven Feet Away—Physicists vow to cut the cord between your laptop battery and the wall socket—with just a simple loop of wire", by JR Minkel, ScientificAmerican.com, (See http://www.sciam.com/article.cfm?articleid=07511C52-E7F2-99DF-3FA6ED2D7DC9AA2...) (Jun. 7, 2007).

"Air Power—Wireless data connections are common—now scientists are working on wireless power", by Stephen Cass, Sponsored by Spectrum, (See http://spectrum.ieee.org/computing/hardware/air-power) (Nov. 2006).

"Wireless revolution could spell end of plugs", by Roger Highfield, Science Editor, Telegraph.co.uk, (See http://www.telegraph.co.uk/news/main.jhtml?xml=/news/2007/06/07/nwireless107.xml) (Jun. 7, 2007).

"Man tries wirelessly boosting batteries", by Seth Borenstein, The Associated Press, *USA Today*, (Nov. 16, 2006).

"MIT's wireless electricity for mobile phones", by Miebi Senge, Vanguard, (See http://www.vanguardngr.com/articles/2002/features/gsm/gsm211062007.htm) (Jun. 11, 2007).

"MIT Scientists Pave the Way for Wireless Battery Charging", by William M. Bulkeley, The Wall Street Journal, (See http://online.wsj.com/article/SB118123955549228045.html?mod=googlenews_wsj) (Jun. 8, 2007).

U.S. Appl. No. 60/908,383, filed Mar. 27, 2007.

"Intel Moves to Free Gadgets of Their Recharging Cords", by John Markoff, The New York Times—nytimes.com, Aug. 21, 2008.

G. Scheible et al., "Novel Wireless Power Supply System for Wireless Communication Devices in Industrial Automation Systems", *IEEE*, (2002).

J. Schutz et al., "Load Adaptive Medium Frequency Resonant Power Supply", *IEEE*, (2002).

Marin Soljacic et al., "Photonic-crystal slow-light enhancement of nonlinear phase sensitivity", *J. Opt. Soc. Am B*, vol. 19, No. 9, pp. 2052-2059 (Sep. 2002).

Amnon Yariv et al., "Coupled-resonator optical waveguide: a proposal and analysis", *Optics Letters*, vol. 24, No. 11, pp. 711-713 (Jun. 1, 1999).

Electricity Unplugged, Feature: Wireless Energy, *Physics World*, pp. 23-25 (Feb. 2009).

C. Fernandez et al., "A simple dc-dc converter for the power supply of a cochlear implant", *IEEE*, pp. 1965-1970 (2003).

A. Mediano et al. "Design of class E amplifier with nonlinear and linear shunt capacitances for any duty cycle", IEEE Trans. Microwave Theor. Tech., vol. 55, No. 3, pp. 484-492, (2007).

H. Sekiya et al. "FM/PWM control scheme in class DE inverter", IEEE Trans. Circuits Syst. I, vol. 51, No. 7 (Jul. 2004).

International Search Report for International Application No. PCT/US09/58499 dated Dec. 10, 2009.

European Examination Report dated Jan. 15, 2009 in connection with Application No. 06 786 588.1-1242.

Abe et al. "A Noncontact Charger Using a Resonant Converter with Parallel Capacitor of the Secondary Coil". IEEE, 36(2):444-451, Mar./Apr. 2000.

Alchev et al. "Efficient Resonant Inductive Coupling Energy Transfer Using New Magnetic and Design Criteria". IEEE, pp. 1293-1298, 2005.

T. Aoki et al. Observation of strong coupling between one atom and a monolithic microresonator. Nature 443:671-674 (2006).

Apneseth et al. "Introducing wireless proximity switches" ABB Review Apr. 2002.

Baker et al., "Feedback Analysis and Design of RF Power Links for Low-Power Bionic Systems," IEEE Transactions on Biomedical Circuits and Systems, 1(1):28-38 (Mar. 2007).

Balanis, C.A., "Antenna Theory: Analysis and Design," 3$^{rd}$ Edition, Sections 4.2, 4.3, 5.2, 5.3 (Wiley, New Jersey, 2005).

Burri et al. "Invention Description" Feb. 5, 2008.

Esser et al. "A New Approach to Power Supplies for Robots". IEEE, 27(5):872-875, Sep./Oct. 1991.

Fenske et al. "Dielectric Materials at Microwave Frequencies". Applied Microwave & Wireless, pp. 92-100, 2000.

D.H.Freedman. "Power on a Chip". MIT Technology Review, Nov. 2004.

Geyi, Wen. A Method for the Evaluation of Small Antenna Q. IEEE Transactions on Antennas and Propagation, vol. 51, No. 8, Aug. 2003.

Haus, H.A., "Waves and Fields in Optoelectronics," Chapter 7 (Prentice-Hall, New Jersey, 1984).

Heikkinen et al. "Performance and Efficiency of Planar Rectennas for Short-Range Wireless Power Transfer at 2.45 GHz". Microwave and Optical Technology Letters, 31(2):86-91, Oct. 20, 2001.

Hirai et al. "Integral Motor with Driver and Wireless Transmission of Power and Information for Autonomous Subspindle Drive". IEEE, 15(1):13-20, Jan. 2000.

Hirai et al. "Practical Study on Wireless Transmission of Power and Information for Autonomous Decentralized Manufacturing System". IEEE, 46(2):349-359, Apr. 1999.

Hirai et al. "Study on Intelligent Battery Charging Using Inductive Transmission of Power and Information". IEEE, 15(2):335-345, Mar. 2000.

Hirai et al. "Wireless Transmission of Power and Information and Information for Cableless Linear Motor Drive". IEEE 15(1):21-27, Jan. 2000.

M. V. Jacob et al. "Lithium Tantalate—A High Permittivity Dielectric Material for Microwave Communication Systems". Proceedings of IEEE TENCON—Poster Papers, pp. 1362-1366, 2003.

Jackson, J.D., "Classical Electrodynamics," 3$^{rd}$ Edition, Sections 1.11, 5.5, 5.17, 6.9, 8.1, 8.8, 9.2, 9.3 (Wiley, New York, 1999).

Kawamura et al. "Wireless Transmission of Power and Information Through One High-Frequency Resonant AC Link Inverter for Robot Manipulator Applications". IEEE, 32(3):503-508, May/Jun. 1996.

Lee, "Antenna Circuit Design for RFID Applications," Microchip Technology Inc., AN710, 50 pages (2003).

Lee, "RFID Coil Design," Microchip Technology Inc., AN678, 21 pages (1998).

Liang et al., "Silicon waveguide two-photon absorption detector at 1.5 µm wavelength for autocorrelation measurements," Applied Physics Letters, 81(7):1323-1325 (Aug. 12, 2002).

Microchip Technology Inc., "microID 13.56 MHz Design Guide—MCRF355/360 Reader Reference Design," 24 pages (2001).

O'Brien et al. "Design of Large Air-Gap Transformers for Wireless Power Supplies". IEEE, pp. 1557-1562, 2003.

J. B. Pendry. "A Chiral Route to Negative Refraction". Science 306:1353-1355 (2004).

Powercast LLC. "White Paper" Powercast simply wire free, 2003.

Sakamoto et al. "A Novel Circuit for Non-Contact Charging Through Electro-Magnetic Coupling". IEEE, pp. 168-174, 1992.

Sekitani et al. "A large-area flexible wireless power transmission sheet using printed plastic MEMS switches and organic field-effect transistors". [Publication Unknown].

Sekitani et al. "A large-area wireless power-transmission sheet using printed organic transistors and plastic MEMS switches" www.nature.com/naturematerials. Published online Apr. 29, 2007.

S. Sensiper. Electromagnetic wave propogation on helical conductors. PhD Thesis, Massachusetts Institute of Technology, 1951.

Splashpower, "Splashpower—World Leaders in Wireless Power," PowerPoint presentation, 30 pages (Sep. 3, 2007).

Texas Instruments, "HF Antenna Design Notes—Technical Application Report," Literature No. 11-08-26-003, 47 pages (Sep. 2003).

"The Big Story for CES 2007: The public debut of eCoupled Intelligent Wireless Power" Press Release, Fulton Innovation LLC, Las Vegas, NV, Dec. 27, 2006.

"The world's first sheet-type wireless power transmission system: Will a socket be replaced by e-wall?" Press Release, Tokyo, Japan, Dec. 12, 2006.

UPM Rafsec, "Tutorial overview of inductively coupled RFID Systems," 7 pages (May 2003).

Vandevoorde et al. "Wireless energy transfer for stand-alone systems: a comparison between low and high power applicability". Sensors and Actuators, A 92:305-311, 2001.

Someya, Takao. "The world's first sheet-type wireless power transmission system". University of Tokyo, Dec. 12, 2006.

Examination Report for Australia Application No. 2006269374, dated Sep. 18, 2008.

International Search Report and Written Opinion for International Application No. PCT/US2006/026480, dated Dec. 21, 2007.

International Preliminary Report on Patentability for International Application No. PCT/US2006/026480, dated Jan. 29, 2008.

International Search Report and Written Opinion for International Application No. PCT/US2007/070892, dated Mar. 3, 2008.

International Search Report and Written Opinion for International Application No. PCT/US09/43970, dated Jul. 14, 2009.

Andre Kurs et al., "Simultaneous mid-range power transfer to multiple devices", *Applied Physics Letters*, vol. 96, No. 044102 (2010).

David Schneider, "A Critical Look at Wireless Power", *IEEE Spectrum*, (May 2010).

Marin Soljacic, "Wireless nonradiative energy transfer", *Visions of Discovery New Light on Physics, Cosmology, and Consciousness*, Cambridge University Press, New York, NY pp. 530-542 (2011).

Joseph C. Stark III, "Wireless Power Transmission Utilizing a Phased Array of Tesla Coils", *Master Thesis, Massachusetts Institute of Technology* (2004).

International Search Report and Written Opinion of the International Searching Authority for International Application No. PCT/US2011/027868 dated Jul. 5, 2011.

John C. Schuder et al., "An Inductively Coupled RF System for the Transmission of 1 kW of Power Through the Skin", *IEEE Transactions on Bio-Medical Engineering*, vol. BME-18, No. 4 (Jul. 1971).

J. C. Schuder et al., "Energy Transport Into the Closed Chest From a Set of Very-Large Mutually Orthogonal Coils", *Communication Electronics*, vol. 64, pp. 527-534 (Jan. 1963).

John C. Schuder "Powering an Artificial Heart: Birth of the Inductively Coupled-Radio Frequency System in 1960", *Artificial Organs*, vol. 26, No. 11, pp. 909-915 (2002).

FIG. 2: Comparison of experimental and theoretical values for κ as a function of the separation between the source and device coils.

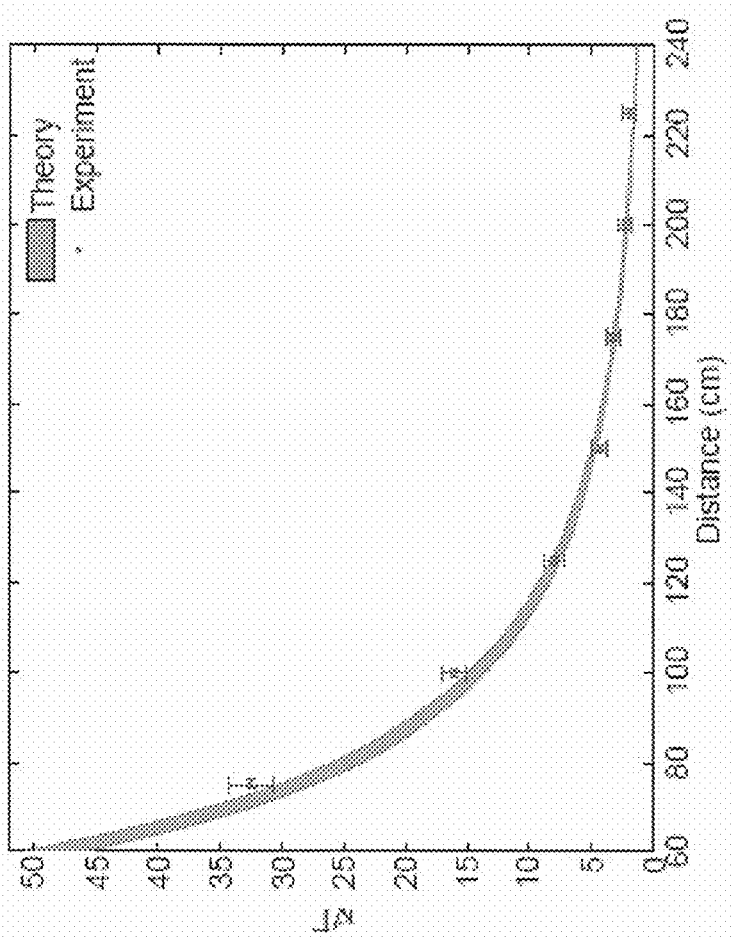

FIG. 3: Comparison of experimental and theoretical values for the parameter $\kappa/\Gamma$ as a function of the separation between the two coils. The theory values are obtained by using the theoretically obtained $\kappa$ and the experimentally measured $\Gamma$. The shaded area represents the spread in the theoretical $\kappa/\Gamma$ due to the ~ 5% uncertainty in $Q$.

FIG. 7

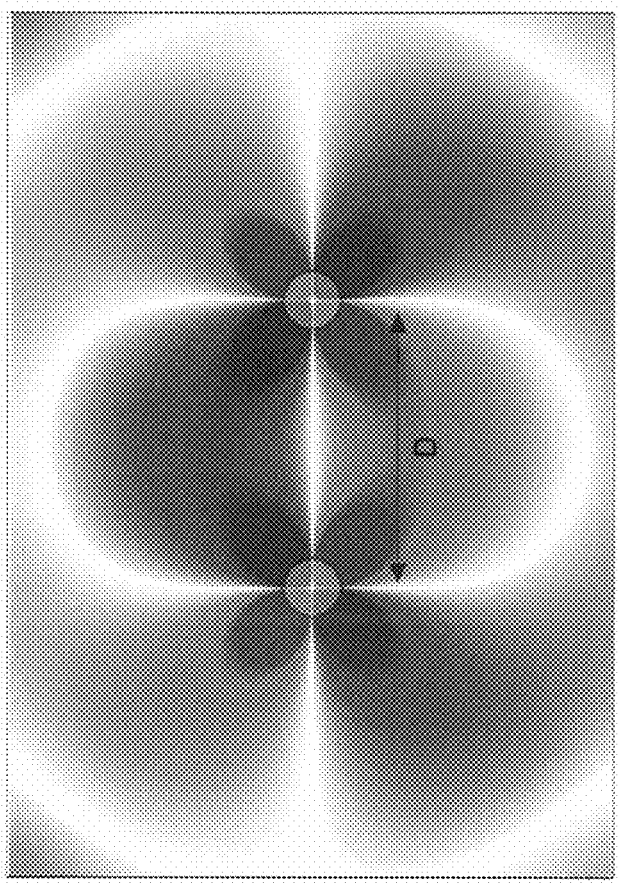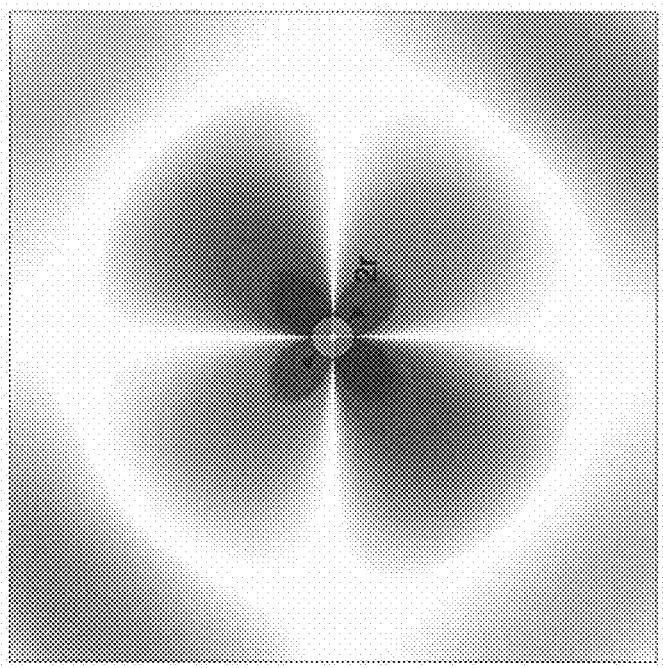
FIG. 15

WIRELESS ENERGY TRANSFER, INCLUDING INTERFERENCE ENHANCEMENT

CROSS REFERENCE TO RELATED APPLICATIONS

Pursuant to U.S.C. §119(e), this application claims priority to U.S. Provisional Application Ser. No. 61/127,661, filed May 14, 2008.

This application is also related by subject matter to the following commonly owned applications: U.S. Utility patent application Ser. No. 12/055,963, filed Mar. 26, 2008; U.S. Utility patent application Ser. No. 11/481,077, filed Jul. 5, 2006; U.S. Provisional Application Ser. No. 60/698,442, filed Jul. 12, 2005; U.S. Provisional Application Ser. No. 60/908,383, filed Mar. 27, 2007; U.S. Provisional Application Ser. No. 60/908,666, filed Mar. 28, 2007; and International Application No. PCT/US2007/070892, filed Jun. 11, 2007.

The contents of the prior applications are incorporated herein by reference in their entirety.

This invention was made with government support under grant number W911NF-07-D-0004 awarded by the Army Research Office. The government has certain rights in this invention.

BACKGROUND

The disclosure relates to wireless energy transfer. Wireless energy transfer can for example, be useful in such applications as providing power to autonomous electrical or electronic devices.

Radiative modes of omni-directional antennas (which work very well for information transfer) are not suitable for such energy transfer, because a vast majority of energy is wasted into free space. Directed radiation modes, using lasers or highly-directional antennas, can be efficiently used for energy transfer, even for long distances (transfer distance $L_{TRANS} \gg L_{DEV}$, where $L_{DEV}$ is the characteristic size of the device and/or the source), but require existence of an uninterruptible line-of-sight and a complicated tracking system in the case of mobile objects. Some transfer schemes rely on induction, but are typically restricted to very close-range ($L_{TRANS} \ll L_{DEV}$) or low power (~mW) energy transfers.

The rapid development of autonomous electronics of recent years (e.g. laptops, cell-phones, house-hold robots, that all typically rely on chemical energy storage) has led to an increased need for wireless energy transfer.

SUMMARY

Efficient wireless energy-transfer between two resonant objects can be achieved at mid-range distances, provided these resonant objects are designed to operate in the 'strong-coupling' regime. We describe an implementation of a method to increase the efficiency of energy-transfer or to suppress the power radiated, which can be harmful or a cause of interference to other communication systems, by utilizing destructive interference between the radiated far-fields of the resonant coupled objects. 'Strong coupling' is a necessary condition for efficient energy-transfer, in the absence of far-field interference. 'Strong coupling' can be demonstrated in the case of realistic systems: self-resonant conducting coils, capacitively-loaded conducting coils, inductively-loaded conducting rods and dielectric disks, all bearing high-Q electromagnetic resonant modes. Also, an analytical model can be developed to take far-field interference into account for wireless energy-transfer systems. The analytical model can be used to demonstrate the efficiency enhancement and radiation suppression, in the presence of interference. In an example implementation, we describe improved performance based on the above principles in the case of two realistic systems: capacitively-loaded conducting coils and dielectric disks, both bearing high-Q electromagnetic resonant modes and far-field interference.

In an aspect, an apparatus for use in wireless energy transfer includes a first resonator structure configured for energy transfer with a second resonator structure, over a distance D larger than a characteristic size $L_1$ of said first resonator structure and larger than a characteristic size $L_2$ of said second resonator structure. The energy transfer has a rate $\kappa$ and is mediated by evanescent-tail coupling of a resonant field of the first resonator structure and a resonant field of the second resonator structure. The resonant field of the first resonator structure has a resonance angular frequency $\omega_1$, a resonance frequency-width $\Gamma_1$, and a resonance quality factor $Q_1 = \omega_1/2\Gamma_1$, and the said resonant field of the second resonator structure has a resonance angular frequency $\omega_2$, a resonance frequency-width $\Gamma_2$, and a resonance quality factor $Q_2 = \omega_2/2\Gamma_2$. The absolute value of the difference of said angular frequencies $\omega_1$ and $\omega_2$ is smaller than the broader of said resonant widths $\Gamma_1$ and $\Gamma_2$. The apparatus also includes a power supply coupled to the first structure and configured to drive the first resonator structure or the second resonator structure at an angular frequency away from the resonance angular frequencies and shifted towards a frequency corresponding to an odd normal mode for the resonator structures to reduce radiation from the resonator structures by destructive far-field interference.

In some examples, the power supply is configured to drive the first resonator structure or the second resonator structure at the angular frequency away from the resonance angular frequencies and shifted towards the frequency corresponding to an odd normal mode for the resonator structures to substantially suppress radiation from the resonator structures by destructive far-field interference.

In an aspect, a method for wireless energy transfer involves a first resonator structure configured for energy transfer with a second resonator structure, over a distance D larger than a characteristic size $L_1$ of said first resonator structure and larger than a characteristic size $L_2$ of said second resonator structure, wherein the energy transfer has a rate $\kappa$ and is mediated by evanescent-tail coupling of a resonant field of the first resonator structure and a resonant field of the second resonator structure, said resonant field of the first resonator structure has a resonance angular frequency $\omega_1$, a resonance frequency-width $\Gamma_1$, and a resonance quality factor $Q_1 = \omega_1/2\Gamma_1$, and said resonant field of the second resonator structure has a resonance angular frequency $\omega_2$, a resonance frequency-width $\Gamma_2$, and a resonance quality factor $Q_2 = \omega_2/2\Gamma_2$, the absolute value of the difference of said angular frequencies $\omega_1$ and $\omega_2$ is smaller than the broader of said resonant widths $\Gamma_1$ and $\Gamma_2$. The method includes driving the first resonator structure or the second resonator structure at an angular frequency away from the resonance angular frequencies and shifted towards a frequency corresponding to an odd normal mode for the resonator structures to reduce radiation from the resonator structures by destructive far-field interference.

In some examples, the first resonator structure or the second resonator structure is driven at the angular frequency away from the resonance angular frequencies and shifted towards the frequency corresponding to an odd normal mode for the resonator structures to substantially suppress radiation from the resonator structures by destructive far-field interference.

In an aspect, an apparatus for use in wireless energy transfer includes a first resonator structure configured for energy transfer with a second resonator structure, over a distance D larger than a characteristic size $L_1$ of said first resonator structure and larger than a characteristic size $L_2$ of said second resonator structure. The energy transfer has a rate $\kappa$ and is mediated by evanescent-tail coupling of a resonant field of the first resonator structure and a resonant field of the second resonator structure. The resonant field of the first resonator structure has a resonance angular frequency $\omega_1$, a resonance frequency-width $\Gamma_1$, and a resonance quality factor $Q_1=\omega_1/2\Gamma_1$, and the resonant field of the second resonator structure has a resonance angular frequency $\omega_2$, a resonance frequency-width $\Gamma_2$, and a resonance quality factor $Q_2=\omega_2/2\Gamma_2$. The absolute value of the difference of said angular frequencies $\omega_1$ and $\omega_2$ is smaller than the broader of said resonant widths $\Gamma_1$ and $\Gamma_2$. For a desired range of the distances D, the resonance angular frequencies for the resonator structures increase transmission efficiency T by accounting for radiative interference, wherein the increase is relative to a transmission efficiency T calculated without accounting for the radiative interference.

In some examples, the resonance angular frequencies for the resonator structures are selected by optimizing the transmission efficiency T to account for both a resonance quality factor U and an interference factor V.

In an aspect, a method involves designing a wireless energy transfer apparatus, the apparatus including a first resonator structure configured for energy transfer with a second resonator structure, over a distance D larger than a characteristic size $L_1$ of said first resonator structure and larger than a characteristic size $L_2$ of said second resonator structure, wherein the energy transfer has a rate $\kappa$ and is mediated by evanescent-tail coupling of a resonant field of the first resonator structure and a resonant field of the second resonator structure, wherein said resonant field of the first resonator structure has a resonance angular frequency $\omega_1$, a resonance frequency-width $\Gamma_1$, and a resonance quality factor $Q_1=\omega_1/2\Gamma_1$, and said resonant field of the second resonator structure has a resonance angular frequency $\omega_2$, a resonance frequency-width $\Gamma_2$ and a resonance quality factor $Q_2=\omega_2/2\Gamma_2$, wherein the absolute value of the difference of said angular frequencies $\omega_1$ and $\omega_2$ is smaller than the broader of said resonant widths $\Gamma_1$ and $\Gamma_2$. The method includes selecting the resonance angular frequencies for the resonator structures to substantially optimize the transmission efficiency by accounting for radiative interference between the resonator structures.

In some examples, the resonance angular frequencies for the resonator structures are selected by optimizing the transmission efficiency T to account for both a resonance quality factor U and an interference factor V.

In an aspect, an apparatus for use in wireless energy transfer includes a first resonator structure configured for energy transfer with a second resonator structure over a distance D. The energy transfer is mediated by evanescent-tail coupling of a resonant field of the first resonator structure and a resonant field of the second resonator structure, with a coupling factor k. The resonant field of the first resonator structure has a resonance angular frequency-width $\Gamma_1$, and a resonance quality factor $Q_1=\omega_1/2\Gamma_1$, and is radiative in the far field, with an associated radiation quality factor $Q_{1,rad} \geq Q_1$, and the resonant field of the second resonator structure has a resonance angular frequency $\omega_2$, a resonance frequency-width $\Gamma_2$, and a resonance quality factor $Q_2=\omega_2/2\Gamma_2$, and is radiative in the far field, with an associated radiation quality factor $Q_{2,rad} \geq Q_2$. An absolute value of a difference of said angular frequencies $\omega_1$ and $\omega_2$ is smaller than broader of said resonant widths $\Gamma_1$ and $\Gamma_2$, and an average resonant angular frequency is defined as $\omega_o=\sqrt{\omega_1\omega_2}$, corresponding to an average resonant wavelength $\lambda_o=2\pi c/\omega_o$, where c is the speed of light in free space, and a strong-coupling factor being defined as $U=k\sqrt{Q_1Q_2}$. The apparatus is configured to employ interference between said radiative far fields of the resonant fields of the first and second resonator, with an interference factor $V_{rad}$, to reduce a total amount of radiation from the apparatus compared to an amount of radiation from the apparatus in the absence of interference, a strong-interference factor being defined as $V=V_{rad}\sqrt{(Q_1/Q_{1,rad})(Q_2/Q_{2,rad})}$.

The following are examples within the scope of this aspect.

The apparatus has $Q_1/Q_{1,rad} \geq 0.01$ and $Q_2/Q_{2,rad} \geq 0.01$. The apparatus has $Q_1/Q_{1,rad} \geq 0.1$ and $Q_2/Q_{2,rad} \geq 0.1$. The apparatus has $D/\lambda_o$ larger than 0.001 and the strong-interference factor V is larger than 0.01. The apparatus has $D/\lambda_o$ larger than 0.001 and the strong-interference factor V is larger than 0.1. The apparatus includes the second resonator structure.

During operation, a power generator is coupled to one of the first and second resonant structure, with a coupling rate $\kappa_g$, and is configured to drive the resonator structure, to which it is coupled, at a driving frequency f, corresponding to a driving angular frequency $\omega=2\pi f$, wherein $U_g$ is defined as $\kappa_g/\Gamma_1$, if the power generator is coupled to the first resonator structure and defined as $\kappa_g/\Gamma_2$, if the power generator is coupled to the second resonator structure. The driving frequency is different from the resonance frequencies of the first and second resonator structures and is closer to a frequency corresponding to an odd normal mode of the system of the two resonator structures, wherein the detuning of the first resonator from the driving frequency is defined as $D_1=(\omega-\omega_1)/\Gamma_1$ and the detuning of the second resonator structure from the driving frequency is defined as $D_2=(\omega-\omega_2)/\Gamma_2$.

$D_1$ is approximately equal to $UV_{rad}$ and $D_2$ is approximately equal to $UV_{rad}$. $U_g$ is chosen to maximize the ratio of the energy-transfer efficiency to the radiation efficiency. $U_g$ is approximately equal to $\sqrt{1+U^2-V_{rad}^2U^2+V^2-2VV_{rad}}$. f is at least larger than 100 kHz and smaller than 500 MHz. f is at least larger than 1 MHz and smaller than 50 MHz. The apparatus further includes the power generator. During operation, a power load is coupled to the resonant structure to which the power generator is not coupled, with a coupling rate $\kappa_1$, and is configured to receive from the resonator structure, to which it is coupled, a usable power, wherein $U_1$ is defined as $\kappa_1/\Gamma_1$, if the power load is coupled to the first resonator structure and defined as $\kappa_1/\Gamma_2$, if the power load is coupled to the second resonator structure. $U_1$ is chosen to maximize the ratio of the energy-transfer efficiency to the radiation efficiency. The driving frequency is different from the resonance frequencies of the first and second resonator structures and is closer to a frequency corresponding to an odd normal mode of the system of the two resonator structures, wherein the detuning of the first resonator from the driving frequency is defined as $D_1=(\omega-\omega_1)/\Gamma_1$ and is approximately equal to $UV_{rad}$, and the detuning of the second resonator structure from the driving frequency is defined as $D_2=(\omega-\omega_2)/\Gamma_2$ and is approximately equal to $UV_{rad}$, and $U_1$ is approximately equal to $\sqrt{1+U^2-V_{rad}^2+U^2+V^2-VV_{rad}}$.

At least one of the first and second resonator structures comprises a capacitively loaded loop or coil of at least one of a conducting wire, a conducting Litz wire, and a conducting ribbon. The characteristic size of said loop or coil is less than 30 cm and the width of said conducting wire or Litz wire or ribbon is less than 2 cm. The characteristic size of said loop or coil is less than 1 m and the width of said conducting wire or Litz wire or ribbon is less than 2 cm.

The apparatus further includes a feedback mechanism for maintaining the resonant frequency of one or more of the resonant objects. The feedback mechanism comprises an oscillator with a fixed driving frequency and is configured to adjust the resonant frequency of the one or more resonant objects to be detuned by a fixed amount with respect to the fixed frequency.

In an aspect, an apparatus for use in wireless energy transfer includes a first resonator structure configured for energy transfer with a second resonator structure over a distance D. The energy transfer is mediated by evanescent-tail coupling of a resonant field of the first resonator structure and a resonant field of the second resonator structure, with a coupling factor k. The resonant field of the first resonator structure has a resonance angular frequency $\omega_1$, a resonance frequency-width $\Gamma_1$, and a resonance quality factor $Q_1=\omega_1/2\Gamma_1$, and is radiative in the far field, with an associated radiation quality factor $Q_{1,rad} \geq Q_1$, and the resonant field of the second resonator structure has a resonance angular frequency $\omega_2$, a resonance frequency-width $\Gamma_2$, and a resonance quality factor $Q_2=\omega_2/2\Gamma_2$, and is radiative in the far field, with an associated radiation quality factor $Q_{2,rad} \geq Q_2$. An absolute value of a difference of said angular frequencies $\omega_1$ and $\omega_2$ is smaller than the broader of said resonant widths $\Gamma_1$ and $\Gamma_2$, and an average resonant angular frequency is defined as $\omega_o=\sqrt{\omega_1\omega_2}$, corresponding to an average resonant wavelength $\lambda_o=2\pi c/\omega_o$, where c is the speed of light in free space, and a strong-coupling factor is defined as $U=k\sqrt{Q_1Q_2}$. The apparatus is configured to employ interference between said radiative far fields of the resonant fields of the first and second resonator, with an interference factor $V_{rad}$, to increase efficiency of energy transfer for the apparatus compared to efficiency for the apparatus in the absence of interference, the strong-interference factor being defined as $V=V_{rad}\sqrt{(Q_1/Q_{1,rad})(Q_2/Q_{2,rad})}$.

The following are examples within the scope of this aspect. The apparatus has $Q_1/Q_{1,rad} \geq 0.05$ and $Q_2/Q_{2,rad} \geq 0.05$. The apparatus has $Q_1/Q_{1,rad} \geq 0.5$ and $Q_2/Q_{2,rad} \geq 0.5$. The apparatus has $D/\lambda_o$ larger than 0.01 and the strong-interference factor V is larger than 0.05. The apparatus has $D/\lambda_1$ larger than 0.01 and the strong-interference factor V is larger than 0.5. The apparatus further includes the second resonator structure.

During operation, a power generator is coupled to one of the first and second resonator structure, with a coupling rate $\kappa_g$, and is configured to drive the resonator structure, to which it is coupled, at a driving frequency f, corresponding to a driving angular frequency $\omega=2\pi f$, wherein $U_g$ is defined as $\kappa_g/\Gamma_1$, if the power generator is coupled to the first resonator structure and defined as $\kappa_g/\Gamma_2$, if the power generator is coupled to the second resonator structure. The driving frequency is different from the resonance frequencies of the first and second resonator structures and is closer to a frequency corresponding to an odd normal mode of the system of the two resonator structures, wherein the detuning of the first resonator from the driving frequency is defined as $D_1=(\omega-\omega_1)/\Gamma_1$ and the detuning of the second resonator structure from the driving frequency is defined as $D_2=(\omega-\omega_2)/\Gamma_2$.

$D_1$ is approximately equal to UV and $D_2$ is approximately equal to UV. $U_g$ is chosen to maximize the energy-transfer efficiency. $U_g$ is approximately equal to $\sqrt{(1+U^2)(1-V^2)}$. f is at least larger than 100 kHz and smaller than 500 MHz. f is at least larger than 1 MHz and smaller than 50 MHz. The apparatus further includes the power generator.

During operation, a power load is coupled to the resonant structure to which the power generator is not coupled, with a coupling rate $\kappa_1$, and is configured to receive from the resonator structure, to which it is coupled, a usable power, wherein $U_1$ is defined as $\kappa_1/\Gamma_1$, if the power load is coupled to the first resonator structure and defined as $\kappa_1/\Gamma_2$, if the power load is coupled to the second resonator structure. $U_1$ is chosen to maximize the energy-transfer efficiency. The driving frequency is different from the resonance frequencies of the first and second resonator structures and is closer to a frequency corresponding to an odd normal mode of the system of the two resonator structures, wherein the detuning of the first resonator from the driving frequency is defined as $D_1=(\omega-\omega_1)/\Gamma_1$ and is approximately equal to UV, and the detuning of the second resonator structure from the driving frequency is defined as $D_2=(\omega-\omega_2)/\Gamma_2$ and is approximately equal to UV, and $U_1$ is approximately equal to $\sqrt{(1+U^2)(1-V^2)}$.

At least one of the first and second resonator structures comprises a capacitively loaded loop or coil of at least one of a conducting wire, a conducting Litz wire, and a conducting ribbon. The characteristic size of said loop or coil is less than 30 cm and the width of said conducting wire or Litz wire or ribbon is less than 2 cm. The characteristic size of said loop or coil is less than 1 m and the width of said conducting wire or Litz wire or ribbon is less than 2cm. The apparatus includes a feedback mechanism for maintaining the resonant frequency of one or more of the resonant objects. The feedback mechanism comprises an oscillator with a fixed driving frequency and is configured to adjust the resonant frequency of the one or more resonant objects to be detuned by a fixed amount with respect to the fixed frequency. The feedback mechanism is configured to monitor an efficiency of the energy transfer, and adjust the resonant frequency of the one or more resonant objects to maximize the efficiency. The resonance angular frequencies for the resonator structures are selected to optimize the energy-transfer efficiency by accounting for both the strong-coupling factor U and the strong-interference interference factor V.

In an aspect, a method for wireless energy transfer includes providing a first resonator structure configured for energy transfer with a second resonator structure over a distance D, wherein the energy transfer is mediated by evanescent-tail coupling of a resonant field of the first resonator structure and a resonant field of the second resonator structure, with a coupling factor k, wherein said resonant field of the first resonator structure has a resonance angular frequency $\omega_1$, a resonance frequency-width $\Gamma_1$, and a resonance quality factor $Q_1=\omega_1/2\Gamma_1$, and is radiative in the far field, with an associated radiation quality factor $Q_{1,rad} \geq Q_1$, and resonant field of the second resonator structure has a resonance angular frequency $\omega_2$, a resonance frequency-width $\Gamma_2$, and a resonance quality factor $Q_2=\omega_2/2\Gamma_2$, and is radiative in the far field, with an associated radiation quality factor $Q_{2,rad} \geq Q_2$, wherein an absolute value of a difference of said angular frequencies $\omega_1$ and $\omega_2$ is smaller than broader of said resonant widths $\Gamma_1$ and $\Gamma_2$, and an average resonant angular frequency is defined as $\omega_o=\sqrt{\omega_1\omega_2}$, corresponding to an average resonant wavelength $\lambda_o=2\pi c/\omega_o$, where c is the speed of light in free space, and the strong-coupling factor is defined as $U=k\sqrt{Q_1Q_2}$, and employing interference between said radiative far fields of the resonant fields of the first and second resonator, with an interference factor $V_{rad}$, to reduce a total amount of radiation from the first and second resonator compared to an amount of radiation from the first and second resonator in the absence of interference, a strong-interference factor being defined as $V=V_{rad}\sqrt{(Q_1/Q_{1,rad})(Q_2/Q_{2,rad})}$.

The following are examples within the scope of this aspect.

The method has $Q_1/Q_{1,rad} \geq 0.01$ and $Q_2/Q_{2,rad} \geq 0.01$. During operation, a power generator is coupled to one of the first and second resonant structure and is configured to drive the resonator structure, to which it is coupled, at a driving frequency f, corresponding to a driving, angular frequency $\omega=2\pi f$, wherein the driving frequency is different from the resonance frequencies of the first and second resonator structures and is closer to a frequency corresponding to an odd normal mode of the system of the two resonator structures. During operation, a power load is coupled to the resonant structure to which the power generator is not coupled and is configured to receive from the resonator structure, to which it is coupled, a usable power. In an aspect, a method for wireless energy transfer includes providing a first resonator structure configured for energy transfer with a second resonator structure over a distance D, wherein the energy transfer is mediated by evanescent-tail coupling of a resonant field of the first resonator structure and a resonant field of the second resonator structure, with a coupling factor k, wherein said resonant field of the first resonator structure has a resonance angular frequency $\omega_1$, a resonance frequency-width $\Gamma_1$, and a resonance quality factor $Q_1=\omega_1/2\Gamma_1$, and is radiative in the far field, with an associated radiation quality factor $Q_{1,rad} \geq Q_1$, and said resonant field of the second resonator structure has a resonance angular frequency $\omega_2$, a resonance frequency-width $\Gamma_2$, and a resonance quality factor $Q_2=\omega_2/2\Gamma_2$, and is radiative in the far field, with an associated radiation quality factor $Q_{2,rad} \geq Q_2$, wherein an absolute value of the difference of said angular frequencies $\omega_1$ and $\omega_2$ is smaller than the broader of said resonant widths $\Gamma_1$ and $\Gamma_2$, and an average resonant angular frequency is defined as $\omega_o=\sqrt{\omega_1\omega_2}$, corresponding to an average resonant wavelength $\lambda_o=2\pi c/\omega_o$, where c is the speed of light in free space, and the strong-coupling factor is defined as $U=k\sqrt{Q_1Q_2}$, and employing interference between said radiative far fields of the resonant fields of the first and second resonator, with an interference factor $V_{rad}$, to increase efficiency of energy transfer between the first and second resonator compared to efficiency of energy transfer between the first and second resonator in the absence of interference, a strong-interference factor being defined as $V=V_{rad}\sqrt{(Q_1/Q_{1,rad})(Q_2/Q_{2,rad})}$.

The following are examples within the scope of this aspect.

The method has $Q_1/Q_{1,rad} \geq 0.05$ and $Q_2/Q_{2,rad} \geq 0.05$. During operation, a power generator is coupled to one of the first and second resonant structure and is configured to drive the resonator structure, to which it is coupled, at a driving frequency f, corresponding to a driving angular frequency $\omega=2\pi f$, wherein the driving frequency is different from the resonance frequencies of the first and second resonator structures and is closer to a frequency corresponding to an odd normal mode of the system of the two resonator structures. During operation, a power load is coupled to the resonant structure to which the power generator is not coupled and is configured to receive from the resonator structure, to which it is coupled, a usable power. The resonance angular frequencies for the resonator structures are selected to optimize the energy-transfer efficiency by accounting for both the strong-coupling factor U and the strong-interference interference factor V.

Various examples may include any of the above features, alone or in combination. Other features, objects, and advantages of the disclosure will be apparent from the following detailed description.

For example, in some embodiments $Q_1>100$ and $Q_2>100$, $Q_1>300$ and $Q_2>300$, $Q_1>500$ and $Q_2>500$, or $Q_1>1000$ and $Q_2>1000$. In some embodiments, $Q_1>100$ or $Q_2>100$, $Q_1>300$ or $Q_2>300$, $Q_1>500$ or $Q_2>500$, or $Q_1>1000$ or $Q_2>1000$. Furthermore, for example, in some embodiments, the coupling to loss ratio $$\frac{\kappa}{\sqrt{\Gamma_1\Gamma_2}} > 0.5, \quad \frac{\kappa}{\sqrt{\Gamma_1\Gamma_2}} > 1, \quad \frac{\kappa}{\sqrt{\Gamma_1\Gamma_2}} > 2, \quad \text{or} \quad \frac{\kappa}{\sqrt{\Gamma_1\Gamma_2}} > 5.$$

BRIEF DESCRIPTION OF THE DRAWINGS

FIG. 7 shows a comparison between experimental and theoretical results for the strong-coupling factor of the system shown schematically in FIG. 5.

FIG. 15 shows (a) an example of a resonant dielectric disk, and illustrates the surrounding field and (b) a wireless energy transfer scheme featuring two resonant dielectric disks, and illustrates the surrounding field.

DETAILED DESCRIPTION

1. Efficient Energy-Transfer by 'Strongly Coupled' Resonances

Figure 1:
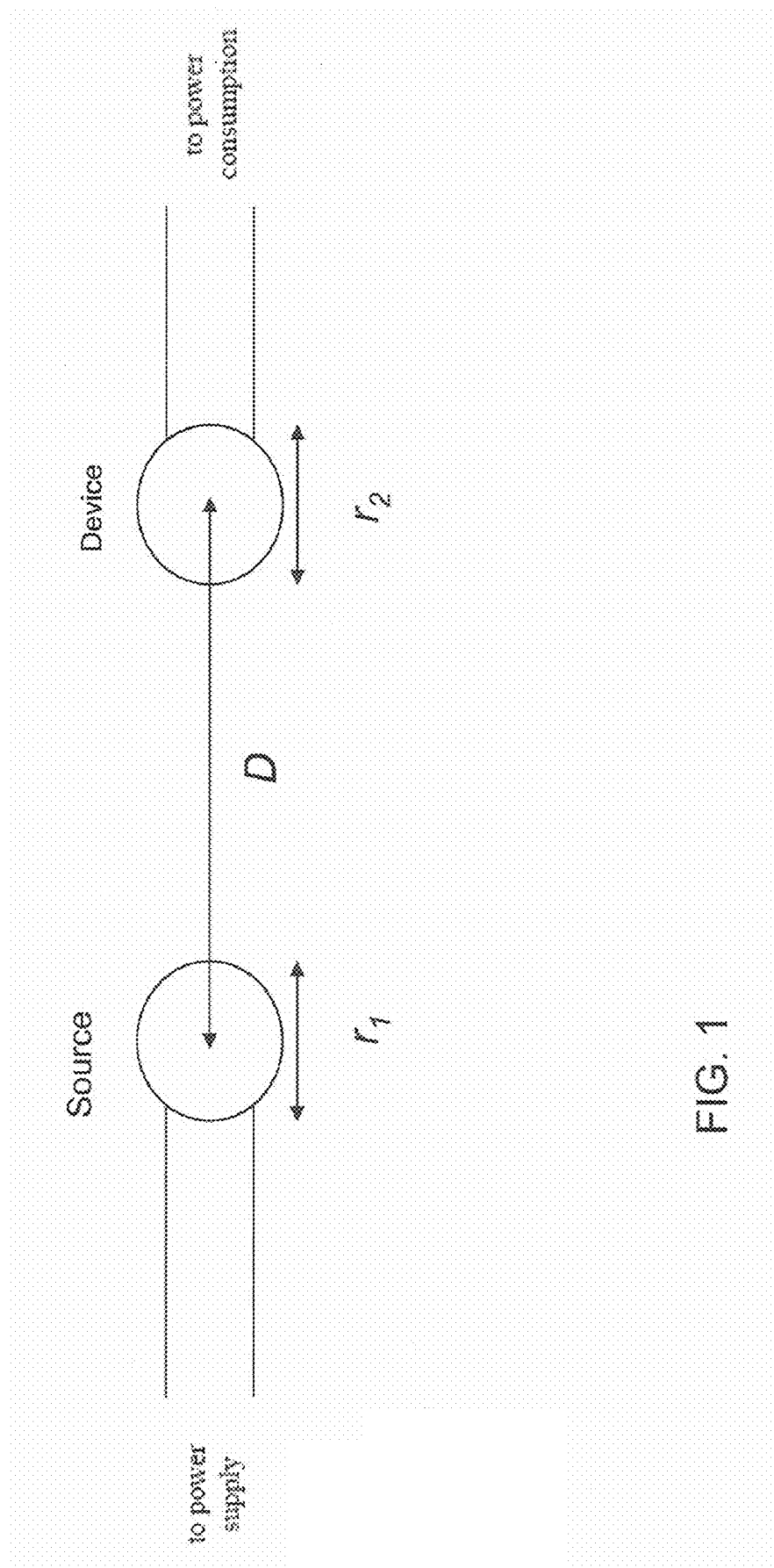
FIG. 1 shows a schematic of an example wireless energy transfer scheme.

FIG. 1 shows a schematic that generally describes one example of the invention, in which energy is transferred wirelessly between two resonant objects. Referring to FIG. 1, energy is transferred, over a distance D, between a resonant source object having a characteristic size $r_1$ and a resonant device object of characteristic size $r_2$. Both objects are resonant objects. The wireless non-radiative energy transfer is performed using the field (e.g. the electromagnetic field or acoustic field) of the system of two resonant objects.

The characteristic size of an object can be regarded as being equal to the radius of the smallest sphere which can fit around the entire object. The characteristic thickness of an object can be regarded as being, when placed on a flat surface in any arbitrary configuration, the smallest possible height of the highest point of the object above a flat surface. The characteristic width of an object can be regarded as being the radius of the smallest possible circle that the object can pass through while traveling in a straight line. For example, the characteristic width of a cylindrical object is the radius of the cylinder.

It is to be understood that while two resonant objects are shown in the example of FIG. 1, and in many of the examples below, other examples can feature three or more resonant objects. For example, in some examples, a single source object can transfer energy to multiple device objects. In some examples, energy can be transferred from a first resonant object to a second resonant object, and then from the second resonant object to a third resonant object, and so forth.

Initially, we present a theoretical framework for understanding non-radiative wireless energy transfer. Note however that it is to be understood that the scope of the invention is not bound by theory.

Different temporal schemes can be employed, depending on the application, to transfer energy between two resonant objects. Here we will consider two particularly simple but important schemes: a one-time finite-amount energy-transfer scheme and a continuous finite-rate energy-transfer (power) scheme.

1.1 Finite-Amount Energy-Transfer Efficiency

Let the source and device objects be 1, 2 respectively and their resonance eigenmodes, which we will use for the energy exchange, have angular frequencies $\omega_{1,2}$, frequency-widths due to intrinsic (absorption, radiation etc.) losses $\Gamma_{1,2}$ and (generally) vector fields $F_{1,2}(r)$, normalized to unity energy. Once the two resonant objects are brought in proximity, they can interact and an appropriate analytical framework for modeling this resonant interaction is that of the well-known coupled-mode theory (CMT). In this picture, the field of the system of the two resonant objects 1, 2 can be approximated by $F(r,t)=a_1(t)F_1(r)+a_2(t)F_2(r)$, where $a_{1,2}(t)$ are the field amplitudes, with $|a_{1,2}(t)|^2$ equal to the energy stored inside the object 1, 2 respectively, due to the normalization. Then, using $e^{-i\omega t}$ time dependence, the field amplitudes can be shown to satisfy, to lowest order:

$$\frac{d}{dt}a_1(t) = -i(\omega_1 - i\Gamma_1)a_1(t) + i\kappa_{11}a_1(t) + i\kappa_{12}a_2(t) \quad (1)$$

$$\frac{d}{dt}a_2(t) = -i(\omega_2 - i\Gamma_2)a_2(t) + i\kappa_{21}a_1(t) + i\kappa_{22}a_2(t)$$

where $\kappa_{11,22}$ are the shifts in each object's frequency due to the presence of the other, which are a second-order correction and can be absorbed into the eigenfrequencies by setting $\omega_{1,2} \to \omega_{1,2}+\kappa_{11,22}$, and $\kappa_{12,21}$ are the coupling coefficients, which from the reciprocity requirement of the system must satisfy $\kappa_{21}=\kappa_{12}\equiv\kappa$.

The normal modes of the combined system are found, by substituting $[a_1(t), a_2(t)]=[A_1, A_2]e^{-i\bar\omega t}$, to have complex frequencies $$\bar\omega_\pm = \frac{\omega_1+\omega_2}{2} - i\frac{\Gamma_1+\Gamma_2}{2} \pm \sqrt{\left(\frac{\omega_1-\omega_2}{2}-i\frac{\Gamma_1-\Gamma_2}{2}\right)^2 + \kappa^2} \quad (2)$$

whose splitting we denote as $\delta_E \equiv \bar\omega_+ - \bar\omega_-$. Note that, at exact resonance $\omega_1=\omega_2$ and for $\Gamma_1=\Gamma_2$, we get $\delta_E=2\kappa$.

Assume now that at time t=0 the source object 1 has finite energy $|a_1(0)|^2$, while the device object has $|a_2(0)|^2=0$. Since the objects are coupled, energy will be transferred from 1 to 2. With these initial conditions, Eqs. (1) can be solved, predicting the evolution of the device field-amplitude to be $$\frac{a_2(t)}{|a_1(0)|} = \frac{2\kappa}{\delta_E}\sin\left(\frac{\delta_E t}{2}\right)e^{-\frac{\Gamma_1+\Gamma_2}{2}t}. \quad (3)$$

The energy-transfer efficiency will be $\eta_E \equiv |a_2(t)|^2/|a_1(0)|^2$. Note that, at exact resonance $\omega_1=\omega_2$ and in the special case $\Gamma_1=\Gamma_2\equiv\Gamma_o$, Eq. (3) can be written as $$\frac{a_2(T)}{|a_1(0)|} = \sin(UT)\cdot e^{-T} \quad (4)$$

where $T\equiv\Gamma_o t$ and $U=\kappa/\Gamma_o$.

In some examples, the system designer can adjust the duration of the coupling t at will. In some examples, the duration t can be adjusted to maximize the device energy (and thus efficiency $\eta_E$). Then, in the special case $\Gamma_1=\Gamma_2\equiv\Gamma_o$, it can be inferred from Eq. (4) that $\eta_E$ is maximized for $$T_* = \frac{\tan^{-1}U}{U} \quad (5)$$

resulting in an optimal energy-transfer efficiency $$\eta_{E^*} \equiv \eta_E(T_*) = \frac{U^2}{1+U^2}\exp\left(-\frac{2\tan^{-1}U}{U}\right) \quad (6)$$

which is only a function of the coupling-to-loss ratio $U=\kappa/\Gamma_o$ and tends to unity when $U\gg 1$, as depicted in FIG. 2(c). In general, also for $\Gamma_1\neq\Gamma_2$, the energy transfer is nearly perfect, when the coupling rate is much faster than all loss rates ($\kappa/\Gamma_{1,2}\gg 1$).

In a real wireless energy-transfer system, the source object can be connected to a power generator (not shown in FIG. 1), and the device object can be connected to a power consuming load (e.g. a resistor, a battery, an actual device, not shown in FIG. 1). The generator will supply the energy to the source object, the energy will be transferred wirelessly and non-radiatively from the source object to the device object, and the load will consume the energy from the device object. To incorporate such supply and consumption mechanisms into this temporal scheme, in some examples, one can imagine that the generator is very briefly but very strongly coupled to the source at time t=0 to almost instantaneously provide the energy, and the load is similarly very briefly but very strongly coupled to the device at the optimal time t=t* to almost instantaneously drain the energy. For a constant powering mechanism, at time t=t* also the generator can again be coupled to the source to feed a new amount of energy, and this process can be repeated periodically with a period t*.

1.2 Finite-Rate Energy-Transfer (Power-Transmission) Efficiency

Let the generator be continuously supplying energy to the source object 1 at a rate $\kappa_1$ and the load continuously draining energy from the device object 2 at a rate $\kappa_2$. Field amplitudes $s_{\pm 1,2}(t)$ are then defined, so that $|s_{\pm 1,2}(t)|^2$ is equal to the power ingoing to (for the + sign) or outgoing from (for the − sign) the object 1, 2 respectively, and the CMT equations are modified to $$\frac{d}{dt}a_1(t) = -i(\omega_1 - i\Gamma_1)a_1(t) + \qquad (7)$$
$$i\kappa_{11}a_1(t) + i\kappa_{12}a_2(t) - \kappa_1 a_1(t) + \sqrt{2\kappa_1}\, s_{+1}(t)$$
$$\frac{d}{dt}a_2(t) = -i(\omega_2 - i\Gamma_2)a_2(t) + i\kappa_{21}a_1(t) + i\kappa_{22}a_2(t) - \kappa_2 a_2(t)$$
$$s_{-1}(t) = \sqrt{2\kappa_1}\, a_1(t) - s_{+1}(t)$$
$$s_{-2}(t) = \sqrt{2\kappa_2}\, a_2(t)$$

where again we can set $\omega_{1,2} \to \omega_{1,2} + \kappa_{11,22}$ and $\kappa_{21} \equiv \kappa_{12} \equiv \kappa$.

Assume now that the excitation is at a fixed frequency $\omega$, namely has the form $s_{+1}(t) = S_{+1}e^{i\omega t}$. Then the response of the linear system will be at the same frequency, namely $a_{1,2}(t) = A_{1,2}e^{-i\omega t}$ and $s_{-1,2}(t) = S_{-1,2}e^{-i\omega t}$. By substituting these into Eqs. (7), using $\delta_{1,2} \equiv \omega - \omega_{1,2}$, and solving the system, we find the field-amplitude transmitted to the load ($S_{21}$ scattering-matrix element)

$$S_{21} \equiv \frac{S_{-2}}{S_{+1}} \qquad (8)$$
$$= \frac{2i\kappa\sqrt{\kappa_1\kappa_2}}{(\Gamma_1 + \kappa_1 - i\delta_1)(\Gamma_2 + \kappa_2 - i\delta_2) + \kappa^2}$$
$$= \frac{2iU\sqrt{U_1 U_2}}{(1 + U_1 - iD_1)(1 + U_2 - iD_2) + U^2}.$$

and the field-amplitude reflected to the generator ($S_{11}$ scattering-matrix element)

$$S_{11} \equiv \frac{S_{-1}}{S_{+1}} \qquad (9)$$
$$= \frac{(\Gamma_1 - \kappa_1 - i\delta_1)(\Gamma_2 + \kappa_2 - i\delta_2) + \kappa^2}{(\Gamma_1 + \kappa_1 - i\delta_1)(\Gamma_2 + \kappa_2 - i\delta_2) + \kappa^2}$$
$$= \frac{(1 - U_1 - iD_1)(1 + U_2 - iD_2) + U^2}{(1 + U_1 - iD_1)(1 + U_2 - iD_2) + U^2}$$

where $D_{1,2} \equiv \delta_{1,2}/\Gamma_{1,2}$, $U_{1,2} \equiv \kappa_{1,2}/\Gamma_{1,2}$ and $U \equiv \kappa/\sqrt{\Gamma_1\Gamma_2}$. Similarly, the scattering-matrix elements $S_{12}$, $S_{22}$ are given by interchanging $1 \leftrightarrow 2$ in Eqs. (8), (9) and, as expected from reciprocity, $S_{21} = S_{12}$. The coefficients for power transmission (efficiency) and reflection and loss are respectively $\eta_P \equiv |S_{21}|^2 = |S_{-2}|^2/|S_{+1}|^2$ and $|S_{11}|^2 = |S_{-1}|^2/|S_{+1}|^2$ and $1 - |S_{21}|^2 - |S_{11}|^2 = (2\Gamma_1|A_1|^2 + 2\Gamma_2|A_2|^2)/|S_{+1}|^2$.

In practice, in some implementations, the parameters $D_{1,2}$, $U_{1,2}$ can be designed (engineered), since one can adjust the resonant frequencies $\omega_{1,2}$ (compared to the desired operating frequency $\omega$) and the generator/load supply/drain rates $\kappa_{1,2}$. Their choice can target the optimization of some system performance-characteristic of interest:

In some examples, a goal can be to maximize the power transmission (efficiency) $\eta_P \equiv |S_{21}|^2$ of the system, so one would require $$\eta'_P(D_{1,2}) = \eta'_P(U_{1,2}) = 0 \qquad (10)$$

Figure 2:
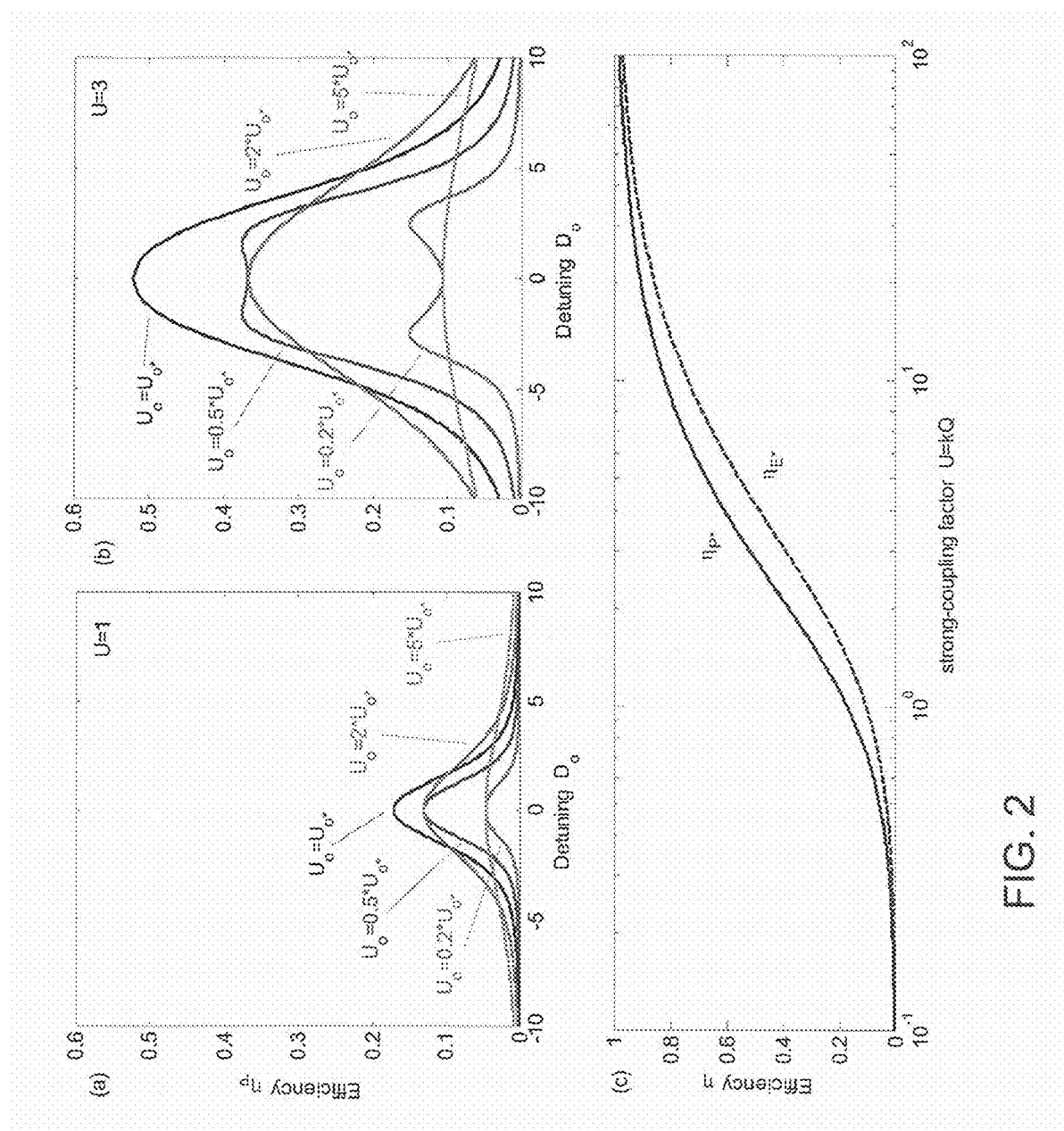
FIGS. 2(a)-(b) show the efficiency of power transmission $\eta_P$ for (a) U=1 and (b) U=3, as a function of the frequency detuning $D_o$ and for different values of the loading rate $U_o$.
FIG. 2(c) shows the optimal (for zero detuning and under conditions of impedance matching) efficiency for energy transfer $\eta_E^*$ and power transmission $\eta_P^*$, as a function of the coupling-to-loss figure-of-merit U.

Since $S_{21}$ (from Eq. (8)) is symmetric upon interchanging $1 \leftrightarrow 2$, the optimal values for $D_{1,2}$ (determined by Eqs. (10)) will be equal, namely $D_1 = D_2 \equiv D_o$, and similarly $U_1 = U_2 \equiv U_o$. Then, $$S_{21} = \frac{2iUU_o}{(1 + U_o - iD_o)^2 + U^2} \qquad (11)$$

and from the condition $\eta'_P(D_o) = 0$ we get that, for fixed values of $U$ and $U_o$, the efficiency can be maximized for the following values of the symmetric detuning $$D_o = \begin{cases} \pm\sqrt{U^2 - (1+U_o)^2}, & \text{if } U > 1 + U_o \\ 0, & \text{if } U \leq 1 + U_o \end{cases} \qquad (12)$$

which, in the case $U > 1 + U_o$, can be rewritten for the two frequencies at which the efficiency peaks as $$\omega_\pm = \frac{\omega_1\Gamma_2 + \omega_2\Gamma_1}{\Gamma_1 + \Gamma_2} \pm \frac{2\sqrt{\Gamma_1\Gamma_2}}{\Gamma_1 + \Gamma_2}\sqrt{\kappa^2 - (\Gamma_1 + \kappa_1)(\Gamma_2 + \kappa_2)}, \qquad (13)$$

whose splitting we denote as $\delta_P \equiv \overline{\omega}_+ - \overline{\omega}_-$. Note that, at exact resonance $\omega_1 = \omega_2$, and for $\Gamma_1 = \Gamma_2 \equiv \Gamma_o$ and $\kappa_1 = \kappa_2 \equiv \kappa_o$, we get $\delta_P = 2\sqrt{\kappa^2 - (\Gamma_o + \kappa_o)^2} < \delta_E$, namely the transmission-peak splitting is smaller than the normal-mode splitting. Then, by substituting $D_o$ into $\eta_P$ from Eq. (12), from the condition $\eta'_P(U_o) = 0$ we get that, for fixed value of $U$, the efficiency can be maximized for $$U_o^* = \sqrt{1 + U^2} \Rightarrow D_o^* = 0 \qquad (14)$$

which is known as 'critical coupling' condition, whereas for $U_o < U_o^*$, the system is called 'undercoupled' and for $U_o > U_o^*$, it is called 'overcoupled'. The dependence of the efficiency on the frequency detuning $D_o$ for different values of $U_o$ (including the 'critical-coupling' condition) are shown in FIG. 2(a, b). The overall optimal power efficiency using Eqs. (14) is $$\eta_{P^*} \equiv \eta_P(D_{o^*}, U_{o^*}) = \frac{U_{o^*} - 1}{U_{o^*} + 1} = \left(\frac{U}{1 + \sqrt{1 + U^2}}\right)^2, \qquad (15)$$

which is again only a function of the coupling-to-loss ratio $U = \kappa/\sqrt{\Gamma_1\Gamma_2}$ and tends to unity when $U \gg 1$, as depicted in FIG. 2(c).

In some examples, a goal can be to minimize the power reflection at the side of the generator $|S_{11}|^2$ and the load $|S_{22}|^2$, so one would then need $$S_{11,22} = 0 \Rightarrow (1 \mp U_1 - iD_1)(1 \pm U_2 - iD_2) + U^2 = 0, \qquad (16)$$

The equations above present 'impedance matching' conditions. Again, the set of these conditions is symmetric upon interchanging $1 \leftrightarrow 2$, so, by substituting $D_1 = D_2 \equiv D_o$ and $U_1 = U_2 \equiv U_o$ into Eqs. (16), we get $$(1 - iD_o)^2 - U_o^2 + U^2 = 0, \qquad (17)$$

from which we easily find that the values of $D_o$ and $U_o$ that cancel all reflections are again exactly those in Eqs. (14).

It can be seen that, for this particular problem, the two goals and their associated sets of conditions (Eqs. (10) and Eqs. (16)) result in the same optimized values of the intra-source and intra-device parameters $D_{1,2}$, $U_{1,2}$. Note that for a lossless system this would be an immediate consequence of power conservation (Hermiticity of the scattering matrix), but this is not apparent for a lossy system.

Accordingly, for any temporal energy-transfer scheme, once the parameters specific only to the source or to the device (such as their resonant frequencies and their excitation or loading rates respectively) have been optimally designed, the efficiency monotonically increases with the ratio of the source-device coupling-rate to their loss rates. Using the definition of a resonance quality factor $Q=\omega/2\Gamma$ and defining by analogy the coupling factor $k\equiv 1/Q_\kappa \equiv 2\kappa/\sqrt{\omega_1\omega_2}$, it is therefore exactly this ratio $$U = \frac{\kappa}{\sqrt{\Gamma_1\Gamma_2}} = k\sqrt{Q_1 Q_2} \qquad (18)$$

that has been set as a figure-of-merit for any system under consideration for wireless energy-transfer, along with the distance over which this ratio can be achieved (clearly, U will be a decreasing function of distance). The desired optimal regime U>1 is called 'strong-coupling' regime and it is a necessary and sufficient condition for efficient energy-transfer. In particular, for U>1 we get, from Eq. (15), $\eta_P^*$>17%, large enough for practical applications. The figure-of-merit U is called the strong-coupling factor. We will further show how to design systems with a large strong-coupling factor.

To achieve a large strong-coupling factor U, in some examples, the energy-transfer application preferably uses resonant modes of high quality factors Q, corresponding to low (i.e. slow) intrinsic-loss rates $\Gamma$. This condition can be satisfied by designing resonant modes where all loss mechanisms, typically radiation and absorption, are sufficiently suppressed.

This suggests that the coupling be implemented using, not the lossy radiative far-field, which should rather be suppressed, but the evanescent (non-lossy) stationary near-field. To implement an energy-transfer scheme, usually more appropriate are finite objects, namely ones that are topologically surrounded everywhere by air, into where the near field extends to achieve the coupling. Objects of finite extent do not generally support electromagnetic states that are exponentially decaying in all directions in air away from the objects, since Maxwell's Equations in free space imply that $k^2=\omega^2/c^2$, where k is the wave vector, $\omega$ the angular frequency, and c the speed of light, because of which one can show that such finite objects cannot support states of infinite Q, rather there always is some amount of radiation. However, very long-lived (so-called "high-Q") states can be found, whose tails display the needed exponential or exponential-like decay away from the resonant object over long enough distances before they turn oscillatory (radiative). The limiting surface, where this change in the field behavior happens, is called the "radiation caustic", and, for the wireless energy-transfer scheme to be based on the near field rather than the far/radiation field, the distance between the coupled objects must be such that one lies within the radiation caustic of the other. One typical way of achieving a high radiation-Q ($Q_{rad}$) is to design subwavelength resonant objects. When the size of an object is much smaller than the wavelength of radiation in free space, its electromagnetic field couples to radiation very weakly. Since the extent of the near-field into the area surrounding a finite-sized resonant object is set typically by the wavelength, in some examples, resonant objects of subwavelength size have significantly longer evanescent field-tails. In other words, the radiation caustic is pushed far away from the object, so the electromagnetic mode enters the radiative regime only with a small amplitude.

Moreover, most realistic materials exhibit some nonzero amount of absorption, which can be frequency dependent, and thus cannot support states of infinite Q, rather there always is some amount of absorption. However, very long-lived ("high-Q") states can be found, where electromagnetic modal energy is only weakly dissipated. Some typical ways of achieving a high absorption-Q ($Q_{abs}$) is to use materials which exhibit very small absorption at the resonant frequency and/or to shape the field to be localized more inside the least lossy materials.

Furthermore, to achieve a large strong-coupling factor U, in some examples, the energy-transfer application preferably uses systems that achieve a high coupling factor k, corresponding to strong (i.e. fast) coupling rate $\kappa$, over distances larger than the characteristic sizes of the objects.

Since finite-sized subwavelength resonant objects can often be accompanied with a high Q, as was discussed above and will be seen in examples later on, such an object will typically be the appropriate choice for the possibly-mobile resonant device-object. In these cases, the electromagnetic field is, in some examples, of quasi-static nature and the distance, up to which sufficient coupling can be achieved, is dictated by the decay-law of this quasi-static field.

Note, though, that in some examples, the resonant source-object will be immobile and thus less restricted in its allowed geometry and size. It can be therefore chosen large enough that the near-field extent is not limited by the wavelength, and can thus have nearly infinite radiation-Q. Some objects of nearly infinite extent, such as dielectric waveguides, can support guided modes, whose evanescent tails are decaying exponentially in the direction away from the object, slowly if tuned close to cutoff, therefore a good coupling can also be achieved over distances quite a few times larger than a characteristic size of the source- and/or device-object.

2 'Strongly-Coupled' Resonances at Mid-Range Distances for Realistic Systems

In the following, examples of systems suitable for energy transfer of the type described above are described. We will demonstrate how to compute the CMT parameters $\omega_{1,2}$, $Q_{1,2}$ and k described above and how to choose or design these parameters for particular examples in order to produce a desirable figure-of-merit $U=\kappa/\sqrt{\Gamma_1\Gamma_2}=k\sqrt{Q_1 Q_2}$ at a desired distance D. In some examples, this figure-of-merit is maximized when $\omega_{1,2}$ are tuned close to a particular angular frequency $\omega_U$.

2.1 Self-Resonant Conducting Coils

Figure 3:
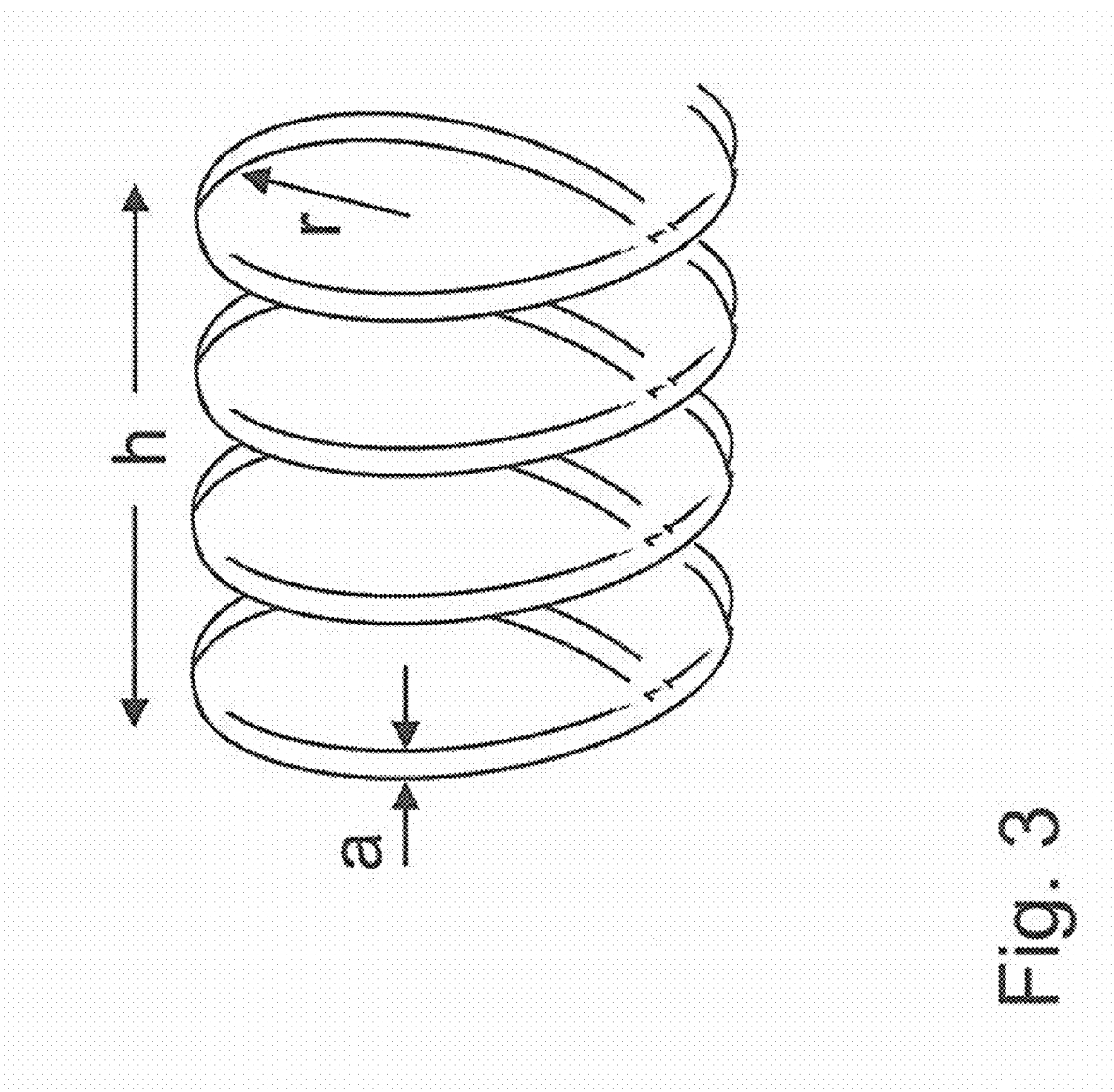
FIG. 3 shows an example of a self-resonant conducting-wire coil.

In some examples, one or more of the resonant objects are self-resonant conducting coils. Referring to FIG. 3, a conducting wire of length l and cross-sectional radius a is wound into a helical coil of radius r and height h (namely with N=$\sqrt{l^2-h^2}/2\pi r$ number of turns), surrounded by air. As described below, the wire has distributed inductance and distributed capacitance, and therefore it supports a resonant mode of angular frequency $\omega$. The nature of the resonance lies in the periodic exchange of energy from the electric field within the capacitance of the coil, due to the charge distribution $\rho(x)$ across it, to the magnetic field in free space, due to the current distribution $j(x)$ in the wire. In particular, the charge conservation equation $\nabla\cdot j=i\omega\rho$ implies that: (i) this periodic exchange is accompanied by a $\pi/2$ phase-shift between the current and the charge density profiles, namely the energy W contained in the coil is at certain points in time completely due to the current and at other points in time completely due to the charge, and (ii) if $\rho_l(x)$ and I(x) are respectively the linear charge and current densities in the wire, where x runs along the wire, $$q_o = \frac{1}{2}\int dx |\rho_l(x)|$$

is the maximum amount of positive charge accumulated in one side of the coil (where an equal amount of negative charge always also accumulates in the other side to make the system neutral) and $I_o = \max\{|I(x)|\}$ is the maximum positive value of the linear current distribution, then $I_o = \omega q_o$. Then, one can define an effective total inductance L and an effective total capacitance C of the coil through the amount of energy W inside its resonant mode:

$$W \equiv \frac{1}{2}I_o^2 L \Rightarrow L = \frac{\mu_o}{4\pi I_o^2}\int\int dxdx' \frac{j(x)\cdot j(x')}{|x-x'|}, \quad (19)$$

$$W \equiv \frac{1}{2}q_o^2\frac{1}{C} \Rightarrow \frac{1}{C} = \frac{1}{4\pi\varepsilon_o q_o^2}\int\int dxdx' \frac{\rho(x)\rho(x')}{|x-x'|}, \quad (20)$$

where $\mu_o$ and $\varepsilon_o$ are the magnetic permeability and electric permittivity of free space.

With these definitions, the resonant angular frequency and the effective impedance can be given by the formulas $\omega = 1/\sqrt{LC}$ and $Z = \sqrt{L/C}$ respectively.

Losses in this resonant system consist of ohmic (material absorption) loss inside the wire and radiative loss into free space. One can again define a total absorption resistance $R_{abs}$ from the amount of power absorbed inside the wire and a total radiation resistance $R_{rad}$ from the amount of power radiated due to electric- and magnetic-dipole radiation:

$$P_{abs} \equiv \frac{1}{2}I_o^2 R_{abs} \Rightarrow R_{abs} \approx \zeta_c \frac{l}{2\pi a}\cdot\frac{I_{rms}^2}{I_o^2} \quad (21)$$

$$P_{rad} \equiv \frac{1}{2}I_o^2 R_{rad} \Rightarrow R_{rad} \approx \frac{\zeta_o}{6\pi}\left[\left(\frac{\omega|p|}{c}\right)^2 + \left(\frac{\omega\sqrt{|m|}}{c}\right)^4\right], \quad (22)$$

where $c = 1/\sqrt{\mu_o\varepsilon_o}$ and $\zeta_o = \sqrt{\mu_o/\varepsilon_o}$ are the light velocity and light impedance in free space, the impedance $\zeta_c$ is $\zeta_c = 1/\sigma\delta = \sqrt{\mu_o\omega/2\sigma}$ with $\sigma$ the conductivity of the conductor and $\delta$ the skin depth at the frequency $\omega$, $$I_{rms}^2 = \frac{1}{l}\int dx |I(x)|^2, \quad p = \int dx r \rho_l(x)$$

is the electric-dipole moment of the coil and $$m = \frac{1}{2}\int dx r \times j(x)$$

is the magnetic-dipole moment of the coil. For the radiation resistance formula Eq. (22), the assumption of operation in the quasi-static regime (h, r<<$\lambda$=$2\pi c/\omega$) has been used, which is the desired regime of a subwavelength resonance. With these definitions, the absorption and radiation quality factors of the resonance are given by $Q_{abs} = Z/R_{abs}$ and $Q_{rad} = Z/R_{rad}$ respectively.

From Eq. (19)-(22) it follows that to determine the resonance parameters one simply needs to know the current distribution j in the resonant coil. Solving Maxwell's equations to rigorously find the current distribution of the resonant electromagnetic eigenmode of a conducting-wire coil is more involved than, for example, of a standard LC circuit, and we can find no exact solutions in the literature for coils of finite length, making an exact solution difficult. One could in principle write down an elaborate transmission-line-like model, and solve it by brute force. We instead present a model that is (as described below) in good agreement (~5%) with experiment. Observing that the finite extent of the conductor forming each coil imposes the boundary condition that the current has to be zero at the ends of the coil, since no current can leave the wire, we assume that the resonant mode of each coil is well approximated by a sinusoidal current profile along the length of the conducting wire. We shall be interested in the lowest mode, so if we denote by x the coordinate along the conductor, such that it runs from $-l/2$ to $+l/2$, then the current amplitude profile would have the form $I(x) = I_o \cos(\pi x/l)$, where we have assumed that the current does not vary significantly along the wire circumference for a particular x, a valid assumption provided a<<r. It immediately follows from the continuity equation for charge that the linear charge density profile should be of the form $\rho_l(x) = \rho_o \sin(\pi x/l)$, and thus $q_o = \int_0^{l/2} dx \rho_o |\sin(\pi x/l)| = \rho_o l/\pi$. Using these sinusoidal profiles we find the so-called "self-inductance" $L_s$ and "self-capacitance" $C_s$ of the coil by computing numerically the integrals Eq. (19) and (20); the associated frequency and effective impedance are $\omega_s$ and $Z_s$ respectively. The "self-resistances" $R_s$ are given analytically by Eq. (21) and (22) using $$I_{rms}^2 = \frac{1}{l}\int_{-l/2}^{l/2} dx|I_o\cos(\pi x/l)|^2 = \frac{1}{2}I_o^2,$$

$$|p| = q_o\sqrt{\left(\frac{2}{\pi}h\right)^2 + \left(\frac{4N\cos(\pi N)}{(4N^2-1)\pi}r\right)^2}$$

and $$|m| = I_o\sqrt{\left(\frac{2}{\pi}N\pi r^2\right)^2 + \left(\frac{\cos(\pi N)(12N^2-1) - \sin(\pi N)\pi N(4N^2-1)}{(16N^4 - 8N^2 + 1)\pi}hr\right)^2},$$

and therefore the associated $Q_s$ factors can be calculated.

The results for two examples of resonant coils with subwavelength modes of $\lambda_s/r \geq 70$ (i.e. those highly suitable for near-field coupling and well within the quasi-static limit) are presented in Table 1. Numerical results are shown for the wavelength and absorption, radiation and total loss rates, for the two different cases of subwavelength-coil resonant modes. Note that, for conducting material, copper ($\sigma = 5.998 \cdot 10^{\wedge}-7$ S/m) was used. It can be seen that expected quality factors at microwave frequencies are $Q_{s,abs} \geq 1000$ and $Q_{s,rad} \geq 5000$.

TABLE 1

| single coil | $\lambda_s/r$ | f (MHz) | $Q_{s,rad}$ | $Q_{s,abs}$ | $Q_s$ |
|---|---|---|---|---|---|
| r = 30 cm, h = 20 cm, a = 1 cm, N = 4 | 74.7 | 13.39 | 4164 | 8170 | 2758 |
| r = 10 cm, h = 3 cm, a = 2 mm, N = 6 | 140 | 21.38 | 43919 | 3968 | 3639 |

Figure 4:
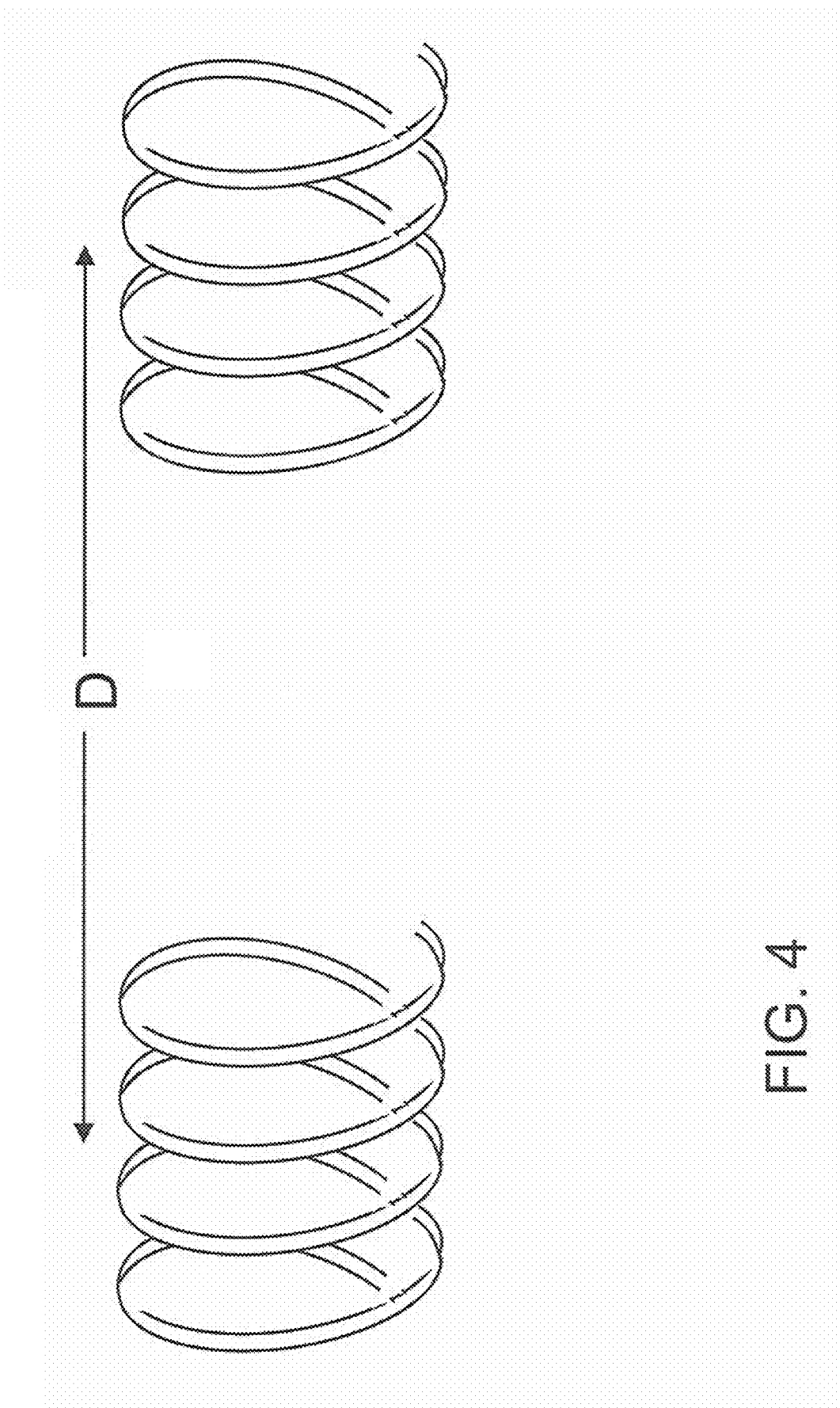
FIG. 4 shows an example of a wireless energy transfer scheme featuring two self-resonant conducting-wire coils

Referring to FIG. 4, in some examples, energy is transferred between two self-resonant conducting-wire coils. The electric and magnetic fields are used to couple the different resonant conducting-wire coils at a distance D between their centers. Usually, the electric coupling highly dominates over the magnetic coupling in the system under consideration for coils with h>>2r and, oppositely, the magnetic coupling highly dominates over the electric coupling for coils with h<<2r. Defining the charge and current distributions of two coils 1,2 respectively as $\rho_{1,2}(x)$ and $j_{1,2}(x)$, total charges and peak currents respectively as $q_{1,2}$ and $I_{1,2}$, and capacitances and inductances respectively as $C_{1,2}$ and $L_{1,2}$ which are the analogs of $\rho(x)$, $j(x)$, $q_o$, $I_o$, C and L for the single-coil case and are therefore well defined, we can define their mutual capacitance and inductance through the total energy:

$$W \equiv W_1 + W_2 + \frac{1}{2}(q_1^* q_2 + q_2^* q_1)/M_C + \frac{1}{2}(I_1^* I_2 + I_2^* I_1)M_L \quad (23)$$

$$\Rightarrow 1/M_C = \frac{1}{4\pi\varepsilon_o q_1 q_2} \int\int dx dx' \frac{\rho_1(x)\rho_2(x')}{|x-x'|} u,$$

$$M_L = \frac{\mu_o}{4\pi I_1 I_2} \int\int dx dx' \frac{j_1(x) \cdot j_2(x')}{|x-x'|} u,$$

where $$W_1 = \frac{1}{2}q_1^2/C_1 = \frac{1}{2}I_1^2 L_1, \quad W_2 = \frac{1}{2}q_2^2/C_2 = \frac{1}{2}I_2^2 L_2$$

and the retardation factor of $u=\exp(i\omega|x-x'|/c)$ inside the integral can been ignored in the quasi-static regime $D\ll\lambda$ of interest, where each coil is within the near field of the other. With this definition, the coupling factor is given by $k=\sqrt{C_1 C_2}/M_C + M_L/\sqrt{L_1 L_2}$.

Therefore, to calculate the coupling rate between two self-resonant coils, again the current profiles are needed and, by using again the assumed sinusoidal current profiles, we compute numerically from Eq. (23) the mutual capacitance $M_{C,s}$ and inductance $M_{L,s}$ between two self-resonant coils at a distance D between their centers, and thus $k=1/Q_\kappa$ is also determined.

TABLE 2

| pair of coils | D/r | Q | $Q_\kappa = 1/k$ | U |
|---|---|---|---|---|
| r = 30 cm, h = 20 cm, | 3 | 2758 | 38.9 | 70.9 |
| a = 1 cm, N = 4 | 5 | 2758 | 139.4 | 19.8 |
| $\lambda/r \approx 75$ | 7 | 2758 | 333.0 | 8.3 |
| $Q_s^{abs} \approx 8170, Q_s^{rad} \approx 4164$ | 10 | 2758 | 818.9 | 3.4 |
| r = 10 cm, h = 3 cm, | 3 | 3639 | 61.4 | 59.3 |
| a = 2 mm, N = 6 | 5 | 3639 | 232.5 | 15.7 |
| $\lambda/r \approx 140$ | 7 | 3639 | 587.5 | 6.2 |
| $Q_s^{abs} \approx 3968, Q_s^{rad} \approx 43919$ | 10 | 3639 | 1580 | 2.3 |

Referring to Table 2, relevant parameters are shown for exemplary examples featuring pairs or identical self resonant coils. Numerical results are presented for the average wavelength and loss rates of the two normal modes (individual values not shown), and also the coupling rate and figure-of-merit as a function of the coupling distance D, for the two cases of modes presented in Table 1. It can be seen that for medium distances D/r=10–3 the expected coupling-to-loss ratios are in the range U~2-70.

2.1.1 Experimental Results

Figure 5:
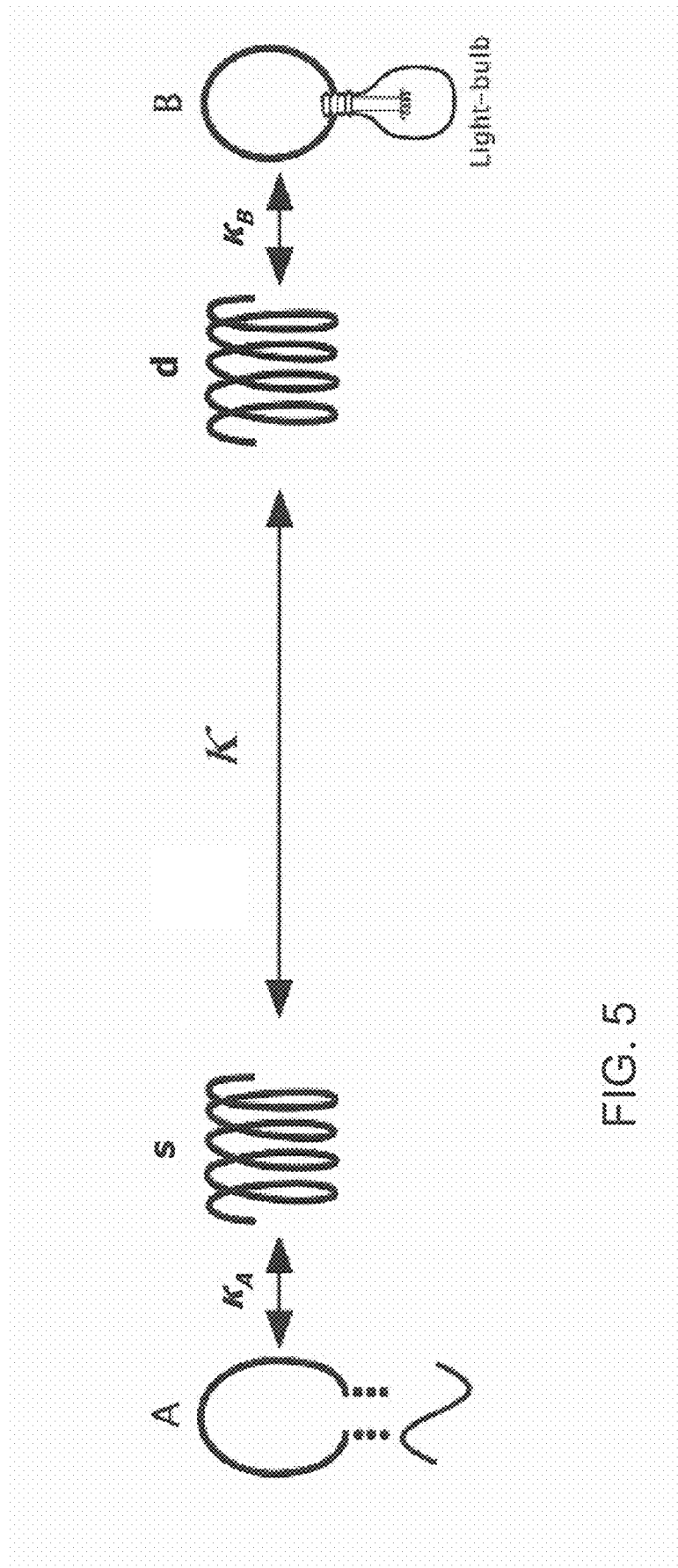
FIG. 5 is a schematic of an experimental system demonstrating wireless energy transfer.

An experimental realization of an example of the above described system for wireless energy transfer consists of two self-resonant coils of the type described above, one of which (the source coil) is coupled inductively to an oscillating circuit, and the second (the device coil) is coupled inductively to a resistive load, as shown schematically in FIG. 5. Referring to FIG. 5, A is a single copper loop of radius 25 cm that is part of the driving circuit, which outputs a sine wave with frequency 9.9 MHz. s and d are respectively the source and device-coils referred to in the text. B is a loop of wire attached to the load ("light-bulb"). The various κ's represent direct couplings between the objects. The angle between coil d and the loop A is adjusted so that their direct coupling is zero, while coils s and d are aligned coaxially. The direct coupling between B and A and between B and s is negligible.

The parameters for the two identical helical coils built for the experimental validation of the power transfer scheme were h=20 cm, a=3 mm, r=30 cm and N=5.25. Both coils are made of copper. Due to imperfections in the construction, the spacing between loops of the helix is not uniform, and we have encapsulated the uncertainty about their uniformity by attributing a 10% (2 cm) uncertainty to h. The expected resonant frequency given these dimensions is $f_0$=10.56±0.3 MHz, which is about 5% off from the measured resonance at around 9.90 MHz.

The theoretical Q for the loops is estimated to be ~2500 (assuming perfect copper of resistivity $\rho=1/\sigma=1.7\times10^{-8}$ $\Omega$m) but the measured value is 950±50. We believe the discrepancy is mostly due to the effect of the layer of poorly conducting copper oxide on the surface of the copper wire, to which the current is confined by the short skin depth (~20 μm) at this frequency. We have therefore used the experimentally observed Q (and $\Gamma_1=\Gamma_2=\Gamma=\omega/(2Q)$ derived from it) in all subsequent computations.

Figure 6:
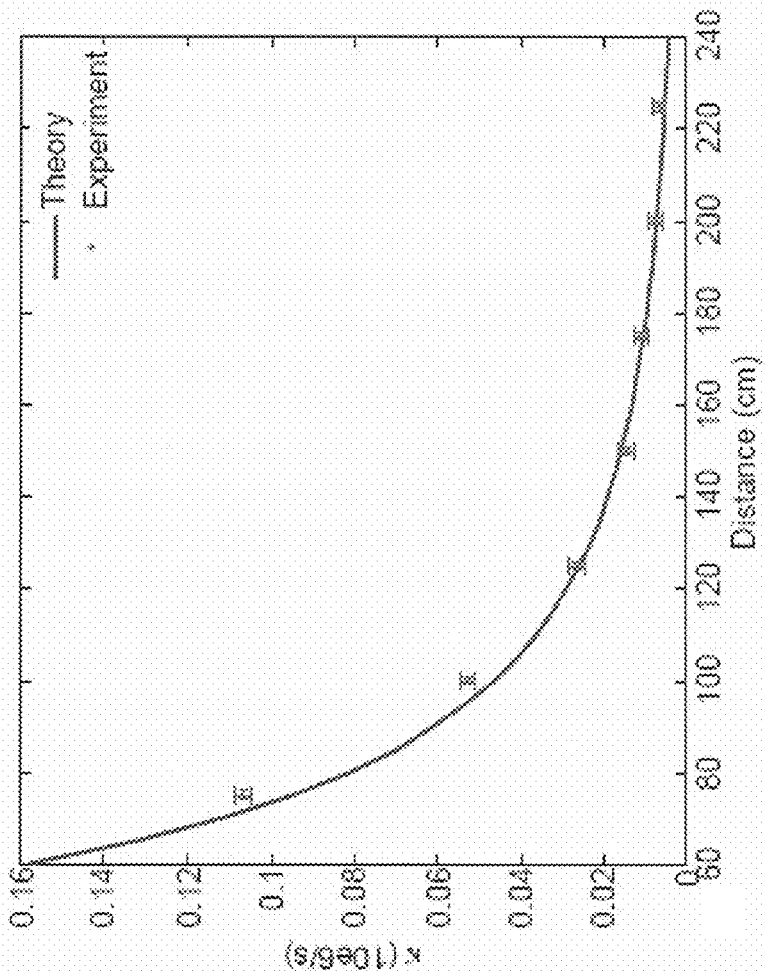
FIG. 6 shows a comparison between experimental and theoretical results for the coupling rate of the system shown schematically in FIG. 5.

The coupling coefficient κ can be found experimentally by placing the two self-resonant coils (fine-tuned, by slightly adjusting h, to the same resonant frequency when isolated) a distance D apart and measuring the splitting in the frequencies of the two resonant modes in the transmission spectrum. According to Eq. (13) derived by coupled-mode theory, the splitting in the transmission spectrum should be $\delta_P=2\sqrt{\kappa^2-\Gamma^2}$, when $\kappa_{A,B}$ are kept very small by keeping A and B at a relatively large distance. The comparison between experimental and theoretical results as a function of distance when the two the coils are aligned coaxially is shown in FIG. 6.

FIG. 7 shows a comparison of experimental and theoretical values for the strong-coupling factor $U=\kappa/\Gamma$ as a function of the separation between the two coils. The theory values are obtained by using the theoretically obtained κ and the experimentally measured Γ. The shaded area represents the spread in the theoretical U due to the ~5% uncertainty in Q. As noted above, the maximum theoretical efficiency depends only on the parameter U, which is plotted as a function of distance in FIG. 7. U is greater than 1 even for D=2.4 m (eight times the radius of the coils), thus the system is in the strongly-coupled regime throughout the entire range of distances probed.

The power-generator circuit was a standard Colpitts oscillator coupled inductively to the source coil by means of a single loop of copper wire 25 cm in radius (see FIG. 5). The load consisted of a previously calibrated light-bulb, and was attached to its own loop of insulated wire, which was in turn placed in proximity of the device coil and inductively coupled to it. Thus, by varying the distance between the light-bulb and the device coil, the parameter $U_B=\kappa_B/\Gamma$ was adjusted so that it matched its optimal value, given theoretically by Eq. (14) as $U_B^*=\sqrt{1+U^2}$. Because of its inductive nature, the loop connected to the light-bulb added a small reactive component to $\kappa_B$ which was compensated for by slightly retuning the coil. The work extracted was determined by adjusting the power going into the Colpitts oscillator until the light-bulb at the load was at its full nominal brightness.

Figure 8:
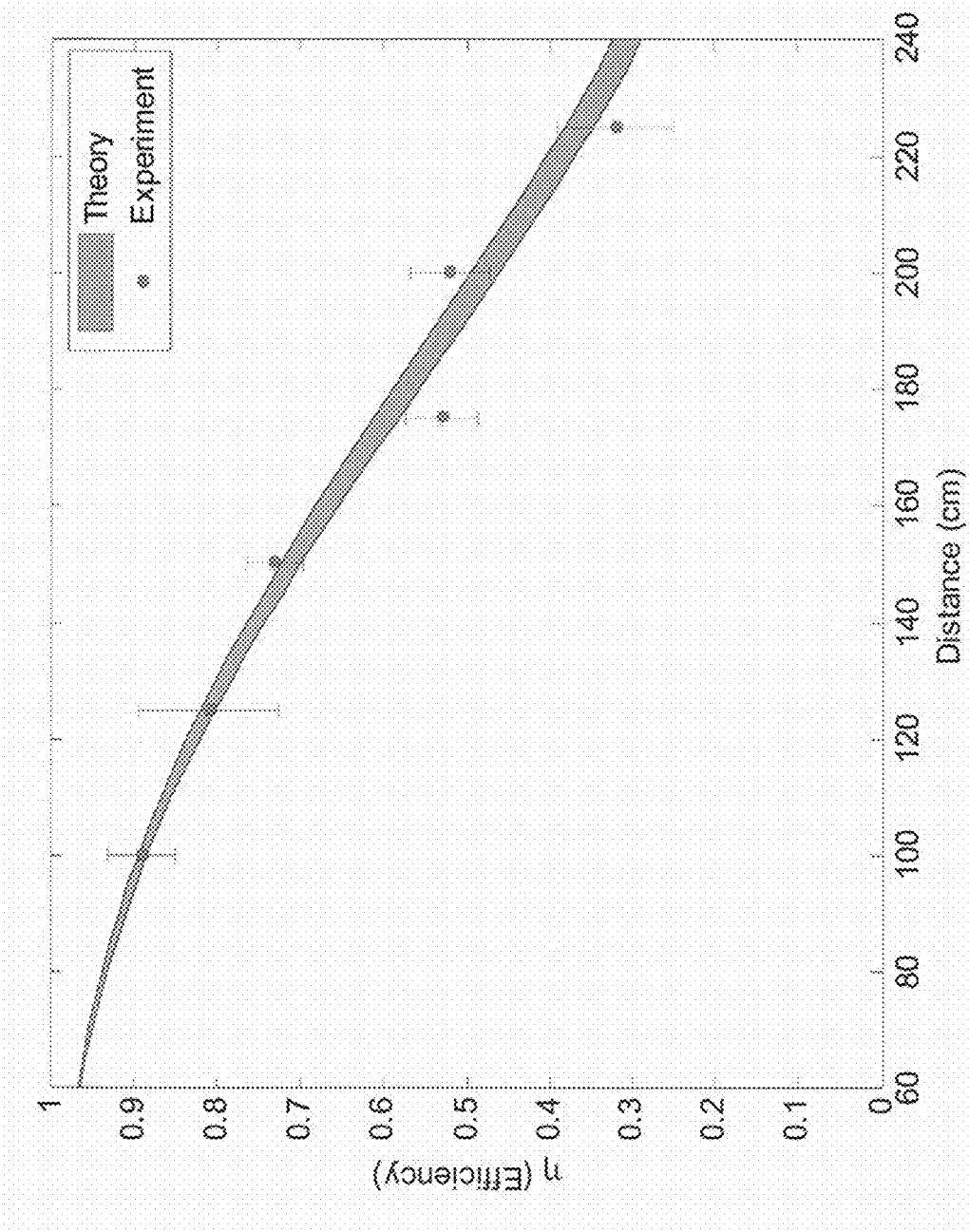
FIG. 8 shows a comparison between experimental and theoretical results for the power-transmission efficiency of the system shown schematically in FIG. 5.

In order to isolate the efficiency of the transfer taking place specifically between the source coil and the load, we measured the current at the mid-point of each of the self-resonant coils with a current-probe (which was not found to lower the Q of the coils noticeably.) This gave a measurement of the current parameters $I_1$ and $I_2$ defined above. The power dissipated in each coil was then computed from $P_{1,2}=\Gamma L|I_{1,2}|^2$, and the efficiency was directly obtained from $\eta=P_B/(P_1+P_2+P_B)$. To ensure that the experimental setup was well described by a two-object coupled-mode theory model, we positioned the device coil such that its direct coupling to the copper loop attached to the Colpitts oscillator was zero. The experimental results are shown in FIG. 8, along with the theoretical prediction for maximum efficiency, given by Eq. (15).

Using this example, we were able to transmit significant amounts of power using this setup from the source coil to the device coil, fully lighting up a 60 W light-bulb from distances more than 2 m away, for example. As an additional test, we also measured the total power going into the driving circuit. The efficiency of the wireless power-transmission itself was hard to estimate in this way, however, as the efficiency of the Colpitts oscillator itself is not precisely known, although it is expected to be far from 100%. Nevertheless, this gave an overly conservative lower bound on the efficiency. When transmitting 60 W to the load over a distance of 2 m, for example, the power flowing into the driving circuit was 400 W. This yields an overall wall-to-load efficiency of ~15%, which is reasonable given the expected ~40% efficiency for the wireless power transmission at that distance and the low efficiency of the driving circuit.

From the theoretical treatment above, we see that in typical examples it is important that the coils be on resonance for the power transmission to be practical. We found experimentally that the power transmitted to the load dropped sharply as one of the coils was detuned from resonance. For a fractional detuning $\Delta f/f_0$ of a few times the inverse loaded Q, the induced current in the device coil was indistinguishable from noise.

The power transmission was not found to be visibly affected as humans and various everyday objects, such as metallic and wooden furniture, as well as electronic devices large and small, were placed between the two coils, even when they drastically obstructed the line of sight between source and device. External objects were found to have an effect only when they were closer than 10 cm from either one of the coils. While some materials (such as aluminum foil, styrofoam and humans) mostly just shifted the resonant frequency, which could in principle be easily corrected with a feedback circuit of the type described earlier, others (cardboard, wood, and PVC) lowered Q when placed closer than a few centimeters from the coil, thereby lowering the efficiency of the transfer.

This method of power transmission is believed safe for humans. When transmitting 60 W (more than enough to power a laptop computer) across 2 m, we estimated that the magnitude of the magnetic field generated is much weaker than the Earth's magnetic field for all distances except for less than about 1 cm away from the wires in the coil, an indication of the safety of the scheme even after long-term use. The power radiated for these parameters was ~5 W, which is roughly an order of magnitude higher than cell phones but could be drastically reduced, as discussed below.

Although the two coils are currently of identical dimensions, it is possible to make the device coil small enough to fit into portable devices without decreasing the efficiency. One could, for instance, maintain the product of the characteristic sizes of the source and device coils constant.

These experiments demonstrated experimentally a system for power transmission over medium range distances, and found that the experimental results match theory well in multiple independent and mutually consistent tests.

The efficiency of the scheme and the distances covered can be appreciably improved by silver-plating the coils, which should increase their Q, or by working with more elaborate geometries for the resonant objects. Nevertheless, the performance characteristics of the system presented here are already at levels where they could be useful in practical applications.

2.2 Capacitively-Loaded Conducting Loops or Coils

Figure 9:
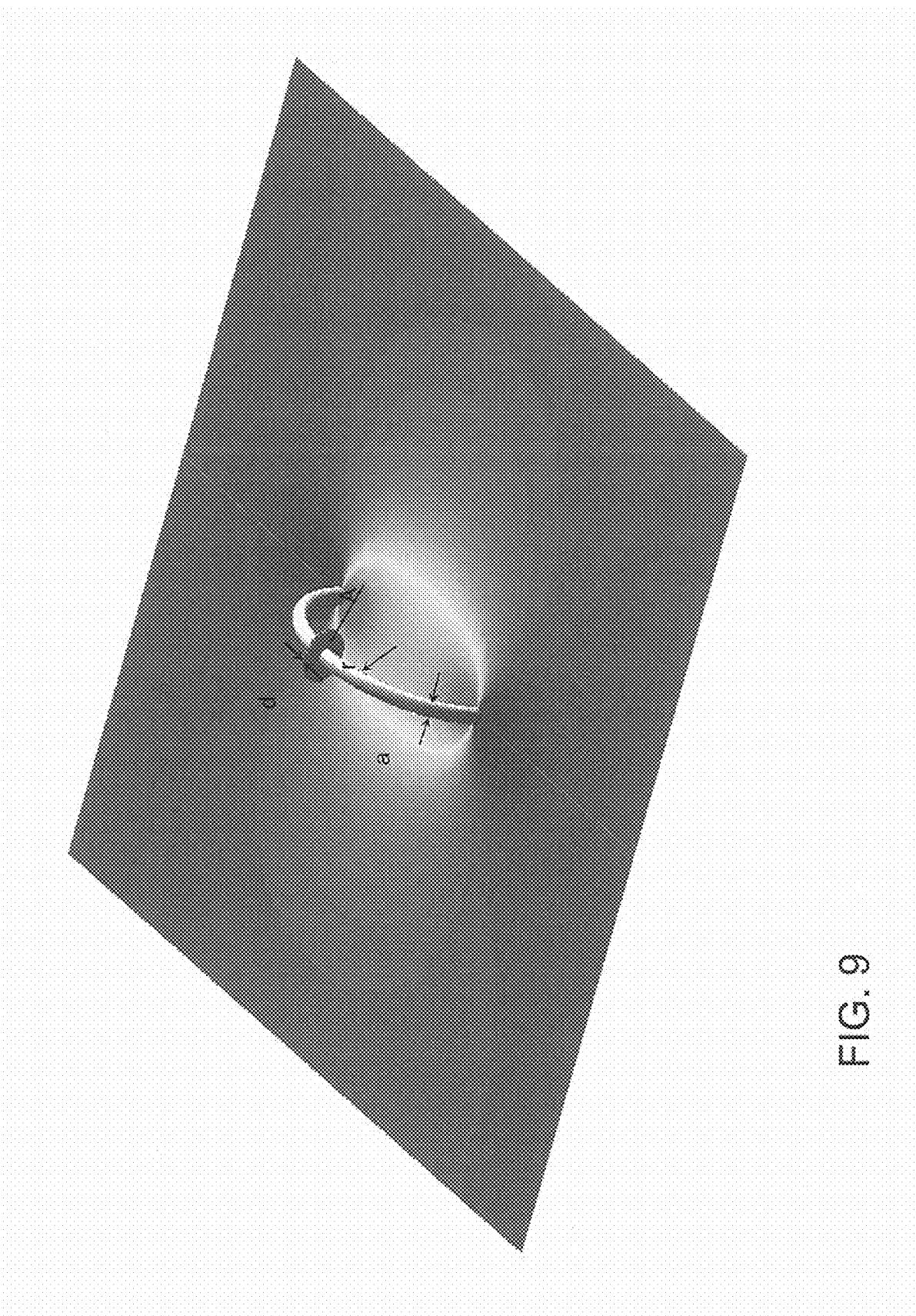
FIG. 9 shows an example of a capacitively loaded conducting-wire coil, and illustrates the surrounding field.

In some examples, one or more of the resonant objects are capacitively-loaded conducting loops or coils. Referring to FIG. 9 a helical coil with N turns of conducting wire, as described above, is connected to a pair of conducting parallel plates of area A spaced by distance d via a dielectric material of relative permittivity $\in$, and everything is surrounded by air (as shown, N=1 and h=0). The plates have a capacitance $C_p=\epsilon_o \in A/d$, which is added to the distributed capacitance of the coil and thus modifies its resonance. Note however, that the presence of the loading capacitor modifies significantly the current distribution inside the wire and therefore the total effective inductance L and total effective capacitance C of the coil are different respectively from $L_s$ and $C_s$, which are calculated for a self-resonant coil of the same geometry using a sinusoidal current profile. Since some charge is accumulated at the plates of the external loading capacitor, the charge distribution $\rho$ inside the wire is reduced, so $C<C_s$, and thus, from the charge conservation equation, the current distribution j flattens out, so $L>L_s$. The resonant frequency for this system is $\omega=1/\sqrt{L(C+C_p)}<\omega_s=1/\sqrt{L_s C_s}$, and $I(x) \to I_o \cos(\pi x/l) \Rightarrow C \to C_s \Rightarrow \omega \to \omega_s$, as $C_p \to 0$.

In general, the desired CMT parameters can be found for this system, but again a very complicated solution of Maxwell's Equations is required. Instead, we will analyze only a special case, where a reasonable guess for the current distribution can be made. When $C_p \gg C_s > C$, then $\omega \approx 1/\sqrt{LC_p} \ll \omega_s$ and $Z \approx \sqrt{L/C_p} \ll Z_s$, while all the charge is on the plates of the loading capacitor and thus the current distribution is constant along the wire. This allows us now to compute numerically L from Eq. (19). In the case h=0 and N integer, the integral in Eq. (19) can actually be computed analytically, giving the formula $L=\mu_o r[\ln(8r/a)-2]N^2$. Explicit analytical formulas are again available for R from Eq. (21) and (22), since $I_{rms}=I_o$, $|p| \approx 0$ and $|m|=I_o N\pi r^2$ (namely only the magnetic-dipole term is contributing to radiation), so we can determine also $Q_{abs}=\omega L/R_{abs}$ and $Q_{rad}=\omega L/R_{rad}$. At the end of the calculations, the validity of the assumption of constant current profile is confirmed by checking that indeed the condition $C_p \gg C_s \Rightarrow \omega \ll \omega_s$ is satisfied. To satisfy this condition, one could use a large external capacitance, however, this would usually shift the operational frequency lower than the optimal frequency, which we will determine shortly; instead, in typical examples, one often prefers coils with very small self-capacitance $C_s$ to begin with, which usually holds, for the types of coils under consideration, when N=1, so that the self-capacitance comes from the charge distribution across the single turn, which is almost always very small, or when N>1 and h>>2Na, so that the dominant self-capacitance comes from the charge distribution across adjacent turns, which is small if the separation between adjacent turns is large.

The external loading capacitance $C_p$ provides the freedom to tune the resonant frequency (for example by tuning A or d). Then, for the particular simple case h=0, for which we have analytical formulas, the total $Q=\omega L/(R_{abs}+R_{rad})$ becomes highest at the optimal frequency $$\omega_Q = \left[\frac{c^4}{\pi}\sqrt{\frac{\varepsilon_o}{2\sigma}} \cdot \frac{1}{aNr^3}\right]^{2/7}, \quad (24)$$

reaching the value $$Q_{max} = \frac{6}{7\pi}\left(2\pi^2\eta_o\frac{\sigma a^2 N^2}{r}\right)^{3/7} \cdot \left[\ln\left(\frac{8r}{a}\right)-2\right]. \quad (25)$$

At lower frequencies it is dominated by ohmic loss and at higher frequencies by radiation. Note, however, that the formulas above are accurate as long as $\omega_Q \ll \omega_s$ and, as explained above, this holds almost always when N=1, and is usually less accurate when N>1, since h=0 usually implies a large self-capacitance. A coil with large h can be used, if the self-capacitance needs to be reduced compared to the external capacitance, but then the formulas for L and $\omega_Q$, $Q_{max}$ are again less accurate. Similar qualitative behavior is expected, but a more complicated theoretical model is needed for making quantitative predictions in that case.

The results of the above analysis for two examples of subwavelength modes of $\lambda/r \geq 70$ (namely highly suitable for near-field coupling and well within the quasi-static limit) of coils with N=1 and h=0 at the optimal frequency Eq. (24) are presented in Table 3. To confirm the validity of constant-current assumption and the resulting analytical formulas, mode-solving calculations were also performed using another completely independent method: computational 3D finite-element frequency-domain (FEFD) simulations (which solve Maxwell's Equations in frequency domain exactly apart for spatial discretization) were conducted, in which the boundaries of the conductor were modeled using a complex impedance $\zeta_c = \sqrt{\mu_o\omega/2\sigma}$ boundary condition, valid as long as $\zeta_c/\zeta_o \ll 1$ ($<10^{-5}$ for copper in the microwave). Table 3 shows Numerical FEFD (and in parentheses analytical) results for the wavelength and absorption, radiation and total loss rates, for two different cases of subwavelength-loop resonant modes. Note that for conducting material copper ($\sigma=5.998 \cdot 10^7$ S/m) was used. Specific parameters of the plot in FIG. 4 are highlighted in bold in the table. The two methods (analytical and computational) are in good agreement and show that, in some examples, the optimal frequency is in the low-MHz microwave range and the expected quality factors are $Q_{abs} \geq 1000$ and $Q_{rad} \geq 10000$.

Figure 10:
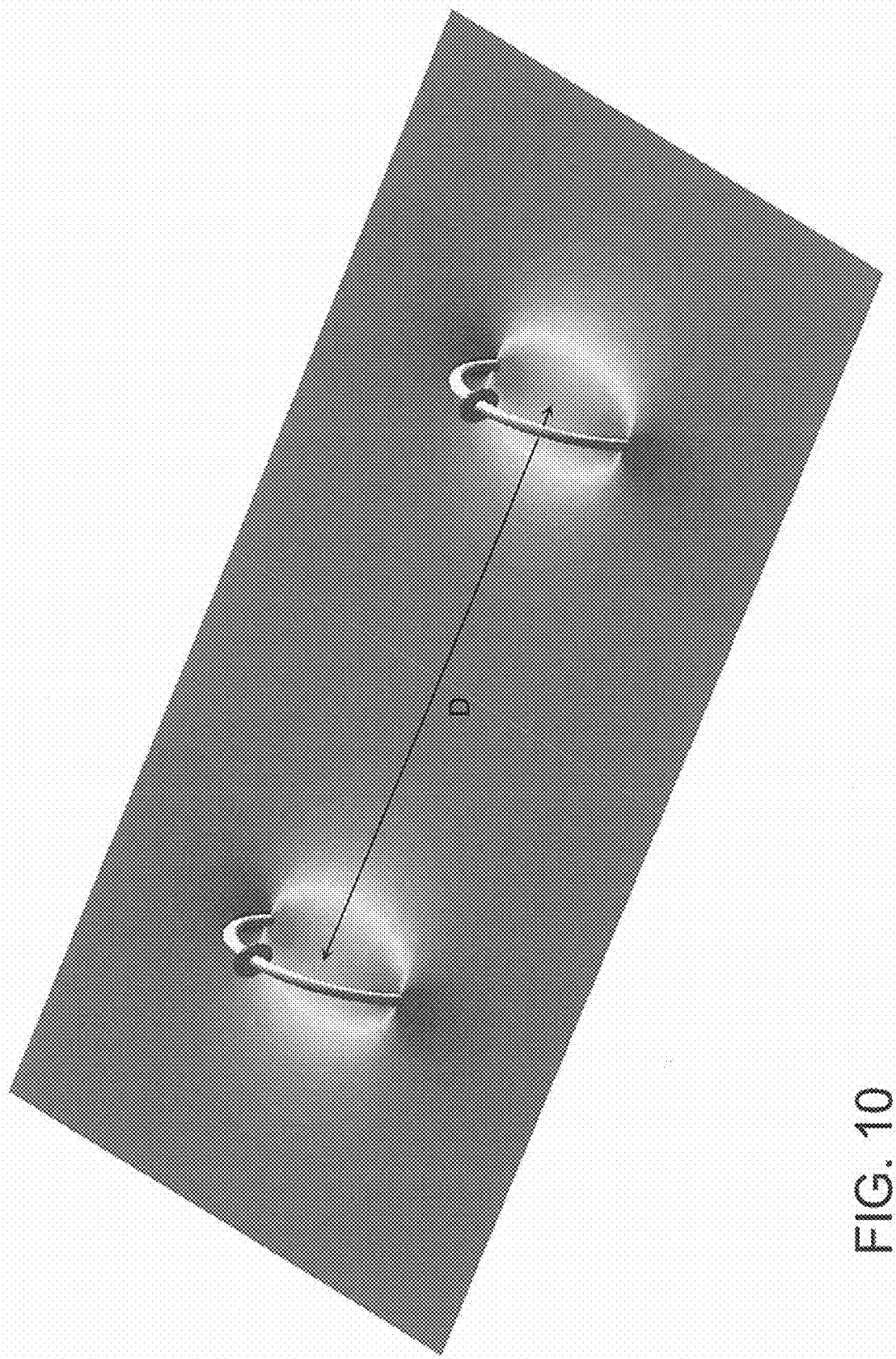
FIG. 10 shows an example wireless energy transfer scheme featuring two capacitively loaded conducting-wire coils, and illustrates the surrounding field.

Referring to FIG. 10, in some examples, energy is transferred between two capacitively-loaded coils. For the rate of energy transfer between two capacitively-loaded coils 1 and 2 at distance D between their centers, the mutual inductance $M_L$ can be evaluated numerically from Eq. (23) by using constant current distributions in the case $\omega \ll \omega_s$. In the case h=0, the coupling is only magnetic and again we have an analytical formula, which, in the quasi-static limit $r \ll D \ll \lambda$ and for the relative orientation shown in FIG. 10, is $M_L \approx \pi\mu_o/2 \cdot (r_1 r_2)^2 N_1 N_2/D^3$, which means that $k \propto (\sqrt{r_1 r_2}/D)^3$ is independent of the frequency $\omega$ and the number of turns $N_1$, $N_2$. Consequently, the resultant coupling figure-of-merit of interest is $$U = k\sqrt{Q_1 Q_2} \approx \quad (26)$$

$$\left(\frac{\sqrt{r_1 r_2}}{iD}\right)^3 \cdot \frac{\pi^2\eta_o \frac{\sqrt{r_1 r_2}}{\lambda} \cdot N_1 N_2}{\prod_{j=1,2}\left(\sqrt{\frac{\pi\eta_o}{\lambda\sigma}} \cdot \frac{r_j}{a_j}N_j + \frac{8}{3}\pi^5\eta_o\left(\frac{r_j}{\lambda}\right)^4 N_j^2\right)^{1/2}},$$

which again is more accurate for $N_1=N_2=1$.

From Eq. (26) it can be seen that the optimal frequency $\omega_U$, where the figure-of-merit is maximized to the value $U_{max}$, is close to the frequency $\omega_{Q_1 Q_2}$ at which $Q_1 Q_2$ is maximized, since k does not depend much on frequency (at least for the distances $D \ll \lambda$ of interest for which the quasi-static approximation is still valid). Therefore, the optimal frequency $\omega_U \approx \omega_{Q_1 Q_2}$ is mostly independent of the distance D between the two coils and lies between the two frequencies $\omega_{Q_1}$ and $\omega_{Q_2}$ at which the single-coil $Q_1$ and $Q_2$ respectively peak. For same coils, this optimal frequency is given by Eq. (24) and then the strong-coupling factor from Eq. (26) becomes $$U_{max} = kQ_{max} \approx \left(\frac{r}{D}\right)^3 \cdot \frac{3}{7}\left(2\pi^2\eta_o\frac{\sigma a^2 N^2}{r}\right)^{3/7}. \quad (27)$$

In some examples, one can tune the capacitively-loaded conducting loops or coils, so that their angular eigenfrequencies are close to $\omega_U$ within $\Gamma_U$, which is half the angular frequency width for which $U > U_{max}/2$.

Referring to Table 4, numerical FEFD and, in parentheses, analytical results based on the above are shown for two systems each composed of a matched pair of the loaded coils described in Table 3. The average wavelength and loss rates are shown along with the coupling rate and coupling to loss ratio figure-of-merit $U=\kappa/\Gamma$ as a function of the coupling distance D, for the two cases. Note that the average numerical $\Gamma_{rad}$ shown are slightly different from the single-loop value of

TABLE 3

| single coil | $\lambda/r$ | f | $Q_{rad}$ | $Q_{abs}$ | Q |
|---|---|---|---|---|---|
| r = 30 cm, a = 2 cm | 111.4 (112.4) | 8.976 (8.897) | 29546 (30512) | 4886 (5117) | 4193 (4381) |
| $\epsilon$ = 10, A = 138 cm$^2$, | | | | | |
| d = 4 mm | | | | | |
| r = 10 cm, a = 2 mm | 69.7 (70.4) | 43.04 (42.61) | 10702 (10727) | 1545 (1604) | 1350 (1395) |
| $\epsilon$ = 10, A = 3.14 cm$^2$, | | | | | |
| d = 1 mm | | | | | |

FIG. 3, analytical results for $\Gamma_{rad}$ are not shown but the single-loop value is used. (The specific parameters corresponding to the plot in FIG. 10 are highlighted with bold in the table.) Again we chose N=1 to make the constant-current assumption a good one and computed $M_L$ numerically from Eq. (23). Indeed the accuracy can be confirmed by their agreement with the computational FEFD mode-solver simulations, which give κ through the frequency splitting of the two normal modes of the combined system ($\delta_E$=2κ from Eq. (4)). The results show that for medium distances D/r=10–3 the expected coupling-to-loss ratios are in the range U~0.5-50.

TABLE 4

| pair of coils | D/r | $Q^{rad}$ | Q = ω/2Γ | $Q_\kappa$ = ω/2κ | κ/Γ |
|---|---|---|---|---|---|
| r = 30 cm, a = 2 cm | 3 | 30729 | 4216 | 62.6 (63.7) | 67.4 (68.7) |
| ε = 10, A = 138 cm², d = 4 mm | 5 | 29577 | 4194 | 235 (248) | 17.8 (17.6) |
| λ/r ≈ 112 | 7 | 29128 | 4185 | 589 (646) | 7.1 (6.8) |
| $Q^{abs}$ ≈ 4886 | 10 | 28833 | 4177 | 1539 (1828) | 2.7 (2.4) |
| r = 10 cm, a = 2 mm | 3 | 10955 | 1355 | 85.4 (91.3) | 15.9 (15.3) |
| ε = 10, A = 3.14 cm², d = 1 mm | 5 | 10740 | 1351 | 313 (356) | 4.32 (3.92) |
| λ/r ≈ 70 | 7 | 10759 | 1351 | 754 (925) | 1.79 (1.51) |
| $Q^{abs}$ ≈ 1546 | 10 | 10756 | 1351 | 1895 (2617) | 0.71 (0.53) |

2:2.1 Derivation of Optimal Power-Transmission Efficiency

Figure 11:
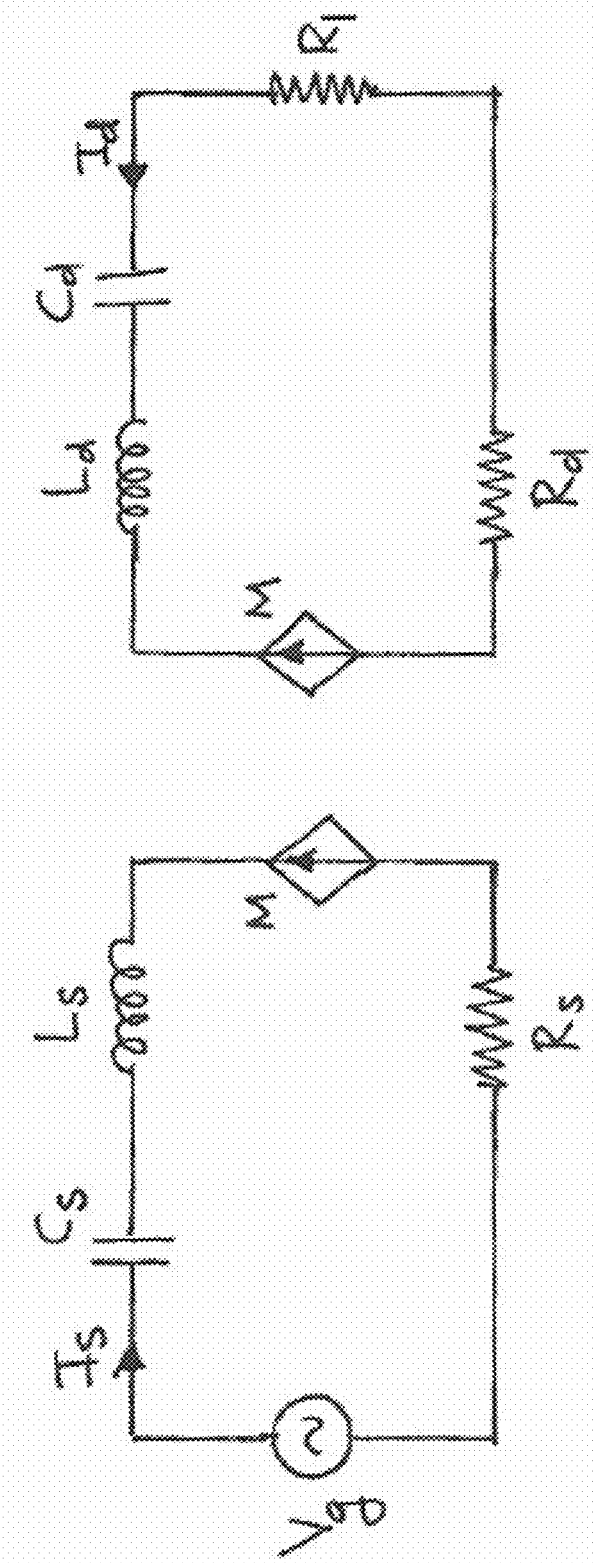
FIG. 11 illustrates an example circuit model for wireless energy transfer.

Referring to FIG. 11, to rederive and express Eq. (15) in terms of the parameters which are more directly accessible from particular resonant objects, such as the capacitively-loaded conducting loops, one can consider the following circuit-model of the system, where the inductances $L_s$, $L_d$ represent the source and device loops respectively, $R_s$, $R_d$ their respective losses, and $C_s$, $C_d$ are the required corresponding capacitances to achieve for both resonance at frequency ω. A voltage generator $V_g$ is considered to be connected to the source and a load resistance $R_l$ to the device. The mutual inductance is denoted by M.

Then from the source circuit at resonance ($\omega L_s$=1/$\omega C_s$):

$$V_g = I_s R_s - j\omega M I_d \Rightarrow \frac{1}{2} V_g^* I_s = \frac{1}{2}|I_s|^2 R_s + \frac{1}{2} j\omega M I_d^* I_s, \quad (28)$$

and from the device circuit at resonance ($\omega L_d$=1/$\omega C_d$):

$$0 = I_d(R_d + R_l) - j\omega M I_s \Rightarrow j\omega M I_s = I_d(R_d + R_l) \quad (29)$$

So by substituting Eq. (29) to Eq. (28) and taking the real part (for time-averaged power) we get:

$$P_g = \text{Re}\left\{\frac{1}{2} V_g^* I_s\right\} = \frac{1}{2}|I_s|^2 R_s + \frac{1}{2}|I_d|^2(R_d + R_l) = P_s + P_d + P_l, \quad (30)$$

where we identified the power delivered by the generator $P_g$=Re{$V_g^* I_s$/2}, the power lost inside the source $P_s$=|$I_s$|²$R_s$/2, the power lost inside the device $P_d$=|$I_d$|²$R_d$/2 and the power delivered to the load $P_l$=|$I_d$|²$R_l$/2. Then, the power transmission efficiency is:

$$\eta_P \equiv \frac{P_l}{P_g} \quad (31)$$

$$= \frac{R_l}{\left|\frac{I_s}{I_d}\right|^2 R_s + (R_d + R_l)}$$

$$= \frac{R_l}{\frac{(R_d + R_l)^2}{(\omega M)^2} R_s + (R_d + R_l)}.$$

If we now choose the load impedance $R_l$ to optimize the efficiency by $\eta_P'(R_l)$=0, we get the optimal load impedance $$\frac{R_{l^*}}{R_d} = \sqrt{1 + \frac{(\omega M)^2}{R_s R_d}} \quad (32)$$

and the maximum possible efficiency $$\eta_{P^*} = \frac{R_{l^*}/R_d - 1}{R_{l^*}/R_d + 1} = \left[\frac{\omega M / \sqrt{R_s R_d}}{1 + \sqrt{1 + (\omega M / \sqrt{R_s R_d})^2}}\right]^2. \quad (33)$$

To check now the correspondence with the CMT model, note that $\kappa_l$=$R_l$/2$L_d$, $\Gamma_d$=$R_d$/2$L_d$, $\Gamma_s$=$R_s$/2$L_s$, and κ=ωM/2$\sqrt{L_s L_d}$, so then $U_l$=$\kappa_l$/$\Gamma_d$=$R_l$/$R_d$ and U=κ/$\sqrt{\Gamma_s \Gamma_d}$=ωM/$\sqrt{R_s R_d}$. Therefore, the condition Eq. (32) is identical to the condition Eq. (14) and the optimal efficiency Eq. (33) is identical to the general Eq. (15). Indeed, as the CMT analysis predicted, to get a large efficiency, we need to design a system that has a large strong-coupling factor U.

2.2.2 Optimization of U

The results above can be used to increase or optimize the performance of a wireless energy transfer system, which employs capacitively-loaded coils. For example, from the scaling of Eq. (27) with the different system parameters, one sees that to maximize the system figure-of-merit U, in some examples, one can:

Decrease the resistivity of the conducting material. This can be achieved, for example, by using good conductors (such as copper or silver) and/or lowering the temperature. At very low temperatures one could use also super-conducting materials to achieve extremely good performance.

Increase the wire radius a. In typical examples, this action can be limited by physical size considerations. The purpose of this action is mainly to reduce the resistive losses in the wire by increasing the cross-sectional area through which the electric current is flowing, so one could alternatively use also a Litz wire or a ribbon instead of a circular wire.

For fixed desired distance D of energy transfer, increase the radius of the loop r. In typical examples, this action can be limited by physical size considerations, typically especially for the device.

For fixed desired distance vs. loop-size ratio D/r, decrease the radius of the loop r. In typical examples, this action can be limited by physical size considerations.

Increase the number of turns N. (Even though Eq. (27) is expected to be less accurate for N>1, qualitatively it still provides a good indication that we expect an improvement in the coupling-to-loss ratio with increased N.) In typical examples, this action can be limited by physical size and possible voltage considerations, as will be discussed in following paragraphs.

Adjust the alignment and orientation between the two coils. The figure-of-merit is optimized when both cylindrical coils have exactly the same axis of cylindrical symmetry (namely they are "facing" each other). In some examples, particular mutual coil angles and orientations that lead to zero mutual inductance (such as the orientation where the axes of the two coils are perpendicular and the centers of the two coils are on one of the two axes) should be avoided.

Finally, note that the height of the coil h is another available design parameter, which can have an impact to the performance similar to that of its radius r, and thus the design rules can be similar.

The above analysis technique can be used to design systems with desired parameters. For example, as listed below, the above described techniques can be used to determine the cross sectional radius a of the wire which one should use when designing as system two same single-turn loops with a given radius in order to achieve a specific performance in terms of $U=\kappa/\Gamma$ at a given D/r between them, when the material is copper ($\sigma=5.998 \cdot 10^7$ S/m):

$D/r=5, U \geq 10, r=30$ cm $\Rightarrow a \geq 9$ mm $D/r=5, U \geq 10, r=5$ cm $\Rightarrow a \geq 3.7$ mm $D/r=5, U \geq 20, r=30$ cm $\Rightarrow a \geq 20$ mm $D/r=5, U \geq 20, r=5$ cm $\Rightarrow a \geq 8.3$ mm $D/r=10, U \geq 1, r=30$ cm $\Rightarrow a \geq 7$ mm $D/r=10, U \geq 1, r=5$ cm $\Rightarrow a \geq 2.8$ mm $D/r=10, U \geq 3, r=30$ cm $\Rightarrow a \geq 25$ mm $D/r=10, U \geq 3, r=5$ cm $\Rightarrow a \geq 10$ mm Similar analysis can be done for the case of two dissimilar loops. For example, in some examples, the device under consideration is very specific (e.g. a laptop or a cell phone), so the dimensions of the device object ($r_d$, $h_d$, $a_d$, $N_d$) are very restricted. However, in some such examples, the restrictions on the source object ($r_s$, $h_s$, $a_s$, $N_s$) are much less, since the source can, for example, be placed under the floor or on the ceiling. In such cases, the desired distance is often well defined, based on the application (e.g. D~1 m for charging a laptop on a table wirelessly from the floor). Listed below are examples (simplified to the case $N_s=N_d=1$ and $h_s=h_d=0$) of how one can vary the dimensions of the source object to achieve the desired system performance in terms of $U_{sd}=\kappa/\sqrt{\Gamma_s\Gamma_d}$, when the material is again copper ($\sigma=5.998 \cdot 10^7$ S/m):

$D=1.5$ m, $U_{sd} \geq 15$, $r_d=30$ cm, $a_d=6$ mm $\Rightarrow r_s=1.158$ m, $a_s \geq 5$ mm $D=1.5$ m, $U_{sd} \geq 30$, $r_d=30$ cm, $a_d=6$ mm $\Rightarrow r_s=1.15$ m, $a_s \geq 33$ mm $D=1.5$ m, $U_{sd} \geq 1$, $r_d=5$ cm, $a_d=4$ mm $\Rightarrow r_s=1.119$ m, $a_s \geq 7$ mm $D=1.5$ m, $U_{sd} \geq 2$, $r_d=5$ cm, $a_d=4$ mm $\Rightarrow r_s=1.119$ m, $a_s \geq 52$ mm $D=2$ m, $U_{sd} \geq 10$, $r_d=30$ cm, $a_d=6$ mm $\Rightarrow r_s=1.518$ m, $a_s \geq 7$ mm $D=2$ m, $U_{sd} \geq 20$, $r_d=30$ cm, $a_d=6$ mm $\Rightarrow r_s=1.514$ m, $a_s \geq 50$ mm $D=2$ m, $U_{sd} \geq 0.5$, $r_d=5$ cm, $a_d=4$ mm $\Rightarrow r_s=1.491$ m, $a_s \geq 5$ mm $D=2$ m, $U_{sd} \geq 1$, $r_d=5$ cm, $a_d=4$ mm $\Rightarrow r_s=1.491$ m, $a_s \geq 36$ mm

2.2.3 Optimization of k

As described below, in some examples, the quality factor Q of the resonant objects is limited from external perturbations and thus varying the coil parameters cannot lead to improvement in Q. In such cases, one can opt to increase the strong-coupling factor U by increasing the coupling factor k. The coupling does not depend on the frequency and the number of turns. Therefore, in some examples, one can:

Increase the wire radii $a_1$ and $a_2$. In typical examples, this action can be limited by physical size considerations.

For fixed desired distance D of energy transfer, increase the radii of the coils $r_1$ and $r_2$. In typical examples, this action can be limited by physical size considerations, typically especially for the device.

For fixed desired distance vs. coil-sizes ratio $D/\sqrt{r_1 r_2}$, only the weak (logarithmic) dependence of the inductance remains, which suggests that one should decrease the radii of the coils $r_1$ and $r_2$. In typical examples, this action can be limited by physical size considerations.

Adjust the alignment and orientation between the two coils. In typical examples, the coupling is optimized when both cylindrical coils have exactly the same axis of cylindrical symmetry (namely they are "facing" each other). Particular mutual coil angles and orientations that lead to zero mutual inductance (such as the orientation where the axes of the two coils are perpendicular and the centers of the two coils are on one of the two axes) should obviously be avoided.

Finally, note that the heights of the coils $h_1$ and $h_2$ are other available design parameters, which can have an impact to the coupling similar to that of their radii $r_1$ and $r_2$, and thus the design rules can be similar.

Further practical considerations apart from efficiency, e.g. physical size limitations, will be discussed in detail below.

2.2.4 Optimization of Overall System Performance

In many cases, the dimensions of the resonant objects will be set by the particular application at hand. For example, when this application is powering a laptop or a cell-phone, the device resonant object cannot have dimensions larger than those of the laptop or cell-phone respectively. In particular, for a system of two loops of specified dimensions, in terms of loop radii $r_{s,d}$ and wire radii $a_{s,d}$, the independent parameters left to adjust for the system optimization are: the number of turns $N_{s,d}$, the frequency f, the power-load consumption rate $\kappa_l=R_l/2L_d$ and the power-generator feeding rate $\kappa_g=R_g/2L_s$, where $R_g$ is the internal (characteristic) impedance of the generator.

In general, in various examples, the primary dependent variable that one wants to increase or optimize is the overall efficiency η. However, other important variables need to be taken into consideration upon system design. For example, in examples featuring capacitively-loaded coils, the design can be constrained by, for example, the currents flowing inside the wires $I_{s,d}$ and the voltages across the capacitors $V_{s,d}$. These limitations can be important because for ~Watt power applications the values for these parameters can be too large for the wires or the capacitors respectively to handle. Furthermore, the total loaded (by the load) quality factor of the device $Q_{d[l]}=\omega/2(\Gamma_d+\Gamma_l)=\omega L_d/(R_d+R_d)$ and the total loaded (by the generator) quality factor of the source $Q_{s[g]}=\omega/2(\Gamma_s+\Gamma_g)=\omega L_s/(R_s+R_g)$ are quantities that should be preferably small, because to match the source and device resonant frequencies to within their Q's, when those are very large, can be challenging experimentally and more sensitive to slight variations. Lastly, the radiated powers $P_{s,rad}$ and $P_{d,rad}$ should be minimized for concerns about far-field interference and safety, even though, in general, for a magnetic, non-radiative scheme they are already typically small. In the following, we examine then the effects of each one of the independent variables on the dependent ones.

We define a new variable wp to express the power-load consumption rate for some particular value of U through $U_l=\kappa_l/\Gamma_d=\sqrt{1+wp\cdot U}$. Then, in some examples, values which impact the choice of this rate are: $U_l=1\Leftrightarrow wp=0$ to minimize the required energy stored in the source (and therefore $I_s$ and $V_s$), $U_l=\sqrt{1+U^2}>1\Leftrightarrow wp=1$ to maximize the efficiency, as seen earlier, or $U_l\gg 1\Leftrightarrow wp\gg 1$ to decrease the required energy stored in the device (and therefore $I_d$ and $V_d$) and to decrease or minimize $Q_{d[l]}$. Similar is the impact of the choice of the power-generator feeding rate $U_g=\kappa_g/\Gamma_s$, with the roles of the source/device and generator/load reversed.

In some examples, increasing $N_s$ and $N_d$ increases $Q_s$ and $Q_d$, and thus U and the efficiency significantly, as seen before. It also decreases the currents $I_s$ and $I_d$, because the inductance of the loops increases, and thus the energy $W_{s,d}=L_{s,d}|I_{s,d}|^2/2$ required for given output power $P_l$ can be achieved with smaller currents. However, in some examples, increasing $N_d$ and thus $Q_d$ can increase $Q_{d[l]}$, $P_{d,rad}$ and the voltage across the device capacitance $V_d$. Similar can be the impact of increasing $N_s$ on $Q_{s[g]}$, $P_{s,rad}$ and $V_s$. As a conclusion, in some examples, the number of turns $N_s$ and $N_d$ should be chosen large enough (for high efficiency) but such that they allow for reasonable voltages, loaded Q's and/or powers radiated.

With respect to the resonant frequency, again, there is an optimal one for efficiency. Close to that optimal frequency $Q_{d[l]}$ and/or $Q_{s[g]}$ can be approximately maximum. In some examples, for lower frequencies the currents typically get larger but the voltages and radiated powers get smaller. In some examples, one should pick either the frequency that maximizes the efficiency or somewhat lower.

Figure 12:
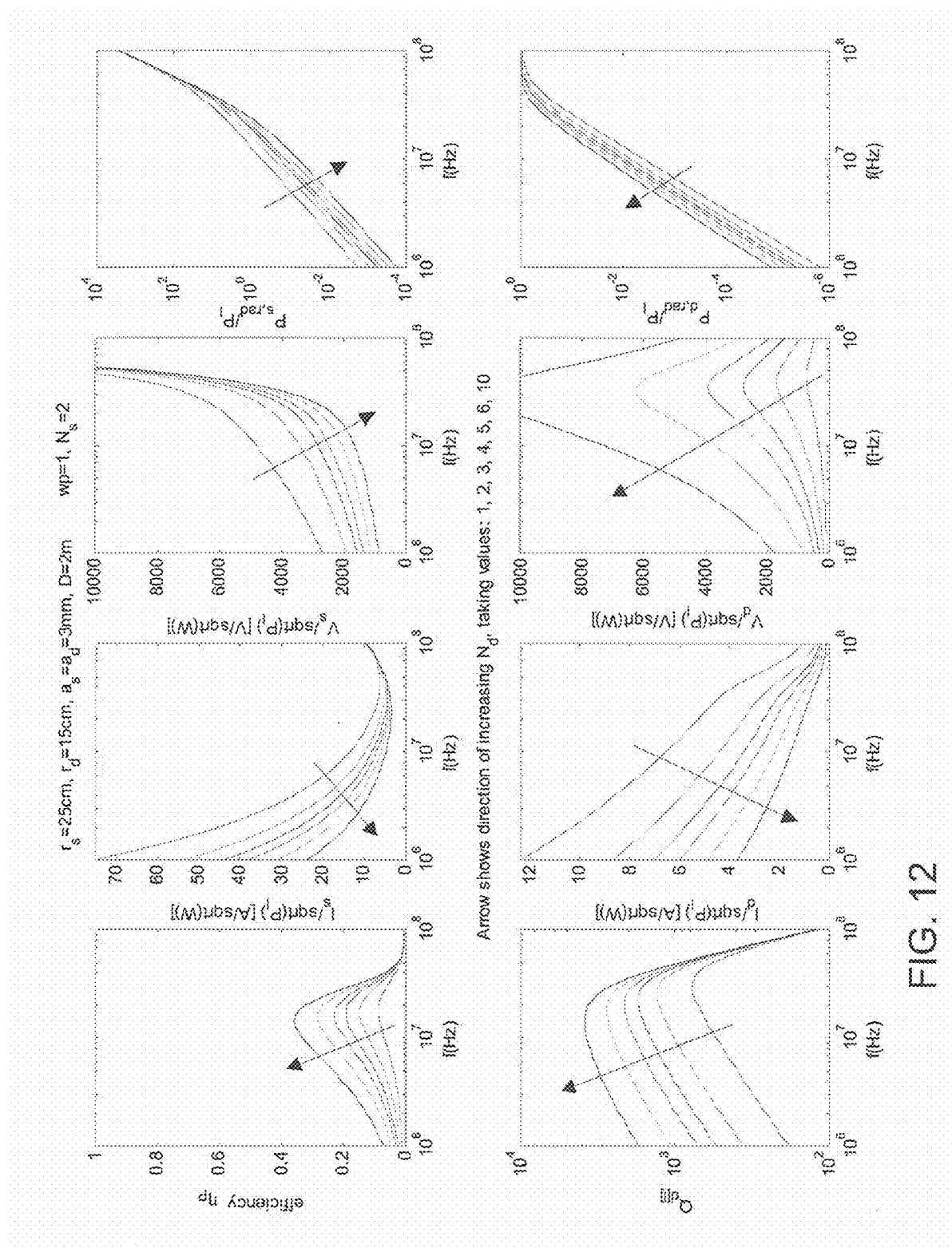
FIG. 12 shows the efficiency, total (loaded) device Q, and source and device currents, voltages and radiated powers (normalized to 1 Watt of output power to the load) as functions of the resonant frequency, for a particular choice of source and device loop dimensions, wp and $N_s$ and different choices of $N_d$=1,2,3,4,5,6,10 (red, green, blue, magenta, yellow, cyan, black respectively).
Figure 13:
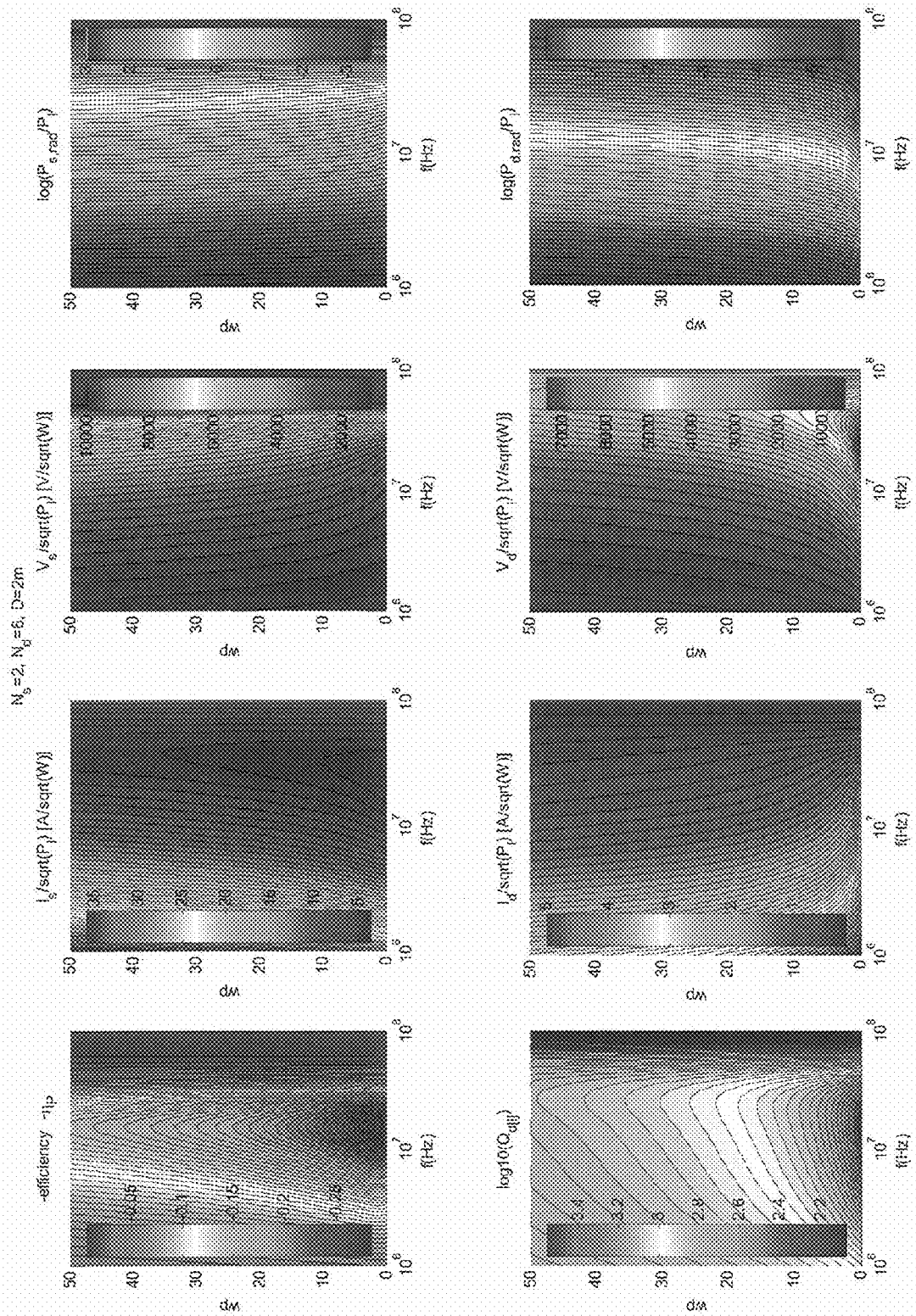
FIG. 13 shows the efficiency, total (loaded) device Q, and source and device currents, voltages and radiated powers (normalized to 1 Watt of output power to the load) as functions of frequency and wp for a particular choice of source and device loop dimensions, and number of turns $N_s$ and $N_d$.

One way to decide on an operating regime for the system is based on a graphical method. Consider two loops of $r_s=25$ cm, $r_d=15$ cm, $h_s=h_d=0$, $a_s=a_d=3$ mm and distance D=2 m between them. In FIG. 12, we plot some of the above dependent variables (currents, voltages and radiated powers normalized to 1 Watt of output power) in terms of frequency f and $N_d$, given some choice for wp and $N_s$. FIG. 12 depicts the trend of system performance explained above. In FIG. 13, we make a contour plot of the dependent variables as functions of both frequency and wp but for both $N_s$ and $N_d$ fixed. For example, a reasonable choice of parameters for the system of two loops with the dimensions given above are: $N_s=2$, $N_d=6$, f=10 MHz and wp=10, which gives the following performance characteristics: η=20.6%, $Q_{d[l]}=1264$, $I_s=7.2$ A, $I_d=1.4$ A, $V_s=2.55$ kV, $V_d=2.30$ kV, $P_{s,rad}=0.15$ W, $P_{d,rad}=0.006$ W. Note that the results in FIGS. 12, 13 and the just above calculated performance characteristics are made using the analytical formulas provided above, so they are expected to be less accurate for large values of $N_s$, $N_d$, but still they give a good estimate of the scalings and the orders of magnitude.

Finally, one could additionally optimize for the source dimensions, since usually only the device dimensions are limited, as discussed earlier. Namely, one can add $r_s$ and $a_s$ in the set of independent variables and optimize with respect to these too for all the dependent variables of the problem (we saw how to do this only for efficiency earlier). Such an optimization would lead to improved results.

In this description, we propose that, if one ensures operation in the strongly-coupled regime at mid-range distances, at least medium-power transmission (~W) at mid-range distances with high efficiency is possible.

2.3 Inductively-Loaded Conducting Rods

A straight conducting rod of length 2h and cross-sectional radius a has distributed capacitance and distributed inductance, and therefore it supports a resonant mode of angular frequency ω. Using the same procedure as in the case of self-resonant coils, one can define an effective total inductance L and an effective total capacitance C of the rod through formulas Eqs. (19) and (20). With these definitions, the resonant angular frequency and the effective impedance are given again by the common formulas $\omega=1/\sqrt{LC}$ and $Z=\sqrt{L/C}$ respectively. To calculate the total inductance and capacitance, one can assume again a sinusoidal current profile along the length of the conducting wire. When interested in the lowest mode, if we denote by x the coordinate along the conductor, such that it runs from −h to +h, then the current amplitude profile would have the form $I(x)=I_o \cos(\pi x/2h)$, since it has to be zero at the open ends of the rod. This is the well-known half-wavelength electric dipole resonant mode.

Figure 14:
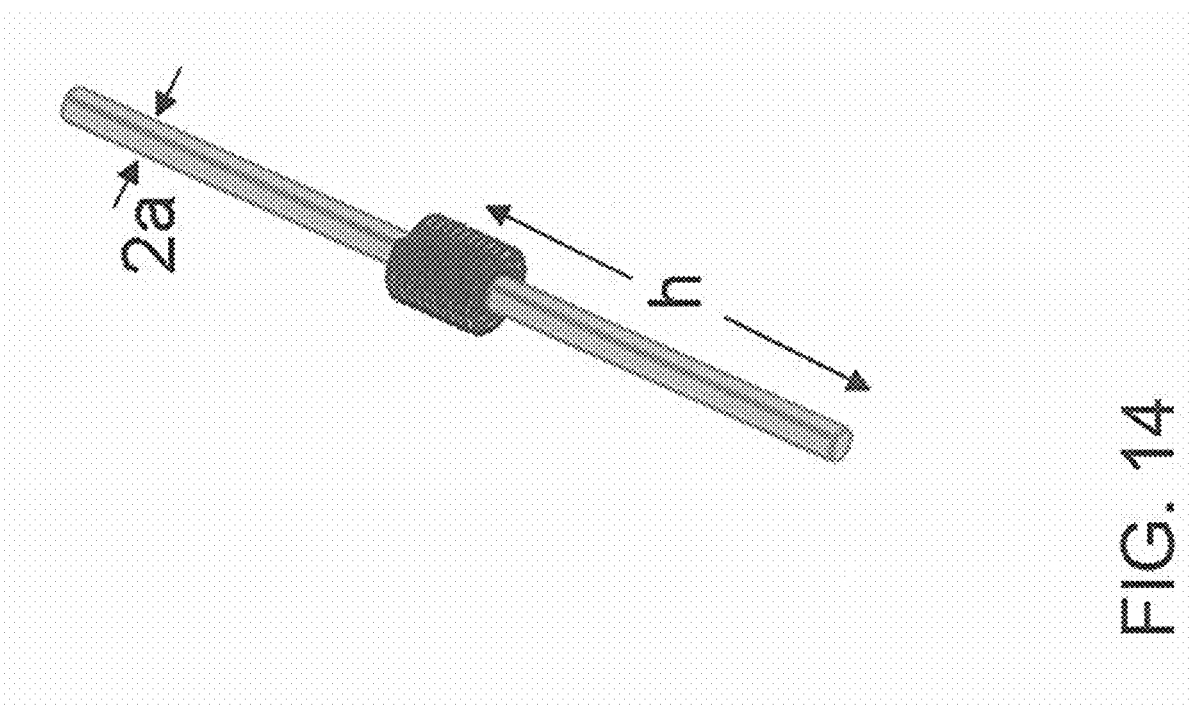
FIG. 14 shows an example of an inductively-loaded conducting-wire coil.

In some examples, one or more of the resonant objects are inductively-loaded conducting rods. Referring to FIG. 14, a straight conducting rod of length 2h and cross-sectional radius a, as in the previous paragraph, is cut into two equal pieces of length h, which are connected via a coil wrapped around a magnetic material of relative permeability μ, and everything is surrounded by air. The coil has an inductance $L_c$, which is added to the distributed inductance of the rod and thus modifies its resonance. Note however, that the presence of the center-loading inductor modifies significantly the current distribution inside the wire and therefore the total effective inductance L and total effective capacitance C of the rod are different respectively from $L_s$ and $C_s$, which are calculated for a self-resonant rod of the same total length using a sinusoidal current profile, as in the previous paragraph. Since some current is running inside the coil of the external loading inductor, the current distribution j inside the rod is reduced, so $L<L_s$, and thus, from the charge conservation equation, the linear charge distribution $\rho_l$ flattens out towards the center (being positive in one side of the rod and negative in the other side of the rod, changing abruptly through the inductor), so $C>C_s$. The resonant frequency for this system is $\omega=1/\sqrt{(L+L_c)C}<\omega_s=1/\sqrt{L_sC_s}$, and $I(x)\to I_o \cos(\pi x/2h) \Rightarrow L\to L_s \Rightarrow \omega\to\omega_s$, as $L_c\to 0$.

In general, the desired CMT parameters can be found for this system, but again a very complicated solution of Maxwell's Equations is generally required. In a special case, a reasonable estimate for the current distribution can be made. When $L_c\gg L_s>L$, then $\omega\approx 1/\sqrt{L_cC}\ll\omega_s$ and $Z\approx\sqrt{L_cC}\gg Z_s$, while the current distribution is triangular along the rod (with maximum at the center-loading inductor and zero at the ends)

and thus the charge distribution is positive constant on one half of the rod and equally negative constant on the other side of the rod. This allows us to compute numerically C from Eq. (20). In this case, the integral in Eq. (20) can actually be computed analytically, giving the formula $1/C=1/(\pi\epsilon_o h)[\ln(h/a)-1]$. Explicit analytical formulas are again available for R from Eq. (21) and (22), since $I_{rms}=I_o$, $|p|=q_o h$ and $|m|=0$ (namely only the electric-dipole term is contributing to radiation), so we can determine also $Q_{abs}=1/\omega CR_{abs}$ and $Q_{rad}=1/\omega CR_{rad}$. At the end of the calculations, the validity of the assumption of triangular current profile is confirmed by checking that indeed the condition $L_c \gg L_s \Leftrightarrow \omega \ll \omega_s$ is satisfied. This condition is relatively easily satisfied, since typically a conducting rod has very small self-inductance $L_s$ to begin with.

Another important loss factor in this case is the resistive loss inside the coil of the external loading inductor $L_c$ and it depends on the particular design of the inductor. In some examples, the inductor is made of a Brooks coil, which is the coil geometry which, for fixed wire length, demonstrates the highest inductance and thus quality factor. The Brooks coil geometry has $N_{Bc}$ turns of conducting wire of cross-sectional radius $a_{Bc}$ wrapped around a cylindrically symmetric coil former, which forms a coil with a square cross-section of side $r_{Bc}$, where the inner side of the square is also at radius $r_{Bc}$ (and thus the outer side of the square is at radius $2r_{Bc}$), therefore $N_{Bc} \approx (r_{Bc}/2a_{Bc})^2$. The inductance of the coil is then $L_c = 2.0285 \mu_o r_{Bc} N_{Bc}^2 \approx 2.0285 \mu_o r_{Bc}^5/8a_{Bc}^4$ and its resistance $$R_C \approx \frac{1}{\sigma} \frac{l_{Bc}}{\pi a_{Bc}^2} \sqrt{1 + \frac{\mu_o \omega \sigma}{2}\left(\frac{a_{Bc}}{2}\right)^2},$$

where the total wire length is $l_{Bc} \approx 2\pi(3r_{Bc}/2)N_{Bc} \approx 3\pi r_{Bc}^3/4a_{Bc}^2$ and we have used an approximate square-root law for the transition of the resistance from the dc to the ac limit as the skin depth varies with frequency.

The external loading inductance $L_c$ provides the freedom to tune the resonant frequency. For example, for a Brooks coil with a fixed size $r_{Bc}$, the resonant frequency can be reduced by increasing the number of turns $N_{Bc}$ by decreasing the wire cross-sectional radius $a_{Bc}$. Then the desired resonant angular frequency $\omega = 1/\sqrt{L_c C}$ is achieved for $a_{Bc} \approx (2.0285 \mu_o r_{Bc}^5 \omega^2 C)^{1/4}$ and the resulting coil quality factor is $Q_c \approx 0.169 \mu_o \sigma r_{Bc}^2 \omega / \sqrt{1+\omega^2 \mu_o \sigma \sqrt{2.0285 \mu_o (r_{Bc}/4)^5 C}}$. Then, for the particular simple case $L_c \gg L_s$, for which we have analytical formulas, the total $Q=1/\omega C(R_c+R_{abs}+R_{rad})$ becomes highest at some optimal frequency $\omega_Q$, reaching the value $Q_{max}$, both determined by the loading-inductor specific design. For example, for the Brooks-coil procedure described above, at the optimal frequency $Q_{max} \approx Q_c \approx 0.8(\mu_o \sigma^2 r_{Bc}^3/C)^{1/4}$. At lower frequencies it is dominated by ohmic loss inside the inductor coil and at higher frequencies by radiation. Note, again, that the above formulas are accurate as long as $\omega_Q \ll \omega_s$ and, as explained above, this is easy to design for by using a large inductance.

The results of the above analysis for two examples, using Brooks coils, of subwavelength modes of $\lambda/h \geq 200$ (namely highly suitable for near-field coupling and well within the quasi-static limit) at the optimal frequency $\omega_Q$ are presented in Table 5.

Table 5 shows in parentheses (for similarity to previous tables) analytical results for the wavelength and absorption, radiation and total loss rates, for two different cases of sub-wavelength-loop resonant modes. Note that for conducting material copper ($\sigma = 5.998 \cdot 10^7$ S/m) was used. The results show that, in some examples, the optimal frequency is in the low-MHz microwave range and the expected quality factors are $Q_{abs} \geq 1000$ and $Q_{rad} \geq 100000$.

TABLE 5

| single rod | λ/h | f (MHz) | $Q_{rad}$ | $Q_{abs}$ | Q |
|---|---|---|---|---|---|
| h = 30 cm, a = 2 cm µ = 1, $r_{Bc}$ = 2 cm, $a_{Bc}$ = 0.88 mm, $N_{Bc}$ = 129 | (403.8) | (2.477) | (2.72 * 10⁶) | (7400) | (7380) |
| h = 10 cm, a = 2 mm µ = 1, $r_{Bc}$ = 5 mm, $a_{Bc}$ = 0.25 mm, $N_{Bc}$ = 103 | (214.2) | (14.010) | (6.92 * 10⁵) | (3908) | (3886) |

In some examples, energy is transferred between two inductively-loaded rods. For the rate of energy transfer between two inductively-loaded rods 1 and 2 at distance D between their centers, the mutual capacitance $M_C$ can be evaluated numerically from Eq. (23) by using triangular current distributions in the case $\omega \ll \omega_s$. In this case, the coupling is only electric and again we have an analytical formula, which, in the quasi-static limit $h \ll D \ll \lambda$ and for the relative orientation such that the two rods are aligned on the same axis, is $1/M_C \approx 1/2\pi\epsilon_o \cdot (h_1 h_2)^2/D^3$ which means that $k \propto (\sqrt{h_1 h_2}/D)^3$ is independent of the frequency $\omega$. One can then get the resultant strong-coupling factor U.

It can be seen that the optimal frequency $\omega_U$, where the figure-of-merit is maximized to the value $U_{max}$, is close to the frequency $\omega_{Q_1 Q_2}$, where $Q_1 Q_2$ is maximized, since k does not depend much on frequency (at least for the distances $D \ll \lambda$ of interest for which the quasi-static approximation is still valid). Therefore, the optimal frequency $\omega_U \approx \omega_{Q_1 Q_2}$ is mostly independent of the distance D between the two rods and lies between the two frequencies $\omega_{Q_1}$ and $\omega_{Q_2}$ at which the single-rod $Q_1$ and $Q_2$ respectively peak. In some typical examples, one can tune the inductively-loaded conducting rods, so that their angular eigenfrequencies are close to $\omega_U$ within $\Gamma_U$, which is half the angular frequency width for which $U > U_{max}/2$.

Referring to Table 6, in parentheses (for similarity to previous tables) analytical results based on the above are shown for two systems each composed of a matched pair of the loaded rods described in Table 5. The average wavelength and loss rates are shown along with the coupling rate and coupling to loss ratio figure-of-merit $U=\kappa/\Gamma$ as a function of the coupling distance D, for the two cases. Note that for $\Gamma_{rad}$ the single-rod value is used. Again we chose $L_c \gg L_s$ to make the triangular-current assumption a good one and computed $M_C$ numerically from Eq. (23). The results show that for medium distances D/h=10–3 the expected coupling-to-loss ratios are in the range U~0.5-100.

TABLE 6

| pair of rods | D/h | $Q_\kappa = 1/k$ | U |
|---|---|---|---|
| h = 30 cm, a = 2 cm µ = 1, $r_{Bc}$ = 2 cm, $a_{Bc}$ = 0.88 mm, $N_{Bc}$ = 129 λ/h ≈ 404 Q ≈ 7380 | 3 | (70.3) | (105.0) |
| | 5 | (389) | (19.0) |
| | 7 | (1115) | (6.62) |
| | 10 | (3321) | (2.22) |
| h = 10 cm, a = 2 mm µ = 1, $r_{Bc}$ = 5 mm, $a_{Bc}$ = 0.25 mm, | 3 | (120) | (32.4) |
| | 5 | (664) | (5.85) |

TABLE 6-continued

| pair of rods | D/h | $Q_\kappa = 1/k$ | U |
|---|---|---|---|
| $N_{Bc} = 103$ | | | |
| $\lambda/h \approx 214$ | 7 | (1900) | (2.05) |
| $Q \approx 3886$ | 10 | (5656) | (0.69) |

2.4 Dielectric Disks

In some examples, one or more of the resonant objects are dielectric objects, such as disks. Consider a two dimensional dielectric disk object, as shown in FIG. 15(a), of radius r and relative permittivity ϵ surrounded by air that supports high-Q "whispering-gallery" resonant modes. The loss mechanisms for the energy stored inside such a resonant system are radiation into free space and absorption inside the disk material. High-$Q_{rad}$ and long-tailed subwavelength resonances can be achieved when the dielectric permittivity $\in$ is large and the azimuthal field variations are slow (namely of small principal number m). Material absorption is related to the material loss tangent: $Q_{abs} \sim \text{Re}\{\in\}/\text{Im}\{\in\}$. Mode-solving calculations for this type of disk resonances were performed using two independent methods: numerically, 2D finite-difference frequency-domain (FDFD) simulations (which solve Maxwell's Equations in frequency domain exactly apart for spatial discretization) were conducted with a resolution of 30 pts/r; analytically, standard separation of variables (SV) in polar coordinates was used.

TABLE 7

| single disk | $\lambda/r$ | $Q^{abs}$ | $Q^{rad}$ | Q |
|---|---|---|---|---|
| Re{ϵ} = 147.7, m = 2 | 20.01 (20.00) | 10103 (10075) | 1988 (1992) | 1661 (1663) |
| Re{ϵ} = 65.6, m = 3 | 9.952 (9.950) | 10098 (10087) | 9078 (9168) | 4780 (4802) |

The results for two TE-polarized dielectric-disk subwavelength modes of $\lambda/r \geq 10$ are presented in Table 7. Table 7 shows numerical FDFD (and in parentheses analytical SV) results for the wavelength and absorption, radiation and total loss rates, for two different cases of subwavelength-disk resonant modes. Note that disk-material loss-tangent Im{∈}/Re{∈}=$10^{-4}$ was used. (The specific parameters corresponding to the plot in FIG. 15(a) are highlighted with bold in the table.) The two methods have excellent agreement and imply that for a properly designed resonant low-loss-dielectric object values of $Q_{rad} \geq 2000$ and $Q_{abs} \sim 10000$ are achievable. Note that for the 3D case the computational complexity would be immensely increased, while the physics would not be significantly different. For example, a spherical object of ∈=147.7 has a whispering gallery mode with m=2, $Q_{rad}$=13962, and $\lambda/r$=17.

The required values of ∈, shown in Table 7, might at first seem unrealistically large. However, not only are there in the microwave regime (appropriate for approximately meter-range coupling applications) many materials that have both reasonably high enough dielectric constants and low losses (e.g. Titania, Barium tetratitanate, Lithium tantalite etc.), but also E could signify instead the effective index of other known subwavelength surface-wave systems, such as surface modes on surfaces of metallic materials or plasmonic (metal-like, negative-∈) materials-or metallo-dielectric photonic crystals or plasmono-dielectric photonic crystals.

To calculate now the achievable rate of energy transfer between two disks 1 and 2, as shown in FIG. 15(b) we place them at distance D between their centers. Numerically, the FDFD mode-solver simulations give κ through the frequency splitting of the normal modes of the combined system ($\delta_E$=2κ from Eq. (4)), which are even and odd superpositions of the initial single-disk modes; analytically, using the expressions for the separation-of-variables eigenfields $E_{1,2}(r)$ CMT gives κ through $\kappa = \omega_1/2 \cdot \int d^3r \in_2(r) E_2^*(r) E_1(r) / \int d^3r \in(r) |E_1(r)|^2$, where $\in_j(r)$ and $\in(r)$ are the dielectric functions that describe only the disk j (minus the constant $\in_o$ background) and the whole space respectively. Then, for medium distances D/r=10–3 and for non-radiative coupling such that D<$2r_c$, where $r_c$=mλ/2π is the radius of the radiation caustic, the two methods agree very well, and we finally find, as shown in Table 8, strong-coupling factors in the range U~1-50. Thus, for the analyzed examples, the achieved figure-of-merit values are large enough to be useful for typical applications, as discussed below.

TABLE 8

| two disks | D/r | $Q^{rad}$ | Q = ω/2Γ | ω/2κ | κ/Γ |
|---|---|---|---|---|---|
| Re{ϵ} = 147.7, | 3 | 2478 | 1989 | 46.9 (47.5) | 42.4 (35.0) |
| m = 2 | 5 | 2411 | 1946 | 298.0 (298.0) | 6.5 (5.6) |
| $\lambda/r \approx 20$ | 7 | 2196 | 1804 | 769.7 (770.2) | 2.3 (2.2) |
| $Q^{abs} \approx 10093$ | 10 | 2017 | 1681 | 1714 (1601) | 0.98 (1.04) |
| Re{ϵ} = 65.6, | 3 | 7972 | 4455 | 144 (140) | 30.9 (34.3) |
| m = 3 | 5 | 9240 | 4824 | 2242 (2083) | 2.2 (2.3) |
| $\lambda/r \approx 10$ | 7 | 9187 | 4810 | 7485 (7417) | 0.64 (0.65) |
| $Q^{abs} \approx 10096$ | | | | | |

Note that even though particular examples are presented and analyzed above as examples of systems that use resonant electromagnetic coupling for wireless energy transfer, those of self-resonant conducting coils, capacitively-loaded resonant conducting coils, inductively-loaded resonant conducting rods and resonant dielectric disks, any system that supports an electromagnetic mode with its electromagnetic energy extending much further than its size can be used for transferring energy. For example, there can be many abstract geometries with distributed capacitances and inductances that support the desired kind of resonances. In some examples, the resonant structure can be a dielectric sphere. In any one of these geometries, one can choose certain parameters to increase and/or optimize U or, if the Q's are limited by external factors, to increase and/or optimize for k or, if other system performance parameters are of importance, to optimize those.

3 Coupled-Mode Theory for Prediction of Far-Field Radiation Interference

The two objects in an energy-transfer system generate radiation, which can sometimes be a significant part of the intrinsic losses, and can interfere in the far field. In the previous Sections, we analyzed systems, where this interference phenomenon was not in effect. In this description, we will repeat the analysis, including the interference effects and will show how it can be used to further enhance the power transmission efficiency and/or the radiated power.

The coupled-mode equations of Eqs. (1) fail to predict such an interference phenomenon. In fact, the inability to predict interference phenomena has often been considered inherent to coupled-mode theory (CMT). However, we show here that making only a simple extension to this model, it can actually very successfully predict such interference. The root of the problem stems from the fact that the coupling coefficients were tacitly assumed to be real. This is usually the case when dealing with proper (real) eigenmodes of a Hermitian (lossless) operator. However, this assumption fails when losses are included, as is for example the current case dealing with generally non-proper (leaky, radiative) eigenmodes of a non-Hermitian (lossy) operator. In this case, the coupling-matrix elements will generally be complex and their imaginary parts will be shown to be directly related to far-field radiation interference.

Imagine a system of many resonators in proximity to each other. When their resonances have close enough frequencies compared to their coupling rates, the CMT assumption is that the total-system field $\psi$ is approximately determined only by these resonances as the superposition $\psi(t)=\Sigma_n a_n(t)\psi_n$, where $\psi_n$ is the eigenfield of the resonance n normalized to unity energy, and $a_n$ is the field amplitude inside it, which corresponds, due to the normalization, to $|a_n|^2$ stored energy. The fundamental Coupled-Mode Equations (CME) of CMT are then those of the evolution of the vector $a=\{a_n\}$ $$\frac{d}{dt}a = -i\overline{\Omega}\cdot a + i\overline{K}\cdot a \quad (34)$$

where the frequency matrix $\overline{\Omega}$ and the coupling matrix $\overline{K}$ are found usually using a Perturbation Theory (PT) approach.

We restate here one of the many perturbative formulations of CMT in a system of ElectroMagnetic (EM) resonators: Let $\mu=\mu_o$ and $\in=\in_o+\Sigma_n\in_n$ be the magnetic-permeability and dielectric-permittivity functions of space that describe the whole system, where $\in_n$ is the permittivity of only the dielectric, reciprocal and generally anisotropic object n of volume $V_n$, in excess to the constant $\mu_o, \in_o$ background space. Each resonator n, when alone in the background space, supports a resonant eigenmode of complex frequency $\Omega_n=\omega_n-i\Gamma_n$ and field profiles $\psi_n=[E_n, H_n]$ normalized to unity energy, satisfying the equations $\nabla\times E_n=i\Omega_n\mu_o H_n$ and $\nabla\times H_n=-i\Omega_n(\in_o+\in_n)E_n$, and the boundary condition $\hat{n}\times E_n=0$ on the potential metallic surface $S_n$ of object n. The whole system fields $\psi=[E, H]$ satisfy the equations $$\nabla\times E = -\mu\frac{\partial}{\partial t}H \text{ and } \nabla\times H = \in\frac{\partial}{\partial t}E,$$

and the boundary condition $\hat{n}\times E=0$ on $S=\Sigma_n S_n$. Then, start by expanding $\nabla\cdot(E\times H_n^- - E_n^-\times H)$ and integrating over all space, apply the CMT superposition assumption, and finally use the PT argument that, when the coupling-rates between the resonators are small compared to their frequencies, within a sum only terms of lowest order in this small perturbation need to be kept. The result is the CME of Eq. (34), with $\overline{\Omega}=\overline{W}^{-1}\cdot\overline{\Omega}_o\cdot\overline{W}$, $\overline{K}=\overline{W}^{-1}\cdot K_o$, where $\overline{\Omega}_o=\text{diag}\{\Omega_n\}$, $$K_{o,nm} = \frac{\Omega_n}{4}\int_{V_m} dv(E_n^-\cdot\varepsilon_m\cdot E_m) + \frac{i}{4}\oint_{S_m} da\hat{n}\cdot(E_n^-\times H_m) \quad (35)$$

$$W_{nm} = \frac{1}{4}\int_{V_m} dv(E_n^-\cdot\varepsilon\cdot E_m + H_n^-\cdot\mu\cdot H_m) \quad (36)$$

and where $\psi_n''=[E_n^-, H_n^-]$ satisfy the time-reversed equations (where $\Omega_n\to-\Omega n$). The choice of these fields in the analysis rather than $\psi_n^*=[E_n^*, H_n^*]$ allows to treat also lossy (due to absorption and/or radiation) but reciprocal systems (so $\overline{K}$ is complex symmetric but non-Hermitian). In the limit, though, of weak loss (high-Q resonances), these two sets of fields can be approximately equal. Therefore, again to lowest order, $\overline{W}\approx\overline{I}$, due to the unity-energy normalization, so $\overline{\Omega}\approx\overline{\Omega}_o$ and for $\overline{K}$ the off-diagonal terms $$K_{nm} \approx K_{o,nm} \approx \frac{i}{4}\int_{V_m} dv(E_n^*\cdot J_m); n\neq m \quad (37)$$

where $J_m$ includes both the volume-polarization currents $J_{p,m}=-i\Omega_m\in_m E_m$ in $V_m$ and the surface electric currents $J_{s,m}=\hat{n}\times H_m$ on $S_m$, while the diagonal terms $K_{nn}$ are higher-order small and can often lead to anomalous coupling-induced frequency shifts. The term of Eq. (37) can generally be complex $K_{nm}=\kappa_{nm}+i\Lambda_{nm}$ and, even though the physical interpretation of its real part is well understood, as describing the coupling between the resonators, it is not so the case for its imaginary part $$\Lambda_{nm} = \frac{1}{4}\text{Re}\left\{\int_{V_m} dv[i\omega A_n - \nabla\phi_n]^*\cdot J_m\right\} \quad (38)$$

$$= \frac{1}{4}\text{Re}\left\{\int_{V_m} dv\left[\int_{V_n} dv\frac{e^{ik|r_m-r_n|}}{4\pi|r_m-r_n|}\left(i\omega\mu_0 J_n + \frac{\rho_n}{\varepsilon_0}\nabla\right)\right]^*\cdot J_m\right\}$$

$$= \frac{\omega}{16\pi}\int_{V_m} dv\int_{V_n} dv\text{Re}\left\{\left(\frac{\rho_n^*\rho_m}{\varepsilon_0} - \mu_0 J_n^*\cdot J_m\right)\frac{e^{ik|r_m-r_n|}}{4\pi|r_m-r_n|}\right\}$$

where integration by parts was used for the $\nabla\phi_n$ term and the continuity equation $\nabla\cdot J=i\omega\rho$, with $\rho$ being the volume charge density.

Towards understanding this term, let us consider two resonators 1, 2 and evaluate from Eqs. (34) the total power lost from the system $$P_{loss} = -\frac{d}{dt}(|a_1|^2 + |a_2|^2) \quad (39)$$

$$= 2\Gamma_1|a_1|^2 + 2\Gamma_2|a_2|^2 + 4\Lambda_{12}\text{Re}\{a_1^*a_2\}$$

Clearly, the term involving an interaction between the two objects should not relate to material absorption, since this is a very localized process inside each object. We therefore split this lost power into absorbed and radiated in the following way $$P_{abs}=2\Gamma_{1,abs}|a_1|^2+2\Gamma_{2,abs}|a_2|^2 \quad (40)$$

$$P_{rad}=2\Gamma_{1,rad}|a_1|^2+2\Gamma_{2,rad}|a_2|^2+4\Lambda_{12}Re\{a_1^*a_2\} \quad (41)$$

so $\Lambda_{12}$ is associated with the radiation from the two-object system. However, we have a tool to compute this radiated power separately: Antenna Theory (AT).

Let $\zeta_o=\sqrt{\mu_o/\in_o}$ and $c_o=1/\sqrt{\mu_o\in_o}$ be the background impedance and light-velocity, and $f=(g,f)=\int_V dv'J^\nu(r')e^{-ik\cdot r'}$ the moment of the current-distribution 4-vector $J^\nu=(c_o\rho, J)$ of an electromagnetic resonator, where unity-energy normalization is again assumed for $J^\nu$ and $g=\hat{k}\cdot f$, as can be shown using the continuity equation and integration by parts. The power radiated from one EM resonator is:

$$P_{rad} = 2\Gamma_{rad}|a|^2 = \frac{\zeta_o k^2}{32\pi^2}\left(\oint d\Omega|f|^2\right)|a|^2 \quad (42)$$

where $|f|^2 = f^* \cdot f \equiv |f|^2 - |g|^2$. The power radiated from an 'array' of two resonators 1 and 2, at vector-distance D between their centers, is given by:

$$P_{rad} = \frac{\zeta_o k^2}{32\pi^2} \oint d\Omega |a_1 f_1 + a_2 f_2 e^{-ik \cdot D}|^2 \quad (43)$$

$$= \frac{\zeta_o k^2}{32\pi^2} \left[ \begin{array}{l} \left(\oint d\Omega |f_1|^2\right)|a_1|^2 + \left(\oint d\Omega |f_2|^2\right)|a_2|^2 + \\ 2\mathrm{Re}\left\{\oint d\Omega f_1^* \cdot f_2 e^{-ik \cdot D} a_1^* a_2\right\} \end{array} \right]$$

where $f_1^* \cdot f_2 \equiv f_1^* \cdot f_2 - g_1^* \cdot g_2$. Thus, by comparing Eqs. (41) and (43), using Eq. (42), $$\Lambda_{12} = \frac{\zeta_o k^2}{64\pi^2} \frac{\mathrm{Re}\left\{\oint d\Omega f_1^* \cdot f_2 e^{-ik \cdot D} a_1^* a_2\right\}}{\mathrm{Re}\{a_1^* a_2\}}. \quad (44)$$

namely $\Lambda_{12}$ is exactly the interference term in AT. By substituting for the 4-vector current-moments and making the change of variables $r_1 = r_1'$, $r_2 = r_2' + D$, $$\Lambda_{12} = \frac{\zeta_o k^2}{64\pi^2} \frac{\mathrm{Re}\left\{\int_{V_1} dv \int_{V_2} dv J_1^* \cdot J_2 \oint d\Omega e^{-ik \cdot (r_2 - r_1)} a_1^* a_2\right\}}{\mathrm{Re}\{a_1^* a_2\}} \quad (45)$$

$$= \frac{\zeta_o k}{16\pi} \frac{\mathrm{Re}\left\{\int_{V_1} dv \int_{V_2} dv J_1^* \cdot J_2 \frac{\sin(k|r_2 - r_1|)}{|r_2 - r_1|} a_1^* a_2\right\}}{\mathrm{Re}\{a_1^* a_2\}}$$

where we evaluated the integral over all angles of k with $r_2 - r_1$.

Note now that Eqs. (38) and (45) will become identical, if we can take the currents $J_{1,2}^\nu$ to be real. This is indeed the case for eigenmodes, where the field solution in bounded regions (such as those where the currents are flowing) is always stationary (in contrast to the leaky part of the eigenmode, which is radiative) and for high enough Q it can be chosen so that it is approximately real in the entire bounded region. Therefore, from either Eq. (38) or (45) we can write $$\Lambda_{12} = \frac{\zeta_o k}{16\pi} \int_{V_1} dv \int_{V_2} dv J_1 \cdot J_2 \frac{\sin(k|r_2 - r_1|)}{|r_2 - r_1|} \quad (46)$$

and from Eq. (44), using Eq. (42), we can define the interference factor $$V_{rad,12} \equiv \frac{\Lambda_{12}}{\sqrt{\Gamma_{1,rad} \Gamma_{2,rad}}} = \frac{\oint d\Omega f_1^* \cdot f_2 e^{-ik \cdot D}}{\sqrt{\oint d\Omega |f_1|^2 \oint d\Omega |f_2|^2}} \quad (47)$$

We have shown that, in the high-Q limit, both PT and AT give the same expression for the imaginary part $\Lambda_{nm}$ of the coupling coefficient, which thus physically describes within CMT the effects of far-field radiation interference. Again, this phenomenon was so far not considered to be predictable from CMT.

4 Efficiency Enhancement and Radiation Suppression by Far-Field Destructive Interference Physically, one can expect that far-field radiation interference can in principle be engineered to be destructive, resulting in reduced overall radiation losses for the two-object system and thus in enhanced system efficiency. In this section, we show that, indeed, in the presence of far-field interference, energy transfer can be more efficient and with less radiated power than what our previous model predicts.

Once more, we will treat the same temporal energy-transfer schemes as before (finite-amount and finite-rate), so that a direct comparison can be made.

4.1 Finite-Amount Energy-Transfer Efficiency

Considering again the source and device objects 1,2 to include the interference effects, the same CMT equations as in Eq. (1) can be used, but with the substitutions $\kappa_{nm} \rightarrow K_{nm} = \kappa_{nm} + i\Lambda_{nm}$; n, m=1,2. The real parts $\kappa_{11,22}$ can describe, as before, the shift in each object's resonance frequency due to the presence of the other; the imaginary parts $\Lambda_{11,22}$ can describe the change in the losses of each object due to the presence of the other (due to absorption in it or scattering from it, in which latter case losses could be either increased or decreased); both of these are second-order effects and, for the purposes of our mathematical analysis, can again be absorbed into the complex eigenfrequencies by setting $\omega_{1,2} \rightarrow \omega_{1,2} + \kappa_{11,22}$ and $\Gamma_{1,2} \rightarrow \Gamma_{1,2} - \Lambda_{11,22}$. The real parts $\kappa_{12,21}$ can denote, as before, the coupling coefficients; the imaginary parts $\Lambda_{12,21}$ can describe the far-field interference, as was shown in Section 3; again, from reciprocity $K_{12} = K_{21} \equiv K = \kappa + i\Lambda$ (note that for a Hermitian problem, the additional requirement $K_{12} = K_{21}^*$ would impose K to be real, which makes sense, since without losses there cannot be any radiation interference).

Substituting $\kappa \rightarrow \kappa + i\Lambda$ into Eq. (2), we can find the normal modes of the system including interference effects. Note that, when the two objects are at exact resonance $\omega_1 = \omega_2 \equiv \omega_o$ and $\Gamma_1 = \Gamma_2 \equiv \Gamma_o$, the normal modes are found to be $$\Omega_+ = (\omega_0 + \kappa) - i(\Gamma_0 - \Lambda) \text{ and } \Omega_- = (\omega_0 - \kappa) - i(\Gamma_0 + \Lambda), \quad (48)$$

which is exactly the typical case for respectively the odd and even normal modes of a system of two coupled objects, where for the even mode the objects' field-amplitudes have the same sign and thus the frequency is lowered and the radiative far-fields interfere constructively so loss is increased, while for the odd mode the situation is the opposite. This is another confirmation for the fact that the coefficient $\Lambda$ can describe the far-field interference phenomenon under examination.

To treat now again the problem of energy transfer to object 2 from 1, but in the presence of radiative interference, again simply substitute $\kappa \rightarrow \kappa + i\Lambda$ into Eq. (3). Note that, at exact resonance $\omega_1 = \omega_2$ and, in the special case $\Gamma_1 = \Gamma_2 \equiv \Gamma_o$, we can just substitute into Eq. (4) $U \rightarrow U + iV$, where $U \equiv \kappa/\Gamma_o$ and $V \equiv \Lambda/\Gamma_o$, and then, with $T \equiv \theta_o t$, the evolution of the device field-amplitude becomes $$\frac{a_2(T)}{|a_1(0)|} = \sin[(U + iV)T] \cdot e^{-T} \quad (49)$$

Now the efficiency $\eta_E \equiv |a_2(t)|^2/|a_1(0)|^2$ can be optimized for the normalized time T* which is the solution of the transcendental equation $$\mathrm{Re}\{(U+iV) \cdot \cot[(U+iV)T^*]\} = 1 \quad (50)$$

and the resulting optimal energy-transfer efficiency depends only on U, V and is depicted in FIG. 16(c), evidently increasing with V for a fixed U.

4.2 Finite-Rate Energy-Transfer (Power-Transmission) Efficiency

Similarly, to treat the problem of continuous powering of object 2 by 1, in the presence of radiative interference, simply substitute $U \rightarrow U+iV$ into the equations of Section 1.2, where $V \equiv \Lambda/\sqrt{\Gamma_1 \Gamma_2}$ we call the strong-interference factor and quantifies the degree of far-field interference that the system experiences compared to loss. In practice, the parameters $D_{1,2}$, $U_{1,2}$ can be designed (engineered), since one can adjust the resonant frequencies $\omega_{1,2}$ (compared to the desired operating frequency $\omega$) and the generator/load supply/drain rates $\kappa_{1,2}$. Their choice can target the optimization of some system performance-characteristic of interest.

In some examples, a goal can be to maximize the power transmission (efficiency) $\eta_P \equiv |S_{21}|^2$ of the system. The symmetry upon interchanging $1 \leftrightarrow 2$ is then preserved and, using Eq. (11), the field-amplitude transmission coefficient becomes $$S_{21} = \frac{2i(U+iV)U_0}{(1+U_0-iD_0)^2 + (U+iV)^2}. \tag{51}$$

and from $\eta'_P(D_o)=0$ we get that, for fixed U, V and $U_o$, the efficiency can be maximized for the symmetric detuning $$D_0 = \begin{cases} 2\sqrt{a}\cos\left(\frac{\theta + 2v\pi}{3}\right); v=0,1, & \text{if } U^{\frac{2}{3}} - V^{\frac{2}{3}} > (1+U_0)^{\frac{2}{3}} \\ \sqrt[3]{\beta + \sqrt{\beta^2 - \alpha^3}} + \sqrt[3]{\beta - \sqrt{\beta^2 - \alpha^2}} & \text{if } U^{\frac{2}{3}} - V^{\frac{2}{3}} \leq (1+U_0)^{\frac{2}{3}} \end{cases} \tag{52}$$

where $\alpha \equiv [U^2 - V^2 - (1+U_o)^2]/3, \beta \equiv UV(1+U_o)$, $\theta = \tan^{-1}\sqrt{\alpha^3/\beta^2 - 1}$ and $U^{2/3} - V^{2/3} > (1+U_o)^{2/3} \Leftrightarrow \alpha^3 - \beta^2 > 0 \Leftrightarrow \alpha > 0$. Note that, in the first case, the two peaks of the transmission curve are not equal for V>0, but the one at higher frequencies (v=0$\Rightarrow$positive detuning) corresponding to the odd system normal mode is higher, as should be expected, since the odd mode is the one that radiates less. Finally, by substituting $D_o$ into $\eta_P$ from Eq. (52), then from $\eta'_P(U_o)=0$ we get that, for fixed U and V, the efficiency can be maximized for $$U_0^* = \sqrt{(1+U^2)(1-V^2)} \text{ and } D_0^* = UV. \tag{53}$$

Figure 16:
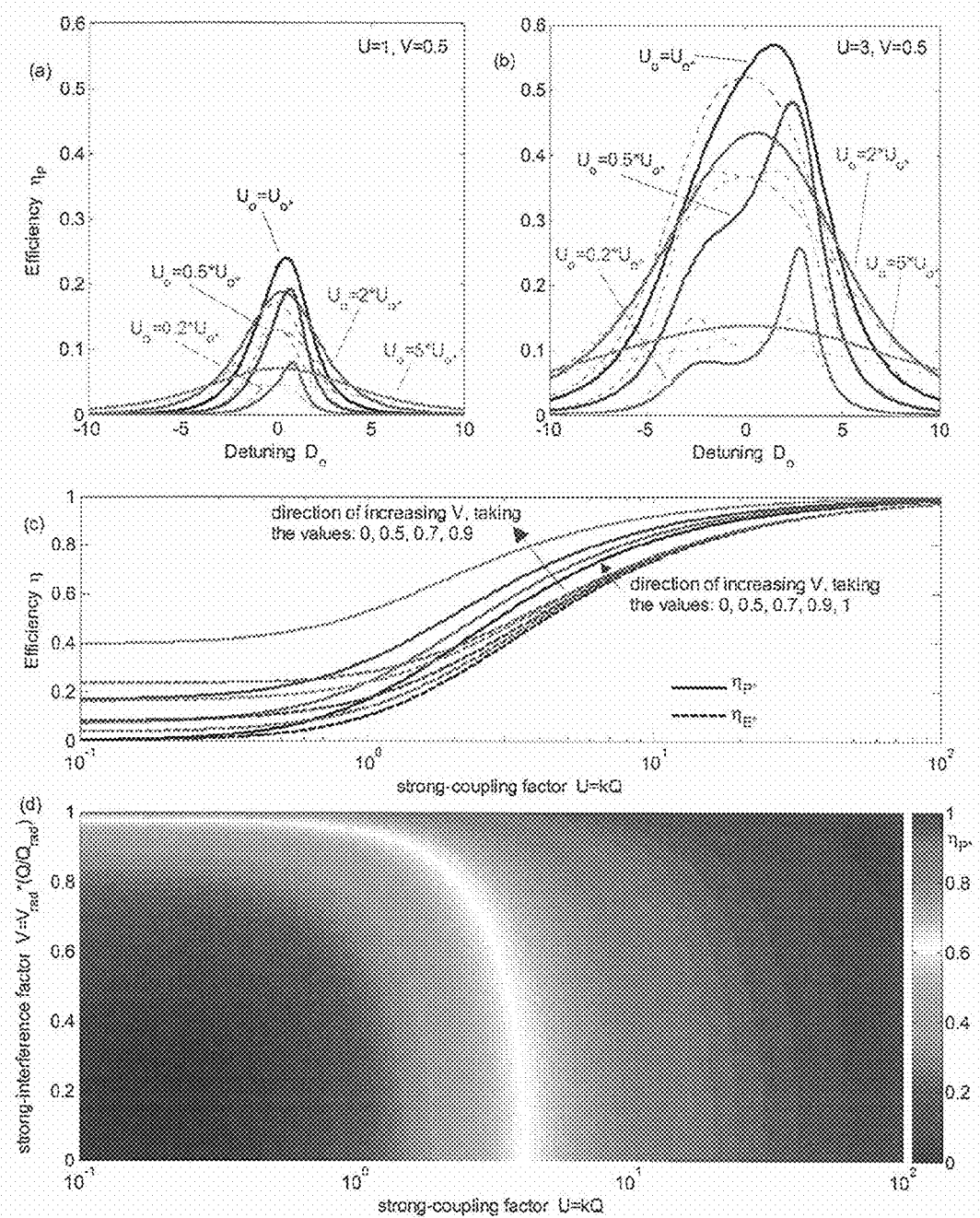
FIGS. 16(a)-(b) show the efficiency of power transmission $\eta_P$ for (a) U=1, V=0.5 and (b) U=3, V=0.5, as a function of the frequency detuning Do and for different values of the loading rate $U_o$. (The dotted lines show, for comparison, the results when there is no interference, as shown in FIG. 2(a)-(b).)
FIGS. 16(c)-(d) show the optimal (for optimal detuning and under conditions of impedance matching) efficiency for energy transfer (only in (c)) and power transmission, as a function of the strong-coupling factor U and the strong-interference factor V.

The dependence of the efficiency on $D_o$ for different $U_o$, (including the new 'critical-coupling' condition) are shown in FIGS. 16(a,b). The overall optimal power efficiency using Eqs. (53) is $$\eta_{P^*} \equiv \eta_P(D_{0*}, U_{0*}) = \frac{U^2 + V^2}{(U_{0*}+1)^2 + U^2 V^2} \tag{54}$$

which depends only on U, |V| and is depicted in FIGS. 16(c, d), increasing with |V| for a fixed U, and actually $\eta_P \rightarrow 1$ as $|V| \rightarrow 1$ for all values of U.

In some examples, a goal can be to minimize the power reflection at the side of the generator $|S_{11}|^2$ and the load $|S_{22}|^2$. The symmetry upon interchanging $1 \leftrightarrow 2$ is again preserved and, using then Eq. (17), one would require the 'impedance matching' condition $$(1-iD_0)^2 - U_0^2 + (U+iV)^2 = 0 \tag{55}$$

from which again we easily find that the values of $D_o$ and $U_o$ that cancel all reflections are exactly those in Eqs. (53).

In some examples, it can be of interest to minimize the power radiated from the system, since e.g. it can be a cause of interference to other communication systems, while still maintaining good efficiency. In some examples, the two objects can be the same, and then, using Eq. (41), we find $$\eta_{rad} \equiv \frac{P_{rad}}{|S_{+1}|^2} = \frac{4U_0(|1+U_0-iD_0|^2 + |U+iV|^2)\frac{Q}{Q_{rad}} -}{|(1+U_0-iD_0)^2 + (U+iV)^2|^2} \tag{56}$$

Then, to achieve our goal, we maximize $\eta_P/\eta_{rad}$ and find that this can be achieved for $$U_0^{} = \sqrt{1+U^2 - V_{rad}^2 U^2 + V^2 - 2VV_{rad}} \text{ and } D_{0} = UV_{rad}, \tag{57}$$

where $V_{rad} \equiv \Lambda/\sqrt{\Gamma_{1,rad}\Gamma_{2,rad}}$, as defined in Eq. (47), we call the interference factor and quantifies the degree of far-field interference that the system experiences compared to the radiative loss, thus $$V_{rad} = V\sqrt{\frac{Q_{1,rad}}{Q_1}\frac{Q_{2,rad}}{Q_2}} \geq V,$$

and $V=V_{rad}$ when all loss is radiative, in which case Eq. (57) reduces to Eq. (53).

In this description, we suggest that, for any temporal energy-transfer scheme and given some achieved coupling-to-loss ratio, the efficiency can be enhanced and the radiation can be suppressed by shifting the operational frequency away from exact resonance with each object's eigenfrequency and closer to the frequency of the odd normal-mode, which suffers less radiation due to destructive far-field interference. It is the parameters $$U = \frac{\kappa}{\sqrt{\Gamma_1 \Gamma_2}} = k\sqrt{Q_1 Q_2} \tag{58}$$

and $$V = \frac{\Lambda}{\sqrt{\Gamma_1 \Gamma_2}} = V_{rad}\sqrt{\frac{Q_1}{Q_{1,rad}}\frac{Q_2}{Q_{2,rad}}}$$

that are the figures-of-merit for any system under consideration for wireless energy-transfer, along with the distance over which large U, |V| can be achieved. Clearly, also |V| can be a decreasing function of distance, since two sources of radiation distant by more than a few wavelengths do not interfere substantially. It is important also to keep in mind that the magnitude of V depends on the degree to which radiation dominates the objects' losses, since it is only these radiative losses that can contribute to interference, as expressed from $V_{rad} \geq V$.

To achieve a large strong-interference factor V, in some examples, the energy-transfer application preferably uses again subwavelength resonances, because, for a given source-device distance, the interference factor $V_{rad}$ will increase as frequency decreases, since naturally the odd mode of two coupled objects, distant much closer than a wavelength, will not radiate at all.

To achieve a large strong-interference factor V, in some examples, the energy-transfer application preferably uses resonant modes of high factors $Q/Q_{rad}$. This condition can be satisfied by designing resonant modes where the dominant loss mechanism is radiation. As frequency decreases, radiation losses always decrease and typically systems are limited by absorption losses, as discussed earlier, so $Q/Q_{rad}$ decreases; thus, the advantage of interference can be insignificant at some point compared to the deterioration of absorption-Q.

Therefore, $|V|$ will be maximized at some frequency $\omega_V$, dependent on the source-device distance, and this optimal frequency will typically be different than $\omega_U$, the optimal frequency for U. As seen above, the problem of maximizing the energy-transfer efficiency can require a modified treatment in the presence of interference. The choice of eigenfrequency for the source and device objects as $\omega_U$, where U is maximum, can not be a good one anymore, but also V needs to be considered. The optimization of efficiency occurs then at a frequency $\omega_\eta$ between $\omega_U$ and $\omega_V$ and is a combined problem, which will be demonstrated below for few examples of electromagnetic systems.

Moreover, note that, at some fixed distance between the source and device objects, the figures U, V can not be maximized for the same set of system parameters; in that case, these parameters could be chosen so that the efficiency of Eq. (54) is maximized.

In the following section, we calculate a magnitude of efficiency improvement and radiation reduction for realistic systems at mid-range distances between two objects, by employing this frequency detuning and by doing a joint optimization for U, V.

5 Far-Field Interference at Mid-Range Distances for Realistic Systems

In the case of two objects 1, 2 supporting radiative electromagnetic resonant modes of the same eigenfrequency $\omega_1=\omega_2\equiv\omega_o$ and placed at distance D between their arbitrarily-chosen centers, so that they couple in the near field and interfere in the far field, the interference factor $V_{rad}$ is predicted from antenna theory (AT) to be that in Eq. (47).

We have also seen above how to compute the resonance quality factors Q and $Q_{rad}$, for some example structures, and thus we can compute the factor $Q/Q_{rad}$.

We will demonstrate the efficiency enhancement and the radiation suppression due to interference for the two examples of capacitively-loaded conducting loops and dielectric disks. The degree of improvement will be shown to depend on the nature of the system.

5.1 Capacitively-Loaded Conducting Loops

Consider two loops 1, 2 of radius r with N turns of conducting wire with circular cross-section of radius a at distance D, as shown in FIG. 10. It was shown in Section 2.2 how to calculate the quality, coupling and strong-coupling factors for such a system.

Figure 17:
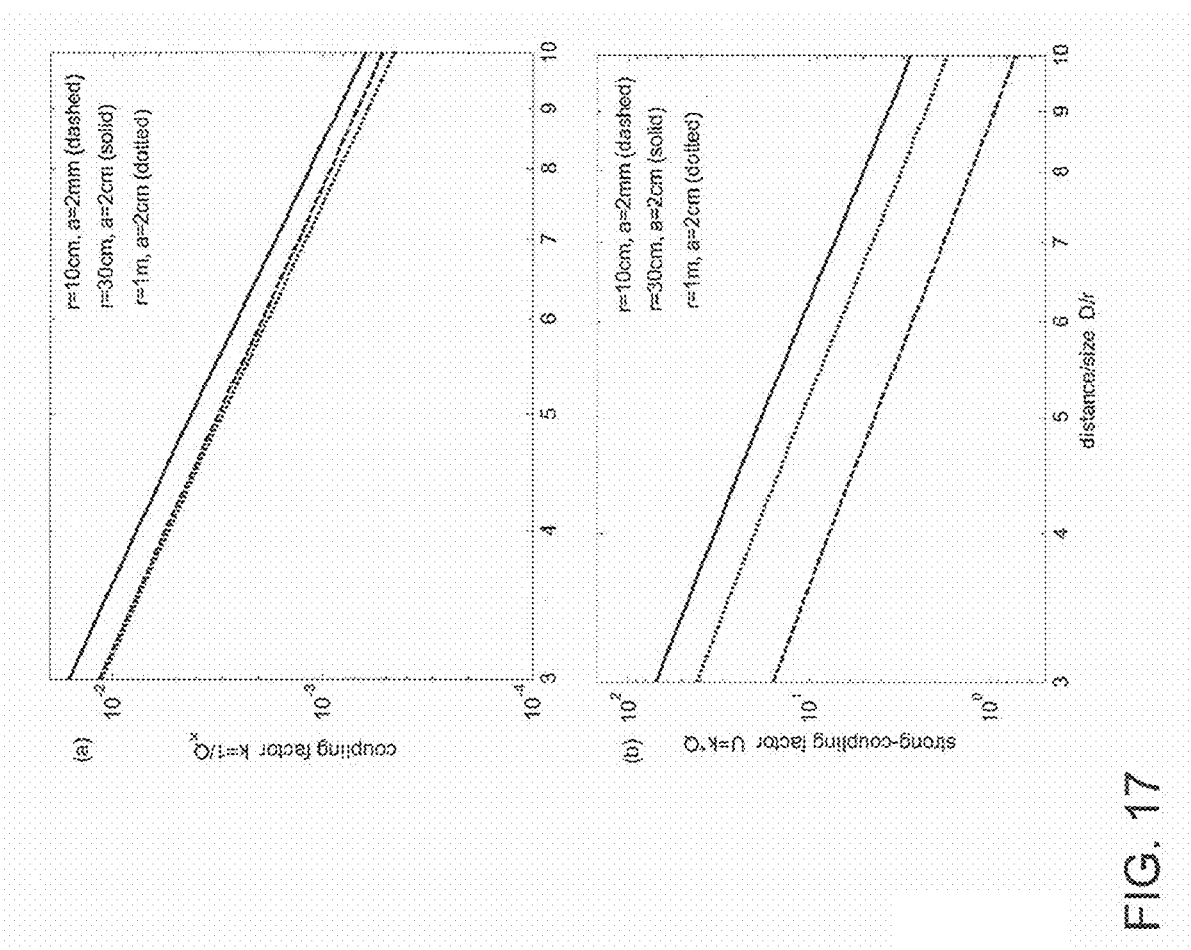
FIG. 17 shows coupled-mode theory (CMT) results for (a) the coupling factor k and (b) the strong-coupling factor U as a function of the relative distance D/r between two identical capacitively-loaded conducting single-turn loops, for three different dimensions of the loops. Note that, for conducting material, copper ($\sigma$=5.998·10$^7$ S/m) was used.

Their coupling factor is shown in FIG. 17(a) as a function of the relative distance D/r, for three different dimensions of single-turn (N=1) loops. Their strong-coupling factor at the eigenfrequency $\omega_{Q_1Q_2}$ is shown in FIG. 17(b). The approximate scaling k, U $\propto (r/D)^3$, indicated by Eqs. (26) and (27), is apparent.

Figure 18:
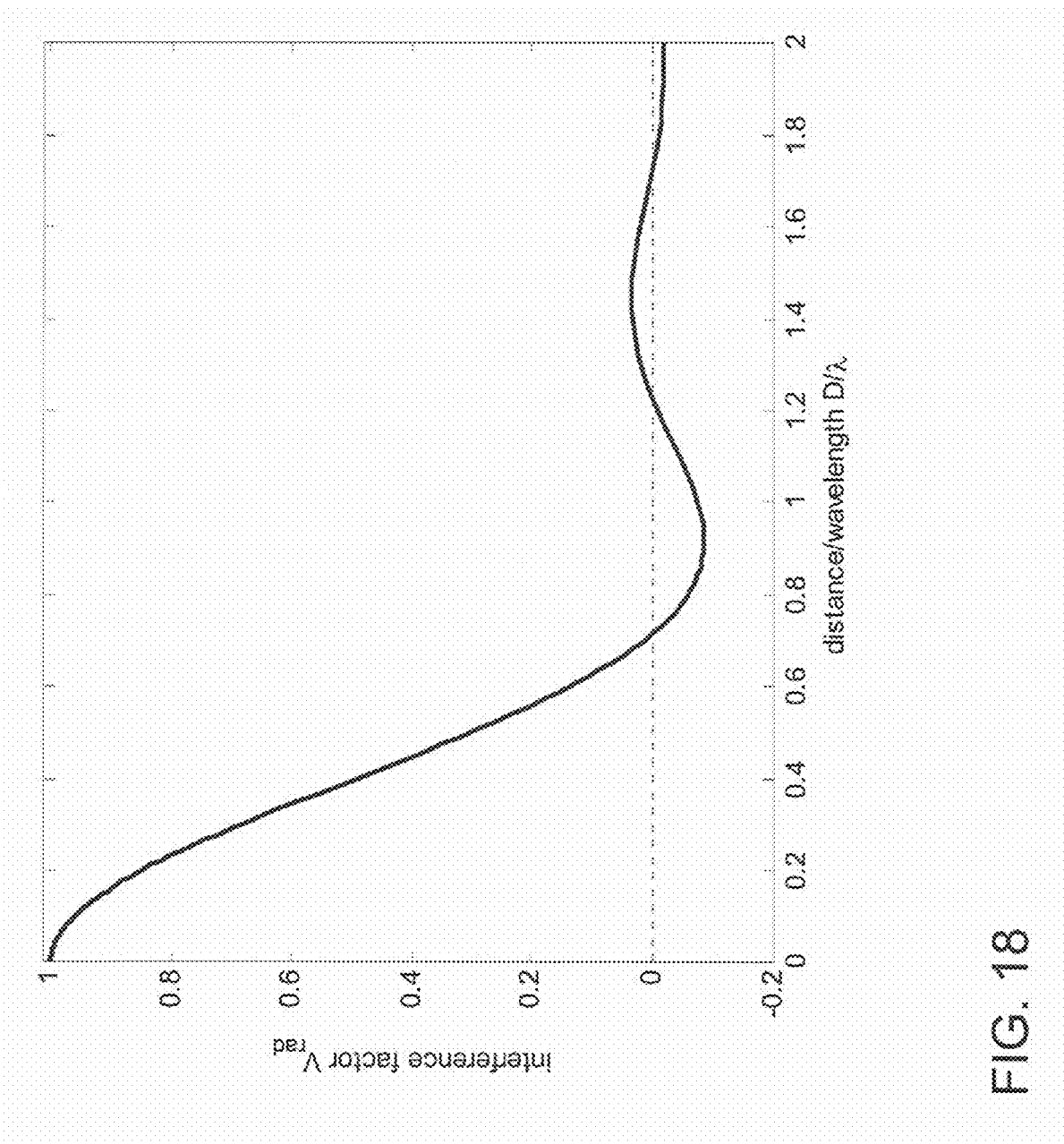
FIG. 18 shows AT results for the interference factor $V_{rad}$ as a function of the distance D (normalized to the wavelength $\lambda$) between two capacitively-loaded conducting loops.

We compute the interference parameter between two coupled loops at distance D, using the AT analysis Eq. (47), leading to Consider two loops 1, 2 of radius r with N turns of conducting wire with circular cross-section of radius a at distance D, as shown in FIG. 10. It was shown in Section 2.2 how to calculate the quality, coupling and strong-coupling factors for such a system. Their coupling factor is shown in FIG. 17(a) as a function of the relative distance D/r, for three different dimensions of single-turn (N=1) loops. Their strong-coupling factor at the eigenfrequency $\omega_{Q_1Q_2}$ is shown in FIG. 17(b). The approximate scaling k, U $\propto (r/D)^3$, indicated by Eqs. (26) and (27), is apparent. We compute the interference parameter between two coupled loops at distance D, using the AT analysis Eq. (47), leading to $$V_{rad} = \frac{3}{(kD)^3}[\sin(kD) - (kD)\cos(kD)], \quad (59)$$

for the orientation of optimal coupling, where one loop is above the other. Their interference factor is shown in FIG. 18 as a function of the normalized distance D/$\lambda$, where it can be seen that this factor has nulls only upon reaching the radiative regime. Since the resonant loops are highly subwavelength (in many examples $\lambda/r \gtrsim 50$), at mid-range distances (D/r $\lesssim$ 10), we expect D/$\lambda \lesssim 0.2$ and thus the interference factor to be very large ($V_{rad} > 0.8$).

At a fixed resonant frequency, in some examples, the factor $Q/Q_{rad}$ can be increased by increasing the radii r of the loops. In some examples, the factor $Q/Q_{rad}$ can be increased by increasing the number N of turns of the loops. In some examples, the factor $Q/Q_{rad}$ can be increased by increasing the radius a of the conducting wire of the loops or by using Litz wire or a ribbon to reduce the absorption losses and thus make radiation more dominant loss mechanism.

Figure 19:
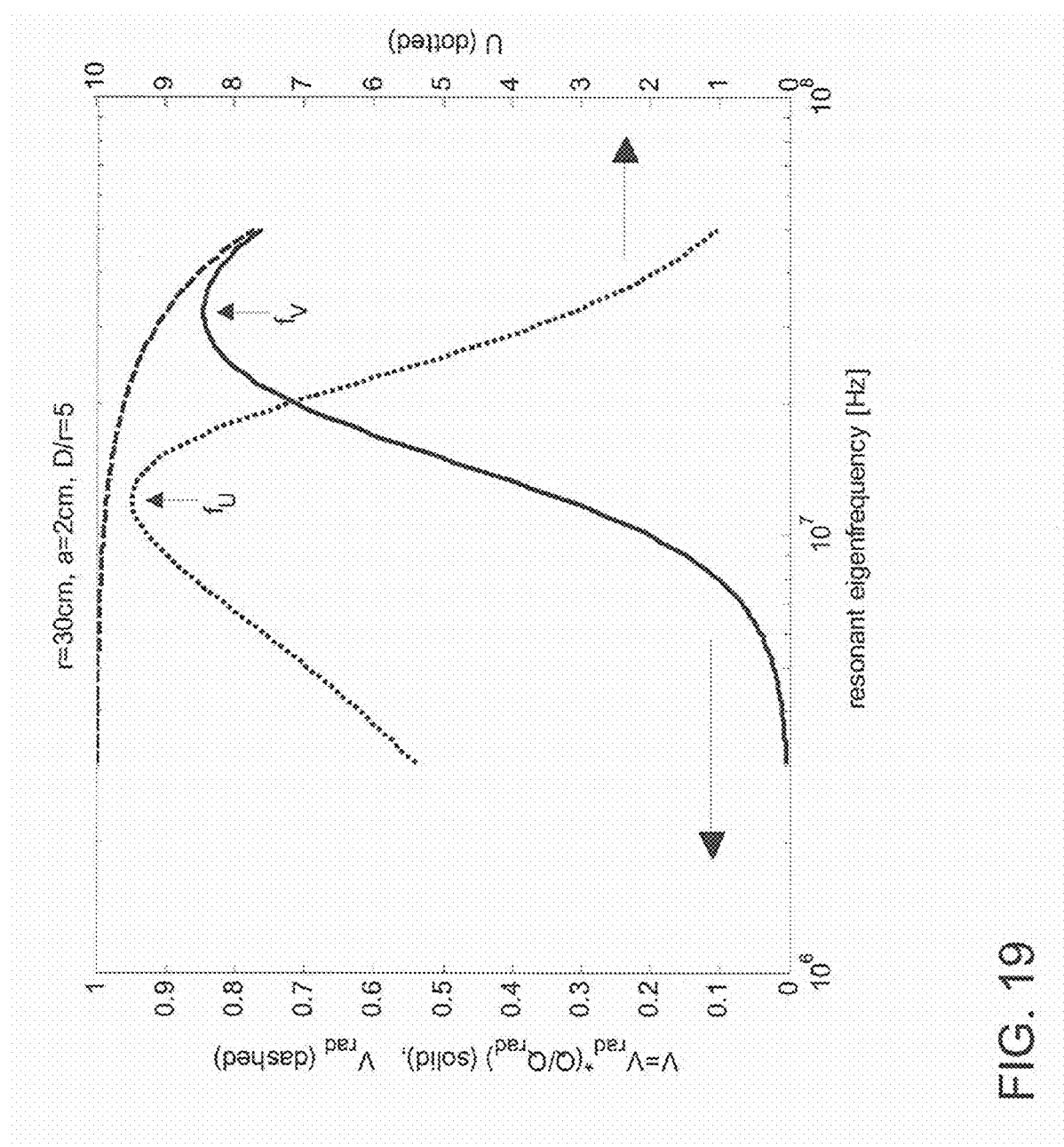
FIG. 19 shows CMT results for the strong-coupling factor U and AT results for the interference factor $V_{rad}$ and strong-interference factor V as a function of the resonant eigenfrequency of two identical capacitively-loaded conducting single-turn loops with r=30 cm and a=2 cm, at a relative distance D/r=5 between them. Note that, for conducting material, copper ($\sigma$=5.998·10$^7$ S/m) was used.

We also plot in FIG. 19, for the example r=30 cm and a=2 cm, the strong-coupling factor U, the interference factor $V_{rad}$ and the strong-interference factor V as a function of the resonant eigenfrequency of the loops, for a fixed distance D=5r. Indeed, for this example, $V_{rad}$ decreases monotonically with frequency in this subwavelength regime and is always great than 0.8, but V exhibits a maximum, since the term $Q/Q_{rad}$ is increasing towards 1 with frequency, as losses become more and more radiation dominated. It can be seen that the resonant eigenfrequencies $f_U$ and $f_V$, at which U and V become maximum respectively, are different. This implies that the efficiency will now riot necessarily peak at the eigenfrequency $f_U$, at which U is maximized, as would be the assumption based on prior knowledge, but at a different one $f_\eta$ between $f_U$ and $f_V$. This is shown below.

Figure 20:
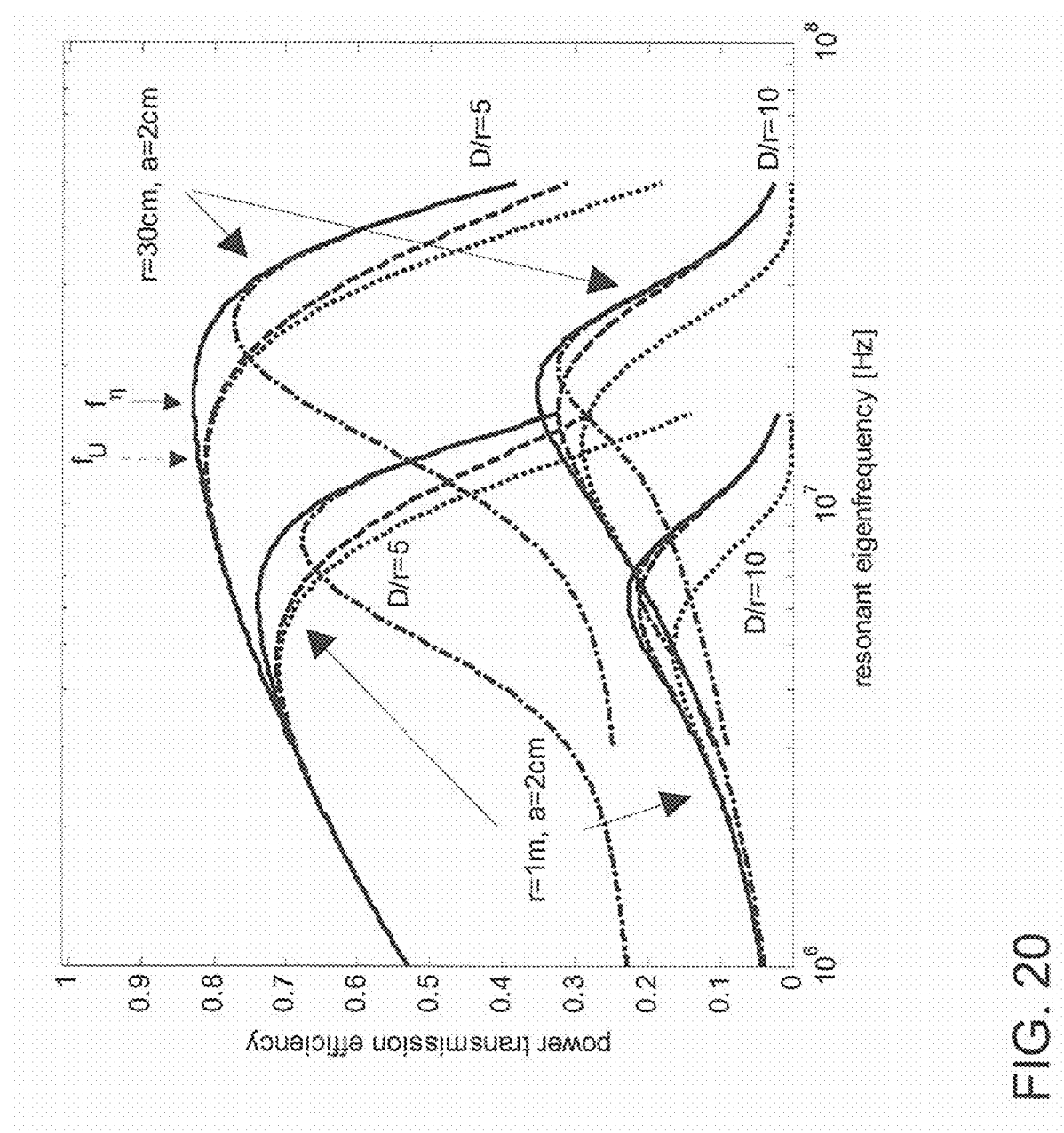
FIG. 20 shows the power-transmission efficiency as a function of the resonant eigenfrequency of two identical capacitively-loaded conducting single-turn loops. Results for two different loop dimensions are shown and for two relative distances between the identical loops. For each loops dimension and distance, four different cases are examined: without far-field interference (dotted), with far-field interference but no driving-frequency detuning (dashed) and with driving-frequency detuning to maximize either the efficiency (solid) or the ratio of efficiency over radiation (dash-dotted).

In FIG. 20 the efficiency $\eta_P$ is plotted as a function of the resonant eigenfrequency of the loops for two different examples of loop dimensions r=30 cm, a=2 cm and r=1 m, a=2 cm, at two different loop distances D=5r and D=10r, and for the cases:

(i) (solid lines) including interference effects and detuning the driving frequency from the resonant frequency by $D_o$=UV from Eq. (53) to maximize the power-transmission efficiency and similarly using $U_o$ from Eq. (53), which thus implies optimal efficiency as in Eq. (54).

(ii) (dash-dotted lines) including interference effects and detuning the driving frequency from the resonant frequency by $D_o$=UV$_{rad}$ from Eq. (57) to maximize the ratio of power transmitted over power radiated and similarly using $U_o$ from Eq. (57).

(iii) (dashed lines) including interference effects but not detuning the driving frequency from the resonant frequency and using $U_o$ from Eq. (14), as one would do to maximize efficiency in the absence of interference.

(iv) (dotted lines) truly in the absence of interference effects and thus maximizing efficiency by not detuning the driving frequency from the resonant frequency and using $U_o$ from Eq. (14), which thus implies efficiency as in Eq. (15).

Figure 21:
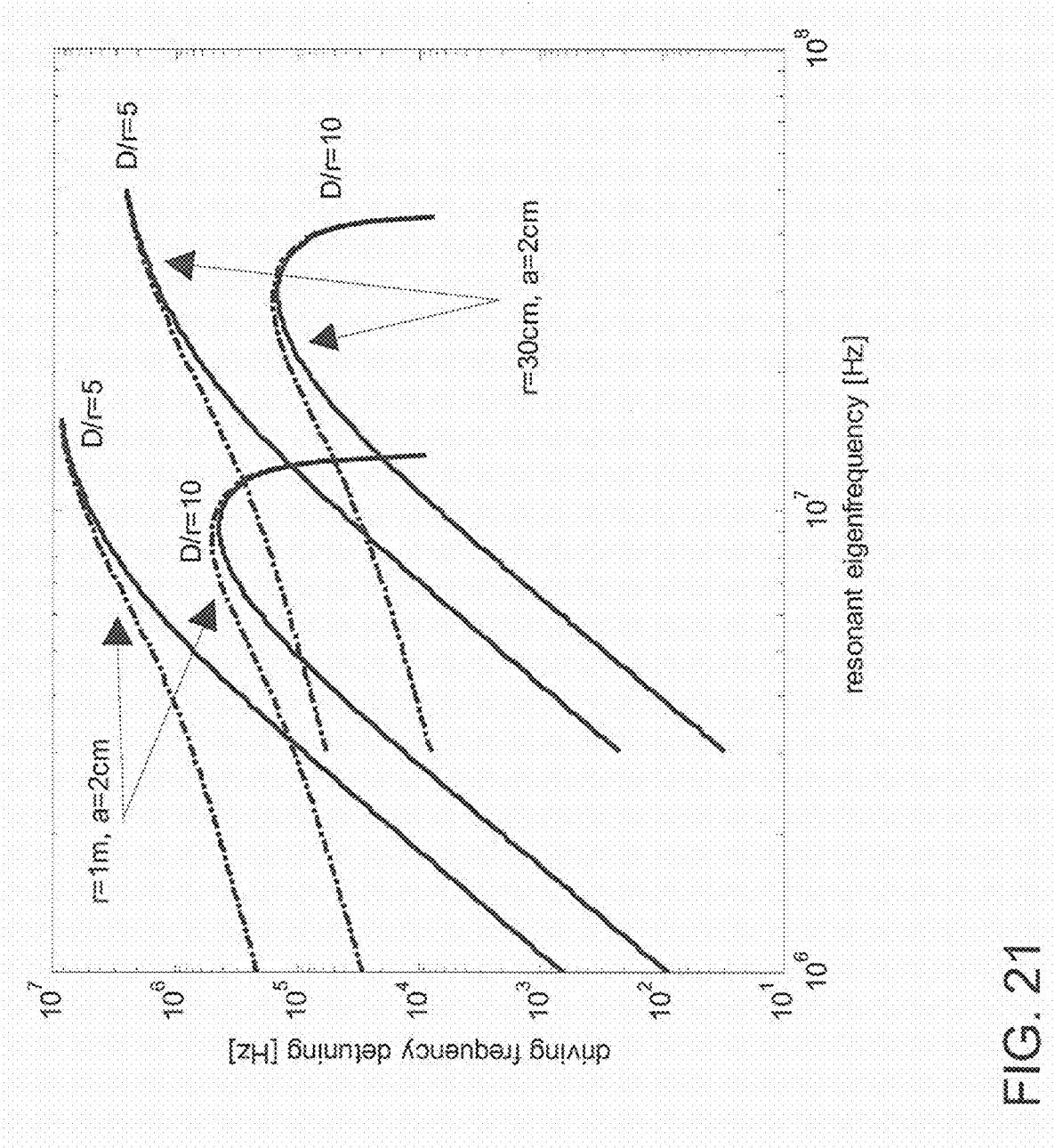
FIG. 21 shows the driving-frequency detunings required in the presence of far-field interference as a function of the resonant eigenfrequency of two identical capacitively-loaded conducting single-turn loops of FIG. 20 to maximize either the efficiency (solid) or the ratio of efficiency over radiation (dash-dotted).

In FIG. 21 we show the amount of driving-frequency detuning that is used in the presence of interference either to maximize efficiency (case (i) (solid lines) of FIG.

20—$D_o$=UV) or to maximize the ratio of power transmitted over power radiated (case (ii) (dash-dotted lines) of FIG. 20—$D_o$=UV$_{rad}$). Clearly, this driving-frequency detuning can be a non-trivial amount.

It can be seen from FIG. 20 that, for all frequencies, the efficiency of case (i) (solid lines) is larger than the efficiency of case (iii) (dashed lines) which is in turn larger than the efficiency of case (iv) (dotted lines). Therefore, in this description, we suggest that employing far-field interference improves on the power-transmission efficiency (improvement from (iv) (dotted) to (iii) (dashed)) and, furthermore, employing destructive far-field interference, by detuning the driving frequency towards the low-radiation-loss odd normal mode, improves on the power-transmission efficiency even more (improvement from (iii) (dashed) to (i) (solid)).

If $f_{72}$ is the eigenfrequency, at which the efficiency of case (i) (solid) is optimized, then, in some examples, the resonant eigenfrequency can be designed to be larger than $f_n$, namely in a regime where the system is more radiation dominated. In this description, we suggest that at such eigenfrequencies, there can be a significant improvement in efficiency by utilizing the destructive far-field interference effects and driving the system at a frequency close to the odd normal mode. This can be seen again from FIG. 20 by comparing the solid lines to the corresponding dashed lines and the dotted lines.

Figure 22:
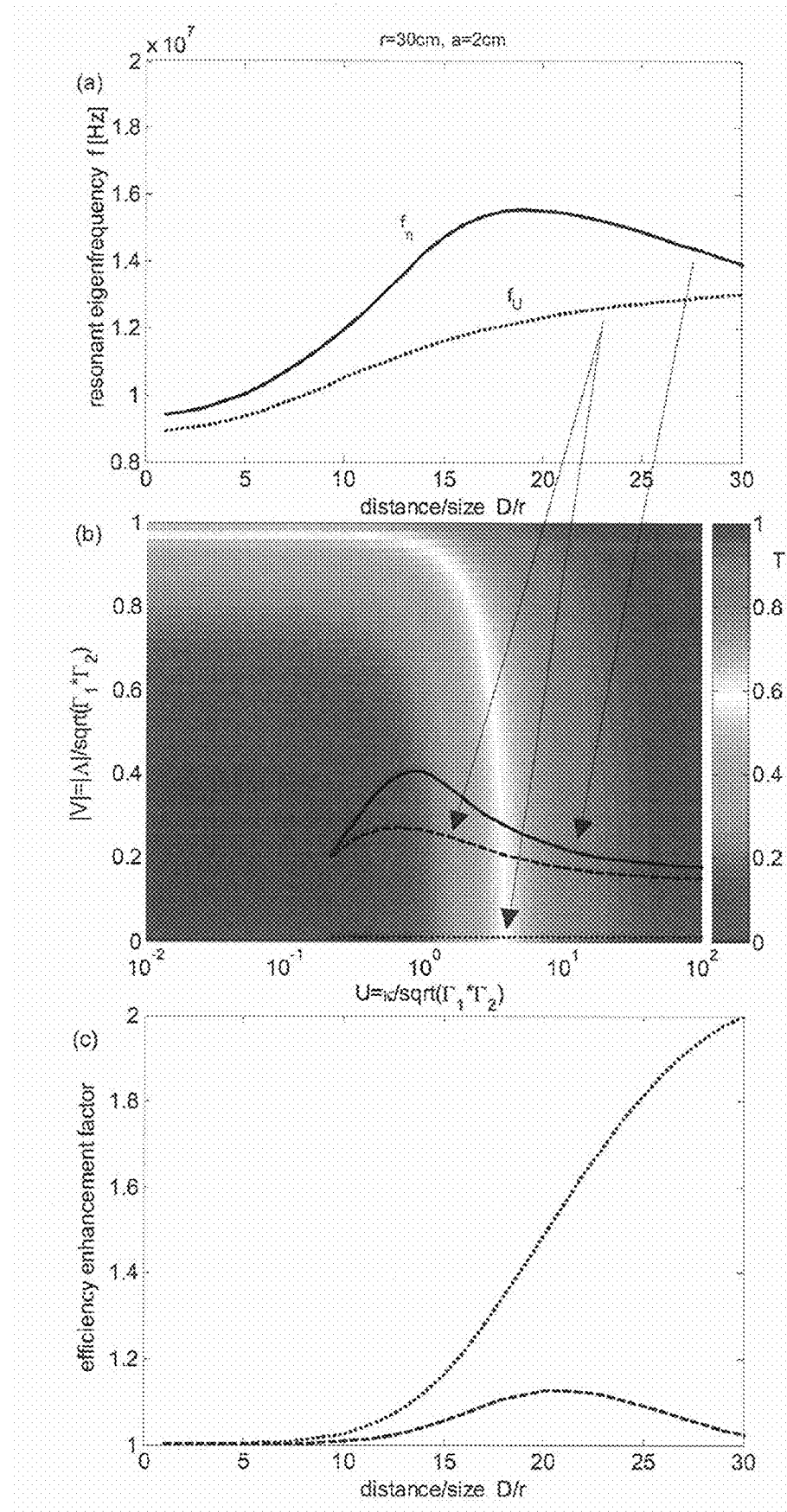
FIG. 22(a) shows the resonant eigenfrequencies $f_U$ and $f_\eta$, where the strong-coupling factor U and the power-transmission efficiency $\eta$ peak respectively, as a function of the relative distance D/r between two identical loops with r=30 cm and $\alpha$=2 cm.
FIG. 22(b) illustrates the strong-coupling factor U and the strong-interference factor V as a curve in the U–V plane, parametrized with the relative distance D/r between the two loops, for the cases with interference and eigenfrequency $f_\eta$ (solid), with interference and eigenfrequency $f_U$ (dashed), and without interference and eigenfrequency $f_U$ (dotted).
FIG. 22(c) shows the efficiency enhancement ratio of the solid curve in FIG. 22(b) relative to the dashed and dotted curves in FIG. 22(b).

In general, one would tend to design a system resonant at the frequency $f_U$ where the strong-coupling factor U is maximal. However, as suggested above, in the presence of interference, FIG. 20 shows that the maximum of $\eta_P$ is at an eigenfrequency $f_n$ different than $f_U$. In some examples, $f_n > f_U$. This is because at higher eigenfrequencies, losses are determined more by radiation than absorption, therefore destructive radiation interference can play a more significant role in reducing overall losses and thus $f_P > f_U$ and the efficiency in increased at $f_n > f_U$. In this description, we suggest that, in some examples, the resonant eigenfrequency can be designed to be close to the frequency $f_n$ that optimizes the efficiency rather than the different $f_U$. In particular, in FIG. 22(a) are plotted these two frequencies $f_n$ (solid line) and $f_U$ (dashed line) as a function of relative distance D/r of two r=30 cm loops. In FIG. 22(b) we show a graded plot of the optimal efficiency from Eq. (54) in the U–V plane. Then, we superimpose the U–V curve of case (i) (solid), parametrized with distance D, for two r=30 cm loops resonant at the optimal frequency $f_n$ for each D. From the path of this curve onto the graded plot the efficiency as a function of distance can be extracted for case (i) (solid). We then also superimpose in FIG. 22(b) the U–V curve of case (iii) (dashed), parametrized with distance D, for two r=30 cm loops resonant at $f_U$, and the U range of case (iv) (dotted), parametrized with distance D, for two r=30 cm loops resonant at $f_U$ (note that in this last case there is no interference and thus V=0). In FIG. 22(c) we then show the efficiency enhancement factor achieved by the solid curve of FIG. 22(b), as a function of distance D/r, compared to best that can be achieved without driving-frequency detuning (dashed) and without interference whatsoever (dotted). The improvement by employing interference can reach a factor of 2 at large separation between the loops.

Figure 23:
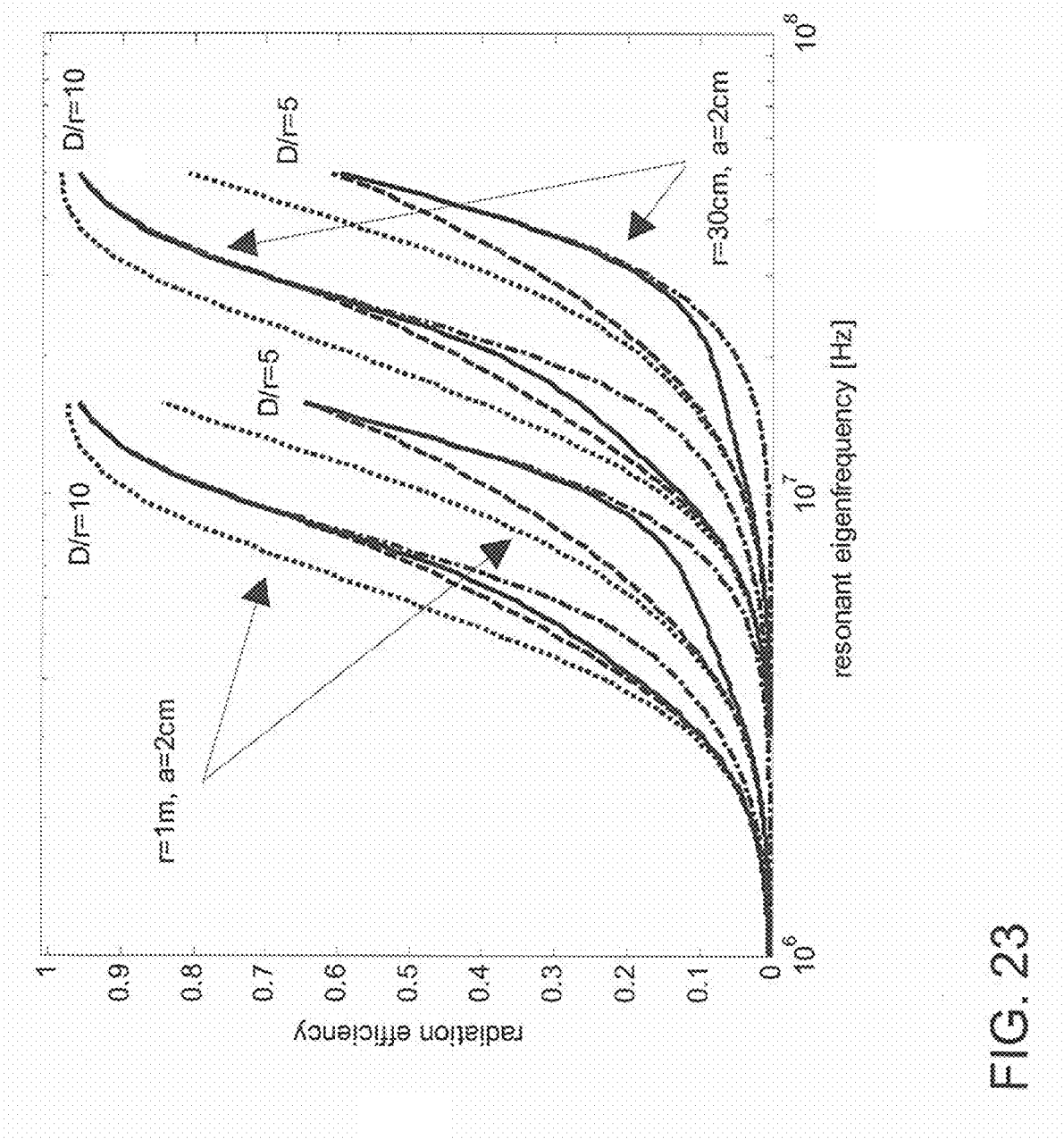
FIG. 23 shows the radiation efficiency as a function of the resonant eigenfrequency of two identical capacitively-loaded conducting single-turn loops. Results for two different loop dimensions are shown and for two relative distances between the identical loops. For each loops dimension and distance, four different cases are examined: without far-field interference (dotted), with far-field interference but no driving-frequency detuning (dashed) and with driving-frequency detun-ing to maximize either the efficiency (solid) or the ratio of efficiency over radiation (dash-dotted).

In FIG. 23 we plot the radiation efficiency $\eta_{rad}$, using Eq. (39), as a function of the eigenfrequency of the loops for the two different loop dimensions, the two different distances and the four different cases examined in FIG. 20. It can be seen from FIG. 23 that, for all frequencies, $\eta_{rad}$ of case (ii) (dash-dotted lines) is smaller than $\eta_{rad}$ of case (i) (solid lines) which is in turn smaller than $\eta_{rad}$ of case (iii) (dashed lines) and this smaller than $\eta_{rad}$ of case (iv) (dotted lines). Therefore, in this description, we suggest that employing far-field interference suppresses radiation (improvement from (iv) (dotted) to (iii) (dashed)) and, furthermore, employing destructive far-field interference, by detuning the driving frequency towards the low-radiation-loss odd normal mode, suppress radiation efficiency even more (improvement from (iii) (dashed) to (i) (solid) and (ii) (dash-dotted)), more so in case (ii), specifically optimized for this purpose.

In some examples, the resonant eigenfrequency can be designed to be larger than $f_{72}$, namely in a regime where the system is more radiation dominated. In this description, we suggest that at such eigenfrequencies, there can be a significant suppression in radiation by utilizing the destructive far-field interference effects and driving the system at a frequency close to the odd normal mode. The case (ii)=(dash-dotted) accomplishes the greatest suppression in radiation and, as can be seen in FIG. 20, there is a range of eigenfrequencies (close to $f_V$), for which the efficiency that this configuration can achieve is only little compromised compared to the maximum possible of configuration (i).

In one example, two single-turn loops of r=30 cm and a=2 cm are at a distance D/r=5 in the orientation shown in FIG. 10 and they are designed to resonate at 30 MHz. In the absence of interference, the power-transmission efficiency is 59% and the radiation efficiency is 38%. In the presence of interference and without detuning the driving frequency from 30 MHz, the power-transmission efficiency is 62% and the radiation efficiency is 32%. In the presence of interference and detuning the driving frequency from 30 MHz to 31.3 MHz to maximize efficiency, the power-transmission efficiency is increased to 75% and the radiation efficiency is suppressed to 18%.

In another example, two single-turn loops of r=30 cm and a=2 cm are at a distance D/r=5 in the orientation shown in FIG. 10 and they are designed to resonate at 10 MHz. In the absence of interference or in the presence of interference and without detuning the driving frequency from 10 MHz, the power-transmission efficiency is approximately 81% and the radiation efficiency is approximately 4%. In the presence of interference and detuning the driving frequency from 10 MHz to 10.22 MHz to maximize transmission over radiation, the power-transmission efficiency is 42%, reduced by less than a factor of 2, while the radiation efficiency is 0.4%, suppressed by an order of magnitude.

In another example, two single-turn loops of r=1 m and a=2 cm are at a distance D/r=5 in the orientation shown in FIG. 10 and they are designed to resonate at 10 MHz. In the absence of interference, the power-transmission efficiency is 48% and the radiation efficiency is 47%. In the presence of interference and without detuning the driving frequency from 10 MHz, the power-transmission efficiency is 54% and the radiation efficiency is 37%. In the presence of interference and detuning the driving frequency from 10 MHz to 14.8 MHz to maximize efficiency, the power-transmission efficiency is increased to 66% and the radiation efficiency is suppressed to 24%.

In another example, two single-turn loops of r=1 m and a=2 cm are at a distance D/r=5 in the orientation shown in FIG. 10 and they are designed to resonate at 4 MHz. In the absence of interference or in the presence of interference and without detuning the driving frequency from 4 MHz, the power-transmission efficiency is approximately 71% and the radiation efficiency is approximately 8%. In the presence of interference and detuning the driving frequency from 4 MHz to 5.06 MHz to maximize transmission over radiation, the power-transmission efficiency is 40%, reduced by less than a factor of 2, while the radiation efficiency is approximately 1%, suppressed by almost an order of magnitude.

5.2 Dielectric Disks

Figure 24:
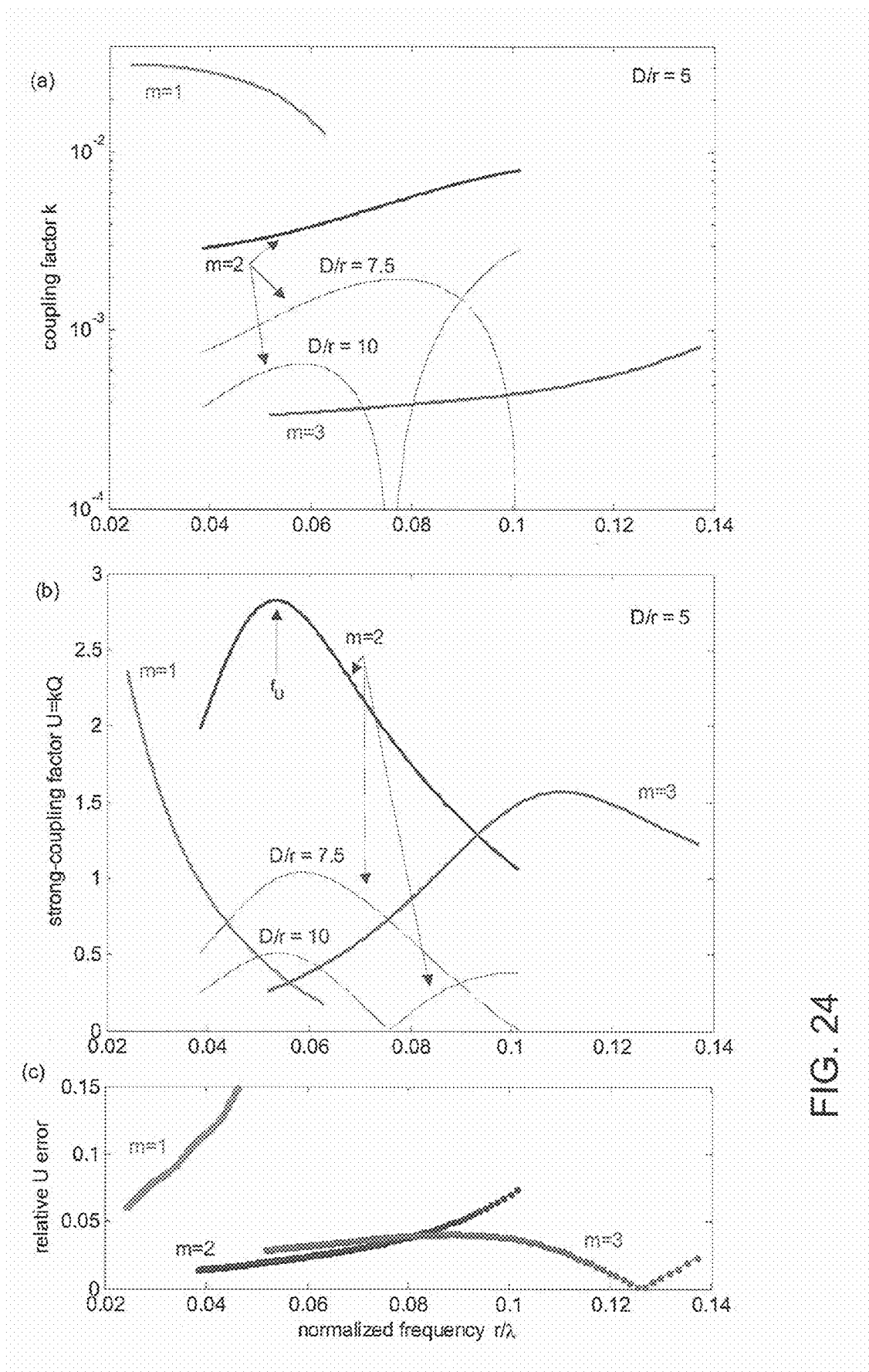
FIG. 24 shows CMT results for (a) the coupling factor k and (b) the strong-coupling factor U, for three different m values of subwavelength resonant modes of two same dielectric disks at distance D/r=5 (and also a couple more distances for m=2), when varying their $\in$ in the range 250$\geq\in\geq$35. Note that disk-material loss-tangent tan $\delta$=6·10$^{-6}$$\in$–2·10$^{-4}$ was used. (c) Relative U error between CMT and numerical FEFD calculations of part (b).

Consider two dielectric disks 1 and 2 of radius r and dielectric permittivity $\in$ placed at distance D between their centers, as shown in FIG. 15(b). Their coupling as a function of distance was calculated in Section 2.4, using analytical and finite-element-frequency-domain (FEFD) methods, and is shown in FIG. 24.

To compute the interference factor between two coupled disks at distance D, we again use two independent methods to confirm the validity of our results: numerically, the FEFD calculations again give $\Lambda$ (and thus V) by the splitting of the loss-rates of the two normal modes; analytically, calculation of the AT prediction of Eq. (47) gives $$m = 1: \quad V_{rad} = \frac{2}{(kD)} J_1(kD) \tag{60}$$

$$m = 2: \quad V_{rad} = \frac{8}{(kD)^3} \{3(kD)J_0(kD) + [(kD)^2 - 6]J_1(kD)\}$$

$$m = 3: \quad V_{rad} = \frac{6}{(kD)^5} \left\{ \begin{array}{l} [24(kD)^3 - 320(kD)]J_0(kD) + \\ [3(kD)^4 - 128(kD)^2 + 640]J_1(kD) \end{array} \right\}$$

Figure 25:
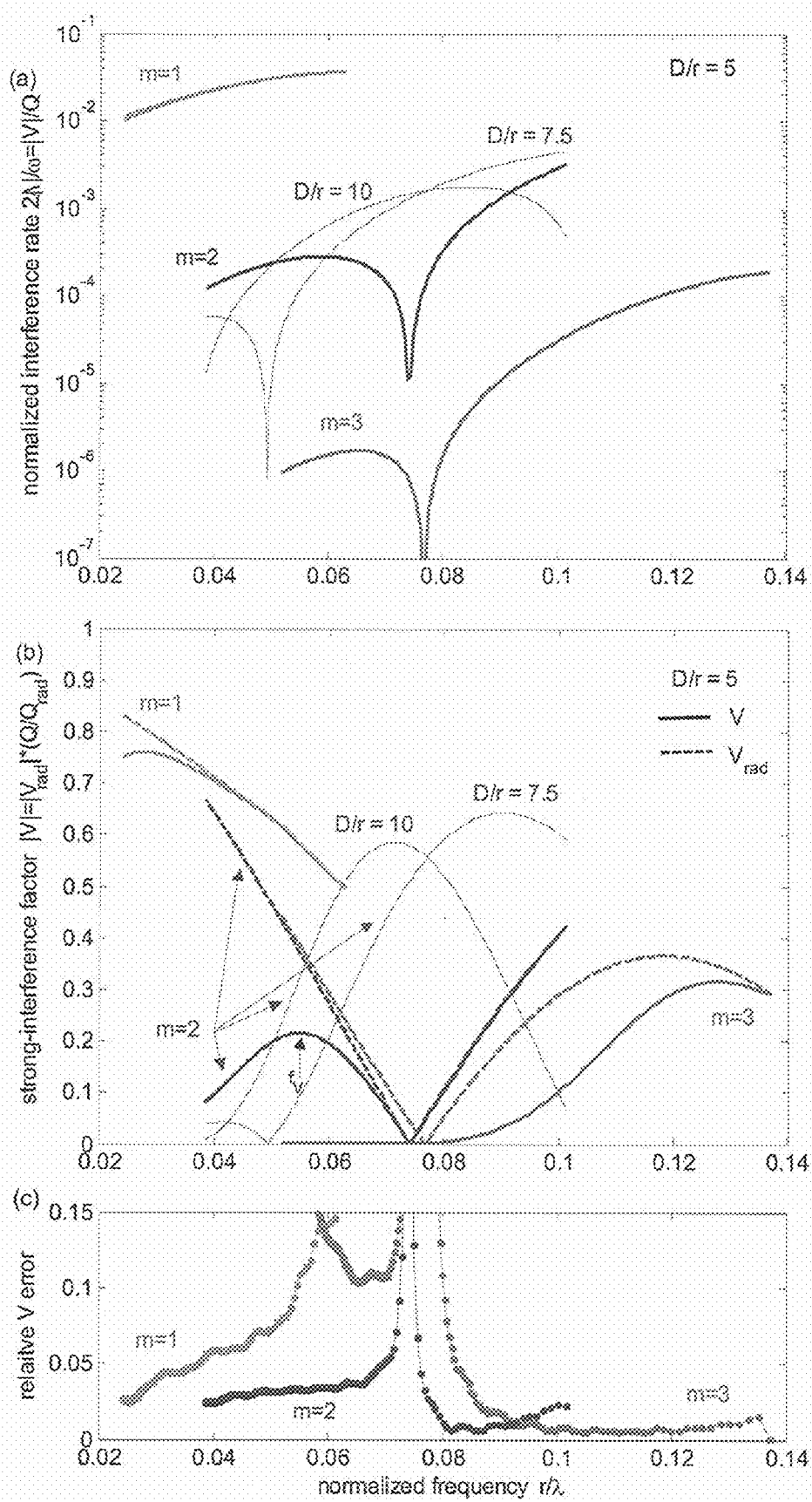
FIG. 25 shows Antenna Theory (AT) results for (a) the normalized interference term $2\Lambda/\sqrt{\omega_1\omega_2}$ and (b) magnitude of the strong-interference factor |V|, as a function of frequency, for the exact same parameters as in FIG. 24. (c) Relative V error between AT and numerical FEFD calculations of part (b).
Figure 26:
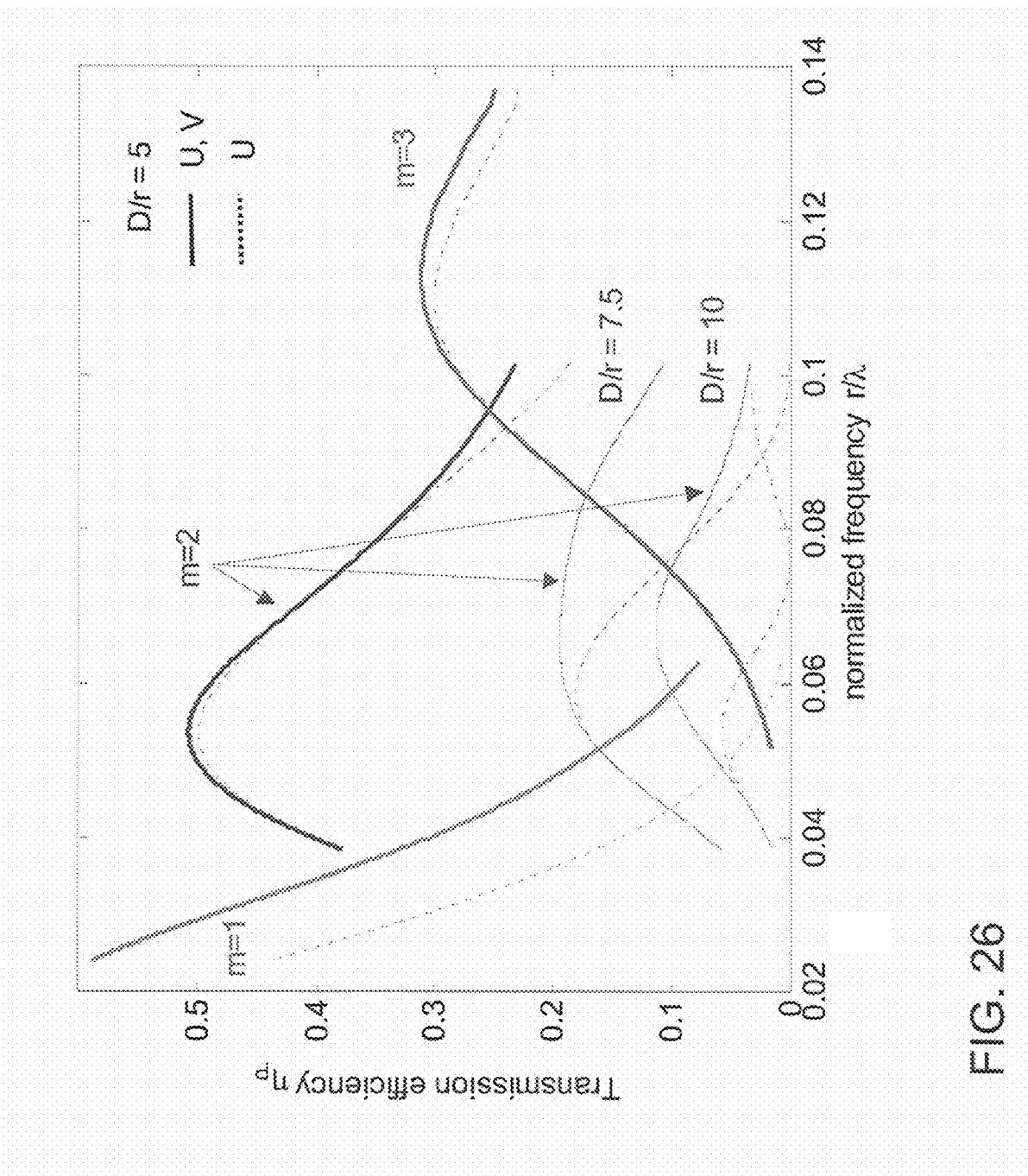
FIG. 26 shows results for the overall power transmission as a function of frequency, for the same set of resonant modes and distances as in FIGS. 24 and 25, based on the predictions including interference (solid lines) and without interference, just from U (dotted lines).

The results for the interference of two same disks, for exactly the same parameters for which the coupling was calculated in FIG. 24, are presented in FIG. 25, as a function of frequency (due to varying $\in$) at fixed distances. It can be seen that also the strong-interference factor V can have nulls, which can occur even before the system enters the radiative-coupling regime, namely at smaller frequencies than those of U at the same distances, and it decreases with frequency, since then the objects become more and more absorption dominated, so the benefit from radiative interference is suppressed. Both the above effects result into the fact that, for most distances, U (from FIG. 24(b)) and V (from FIG. 25(b)) can be maximized at different values of the frequency ($f_U$ and $f_V$ respectively), and thus different can also be the optimal frequency $f_\eta$ for the final energy-transfer efficiency of Eq. (54), which is shown in FIG. 26 again for the same set of parameters. From this plot, it can be seen that interference can significantly improve the transfer efficiency, compared to what Eq. (15) would predict from the calculated values of the coupling figure-of-merit U.

Figure 27:
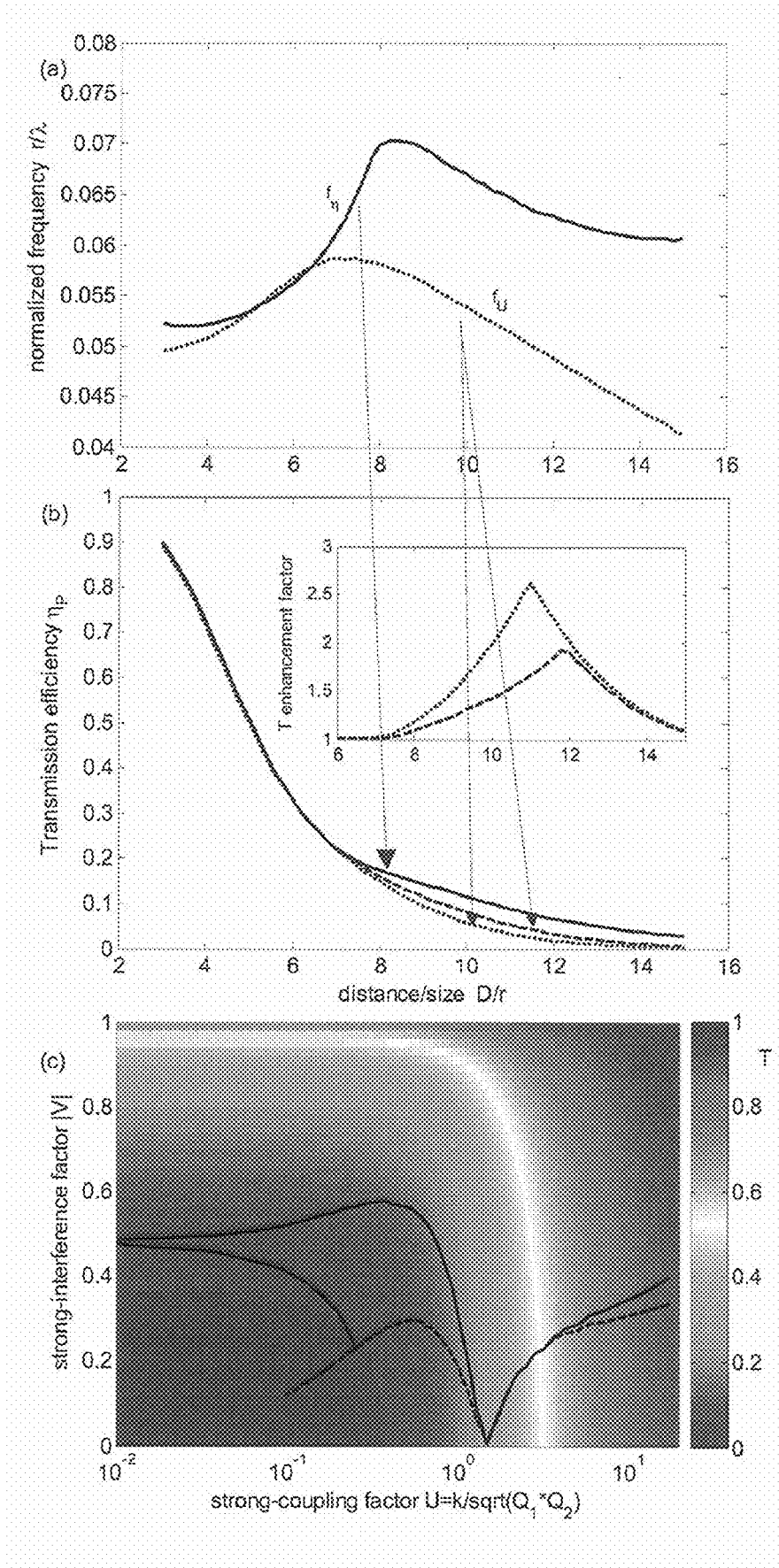
FIG. 27(a) shows the frequencies $f_U$ and $f_\eta$, where the strong-coupling factor U and the power-transmission efficiency $\eta$ are respectively maximized, as a function of the transfer distance between the m=2 disks of FIG. 15.
FIG. 27(b) shows the efficiencies achieved at the frequencies of (a) and, in inset, the enhancement ratio of the optimal (by definition) efficiency for $f_\eta$ versus the achievable efficiency at $f_U$.
FIG. 27(c) shows the D-parametrized path of the transmission efficiency for the frequency choices of (a) on the U–V efficiency map.

Furthermore, not only does a given energy-transfer system perform better than what a prediction which ignores interference would predict, but also our optimization design will typically lead to different optimal set of parameters in the presence of interference. For example, for the particular distance D/r=5, it turns out from FIG. 26 that the m=1 resonant modes can achieve better efficiency than the m=2 modes within the available range of $\in$, by making use of strong interference which counteracts their weaker U, as viewed in FIG. 24, from which one would have concluded the opposite performance. Moreover, even within the same m-branch, one would naively design the system to operate at the frequency $f_U$, at which U is maximum. However, the optimization design changes in the presence of interference, since the system should be designed to operate at the different frequency $f_\eta$, where the overall efficiency $\eta$ peaks. In FIG. 27(a), we first calculate those different frequencies where the strong-coupling factor U and the efficiency $\eta$ (which includes interference) peak, as distance D is changing for the-choice of the m=2 disk of FIG. 24, and observe that their difference is actually significant. Then, in FIG. 27(b) we show the peak efficiency for the various frequency choices. For large distances, where efficiency is small and could use a boost, the improvement factor reaches a significant 2 for the particular system under examination. The same result is shown in FIG. 27(c) as a plot of the path of the efficiency on the U–V map, as distance is changing. Similar results are derived for the modes of different m-order. Physically, moving to higher frequencies increases role of radiative losses compared to absorption and thus interference can have a greater influence. At the optimal frequency $f_\eta$ radiated power including interference is close to what it is at $f_U$, but absorbed power is much less, therefore the efficiency has been improved.

Figure 28:
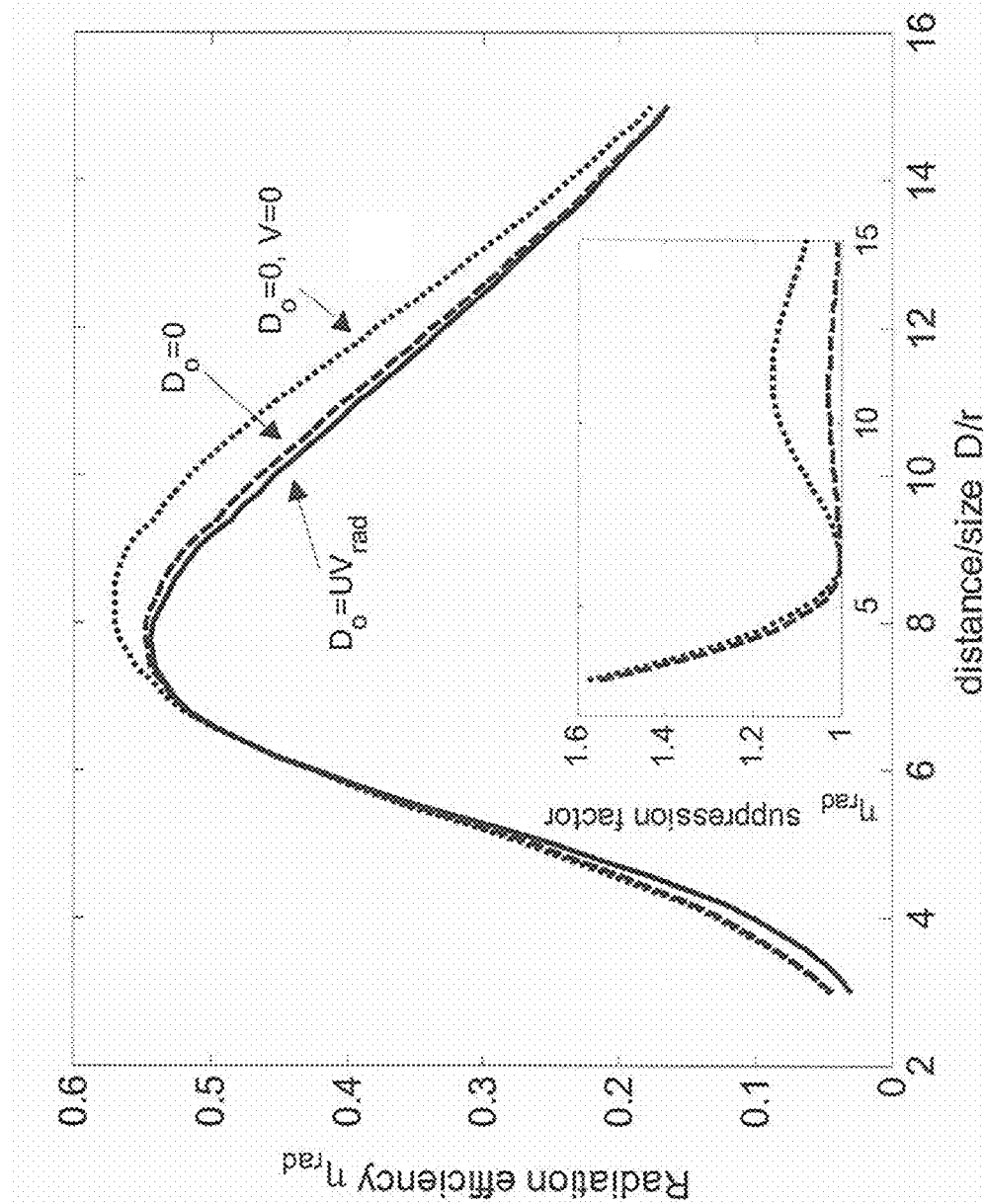
FIG. 28 shows results for the radiation efficiency as a function of the transfer distance at resonant frequency $f_U$, when the operating frequency is detuned (solid line), when it is not (dashed line), and when there is no interference whatsoever (dotted line). In the inset, we show the corresponding radiation suppression factors.

In some examples, instead of improving efficiency, one might care more about minimizing radiation. In that case, we calculate at the frequency $f_U$ how much power is radiated when optimized under the conditions Eq. (57) compared to the power radiated when simply operating on resonance ($D_o$=0) in the cases with and without interference (the latter case can be describing a case where the two disks do not interfere, because they are dissimilar, or due to decoherence issues etc.). We find in FIG. 28 that radiation can be suppressed by a factor of 1.6 by detuning the operating frequency towards the odd sub-radiant mode.

6 System Sensitivity to Extraneous Objects

In general, the overall performance of an example of the resonance-based wireless energy-transfer scheme depends strongly on the robustness of the resonant objects' resonances. Therefore, it is desirable to analyze the resonant objects' sensitivity to the near presence of random non-resonant extraneous objects. One appropriate analytical model is that of "perturbation theory" (PT), which suggests that in the presence of an extraneous perturbing object p the field amplitude $a_1(t)$ inside the resonant object 1 satisfies, to first order:

$$\frac{da_1}{dt} = -i(\omega_1 - i\Gamma_1)a_1 + i(\delta\kappa_{11(p)} + i\delta\Gamma_{1(p)})a_1 \tag{61}$$

where again $\omega_1$ is the frequency and $\Gamma_1$ the intrinsic (absorption, radiation etc.) loss rate, while $\delta\kappa_{11}(p)$ is the frequency shift induced onto 1 due to the presence of p and $\delta\Gamma_{1(p)}$ is the extrinsic due to p (absorption inside p, scattering from p etc.) loss rate. $\delta\Theta_{1(p)}$ is defined as $\delta\Gamma_{1(p)}\equiv\Gamma_{1(p)}-\Gamma_1$, where $\Gamma_{1(p)}$ is the total perturbed loss rate in the presence of p. The first-order PT model is valid only for small perturbations. Nevertheless, the parameters $\delta\kappa_{11(p)}$, $\delta\Gamma_{1(p)}$ are well defined, even outside that regime, if $a_1$ is taken to be the amplitude of the exact perturbed mode. Note also that interference effects between the radiation field of the initial resonant-object mode and the field scattered off the extraneous object can for strong scattering (e.g. off metallic objects) result in total $\Gamma_{1,rad(p)}$ that are smaller than the initial $\Gamma_{1,rad}$ (namely $\delta\Gamma_{1,rad(p)}$ is negative).

It has been shown that a specific relation is desired between the resonant frequencies of the source and device-objects and the driving frequency. In some examples, all resonant objects must have the same eigenfrequency and this must be equal to the driving frequency. In some examples, when trying to optimize efficiency or suppress radiation by employing far-field interference, all resonant objects must have the same eigenfrequency and the driving frequency must be detuned from them by a particular amount. In some implementations, this frequency-shift can be "fixed" by applying to one or more resonant objects and the driving generator a feedback mechanism that corrects their frequencies. In some examples, the driving frequency from the generator can be fixed and only the resonant frequencies of the objects can be tuned with respect to this driving frequency.

The resonant frequency of an object can be tuned by, for example, adjusting the geometric properties of the object (e.g. the height of a self-resonant coil, the capacitor plate spacing of a capacitively-loaded loop or coil, the dimensions of the inductor of an inductively-loaded rod, the shape of a dielectric disc, etc.) or changing the position of a non-resonant object in the vicinity of the resonant object.

Figure 29A:
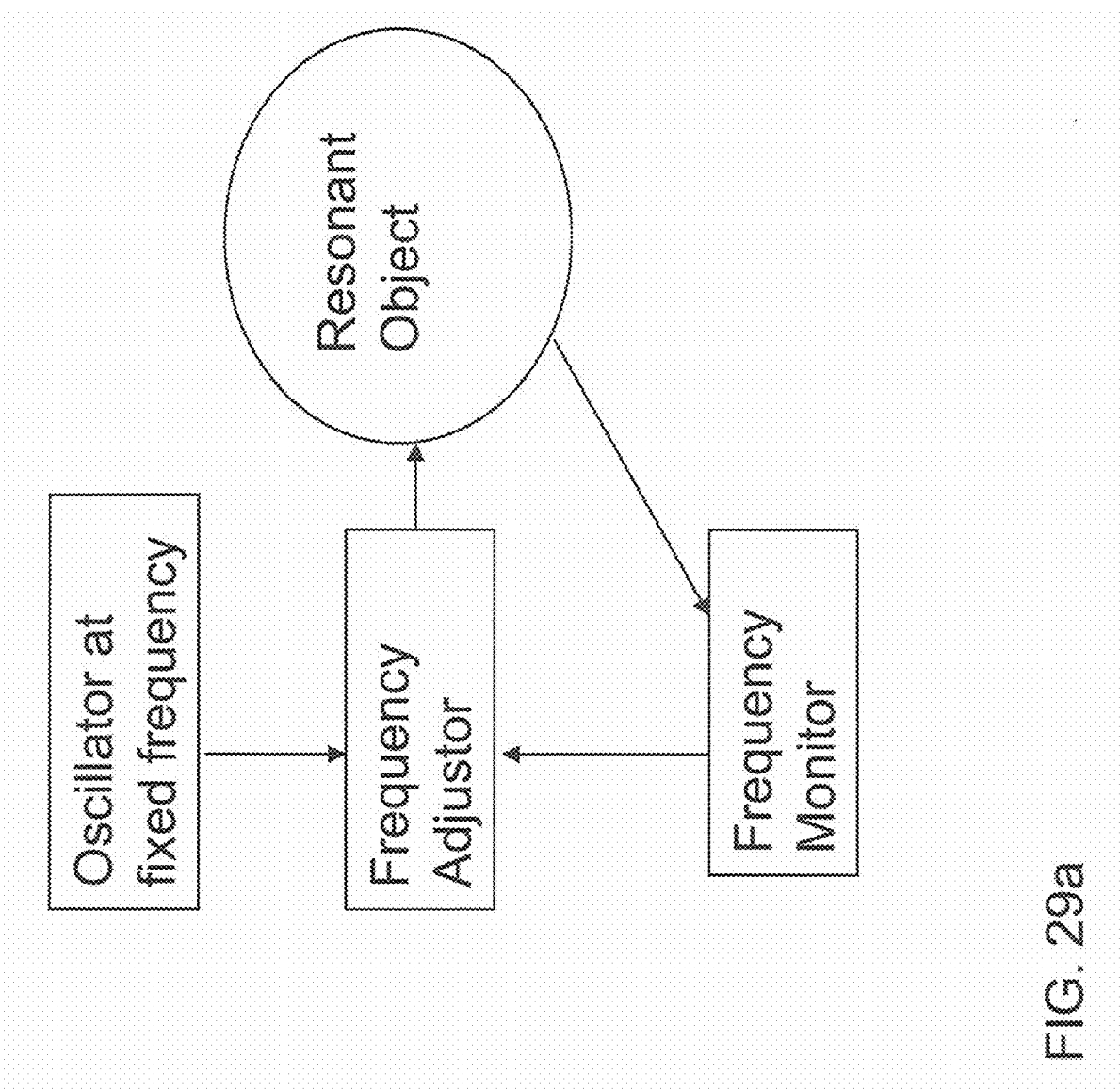
FIGS. 29(a)-(b) show schematics for frequency control mechanisms.

In some examples, referring to FIG. 29a, each resonant object is provided with an oscillator at fixed frequency and a monitor which determines the eigenfrequency of the object. At least one of the oscillator and the monitor is coupled to a frequency adjuster which can adjust the frequency of the resonant object. The frequency adjuster determines the difference between the fixed driving frequency and the object frequency and acts, as described above, to bring the object frequency into the required relation with respect to the fixed frequency. This technique assures that all resonant objects operate at the same fixed frequency, even in the presence of extraneous objects.

Figure 29B:
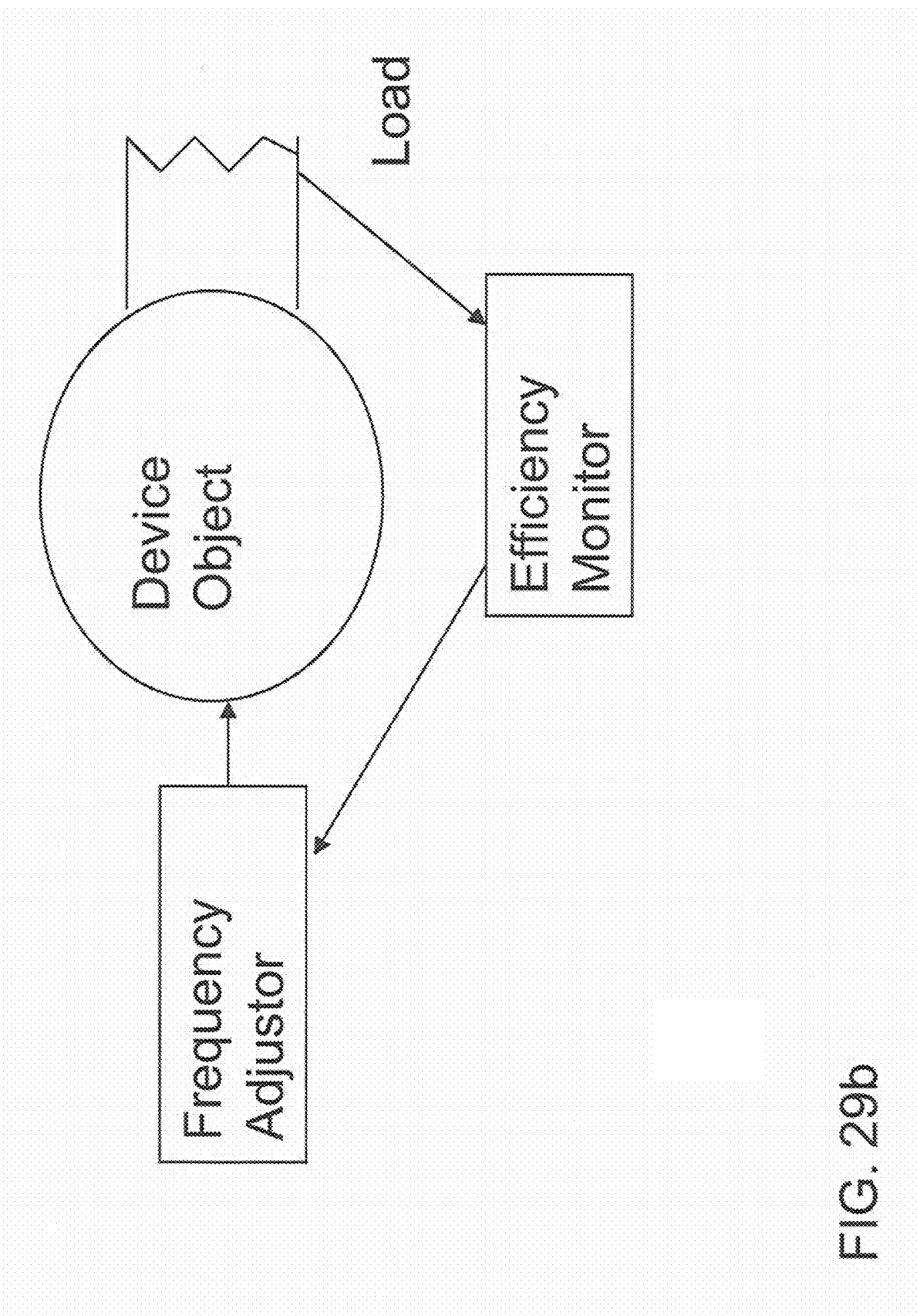

In some examples, referring to FIG. 29(b), during energy transfer from a source object to a device object, the device object provides energy or power to a load, and an efficiency monitor measures the efficiency of the energy-transfer or power-transmission. A frequency adjuster coupled to the load and the efficiency monitor acts, as described above, to adjust the frequency of the object to maximize the efficiency.

In other examples, the frequency adjusting scheme can rely on information exchange between the resonant objects. For example, the frequency of a source object can be monitored and transmitted to a device object, which is in turn synched to this frequency using frequency adjusters, as described above. In other embodiments the frequency of a single clock can be transmitted to multiple devices, and each device then synched to that frequency using frequency adjusters, as described above.

Unlike the frequency shift, the extrinsic perturbing loss due to the presence of extraneous perturbing objects can be detrimental to the functionality of the energy-transfer scheme, because it is difficult to remedy. Therefore, the total perturbed quality factors $Q_{(p)}$ (and the corresponding perturbed strong-coupling factor $U_{(p)}$ and the perturbed strong-interference factor $V_{(p)}$) should be quantified.

In some examples, a system for wireless energy-transfer uses primarily magnetic resonances, wherein the energy stored in the near field in the air region surrounding the resonator is predominantly magnetic, while the electric energy is stored primarily inside the resonator. Such resonances can exist in the quasi-static regime of operation ($r \ll \lambda$) that we are considering: for example, for coils with $h \ll 2r$, most of the electric field is localized within the self-capacitance of the coil or the externally loading capacitor and, for dielectric disks, with $\epsilon \gg 1$ the electric field is preferentially localized inside the disk. In some examples, the influence of extraneous objects on magnetic resonances is nearly absent. The reason is that extraneous non-conducting objects p that could interact with the magnetic field in the air region surrounding the resonator and act as a perturbation to the resonance are those having significant magnetic properties (magnetic permeability $\mathrm{Re}\{\mu\} > 1$ or magnetic loss $\mathrm{Im}\{\mu\} > 0$). Since almost all every-day non-conducting materials are non-magnetic but just dielectric, they respond to magnetic fields in the same way as free space, and thus will not disturb the resonance of the resonator. Extraneous conducting materials can however lead to some extrinsic losses due to the eddy currents induced inside them or on their surface (depending on their conductivity). However, even for such conducting materials, their presence will not be detrimental to the resonances, as long as they are not in very close proximity to the resonant objects.

The interaction between extraneous objects and resonant objects is reciprocal, namely, if an extraneous object does not influence a resonant object, then also the resonant object does not influence the extraneous object. This fact can be viewed in light of safety considerations for human beings. Humans are also non-magnetic and can sustain strong magnetic fields without undergoing any risk. A typical example, where magnetic fields $B \sim 1$ T are safely used on humans, is the Magnetic Resonance Imaging (MRI) technique for medical testing. In contrast, the magnetic near-field required in typical embodiments in order to provide a few Watts of power to devices is only $B \sim 10^{-4}$ T, which is actually comparable to the magnitude of the Earth's magnetic field. Since, as explained above, a strong electric near-field is also not present and the radiation produced from this non-radiative scheme is minimal, the energy-transfer apparatus, methods and systems described herein is believed safe for living organisms.

6.1 Capacitively-Loaded Conducting Loops or Coils

In some examples, one can estimate the degree to which the resonant system of a capacitively-loaded conducting-wire coil has mostly magnetic energy stored in the space surrounding it. If one ignores the fringing electric field from the capacitor, the electric and magnetic energy densities in the space surrounding the coil come just from the electric and magnetic field produced by the current in the wire; note that in the far field, these two energy densities must be equal, as is always the case for radiative fields. By using the results for the fields produced by a subwavelength ($r \ll \lambda$) current loop (magnetic dipole) with h=0, we can calculate the ratio of electric to magnetic energy densities, as a function of distance $D_p$ from the center of the loop (in the limit $r \ll D_p$) and the angle $\theta$ with respect to the loop axis:

$$\frac{w_e(x)}{w_m(x)} = \frac{\varepsilon_o |E(x)|^2}{\mu_o |H(x)|^2} \tag{62}$$

$$= \frac{\left(1 + \frac{1}{x^2}\right)\sin^2\theta}{\left(\frac{1}{x^2} + \frac{1}{x^4}\right)4\cos^2\theta + \left(1 - \frac{1}{x^2} + \frac{1}{x^4}\right)\sin^2\theta}; x = 2\pi\frac{D_p}{\lambda}$$

$$\Rightarrow \frac{\oiint_{S_p} w_e(x)dS}{\oiint_{S_p} w_m(x)dS} = \frac{1 + \frac{1}{x^2}}{1 + \frac{1}{x^2} + \frac{3}{x^4}}; x = 2\pi\frac{D_p}{\lambda},$$

where the second line is the ratio of averages over all angles by integrating the electric and magnetic energy densities over the surface of a sphere of radius $D_p$. From Eq. (62) it is obvious that indeed for all angles in the near field ($x \ll 1$) the magnetic energy density is dominant, while in the far field ($x \gg 1$) they are equal as they should be. Also, the preferred positioning of the loop is such that objects which can interfere with its resonance lie close to its axis ($\theta = 0$), where there is no electric field. For example, using the systems described in Table 4, we can estimate from Eq. (62) that for the loop of r=30 cm at a distance $D_p = 10r = 3$ m the ratio of average electric to average magnetic energy density would be $\sim 12\%$ and at $D_p = 3r = 90$ cm it would be $\cdot 1\%$, and for the loop of r=10 cm at a distance $D_p = 10r = 1$ m the ratio would be $\sim 33\%$ and at $D_p = 3r = 30$ cm it would be $\sim 2.5\%$. At closer distances this ratio is even smaller and thus the energy is predominantly magnetic in the near field, while in the radiative far field, where they are necessarily of the same order (ratio→1), both are very small, because the fields have significantly decayed, as capacitively-loaded coil systems are designed to radiate very little. Therefore, this is the criterion that qualifies this class of resonant system as a magnetic resonant system.

To provide an estimate of the effect of extraneous objects on the resonance of a capacitively-loaded loop including the capacitor fringing electric field, we use the perturbation theory formula, stated earlier, $\delta\Gamma_{1,abs(p)} = \omega_1/4 \cdot \int d^3r \, IM\{\in_p(r)\} |E_1(r)|^2/W$ with the computational FEFD results for the field of an example like the one shown in the plot of FIG. 5 and with a rectangular object of dimensions 30 cm×30 cm×1.5 m and permittivity $\in = 49+16i$ (consistent with human muscles) residing between the loops and almost standing on top of one capacitor (~3 cm away from it) and find $\delta Q_{abs(human)} \sim 10^5$ and for ~10 cm away $\delta Q_{abs(human)} \sim 5 \cdot 10^5$. Thus, for ordinary distances (~1 m) and placements (not immediately on top of the capacitor) or for most ordinary extraneous objects p of much smaller loss-tangent, we conclude that it is indeed fair to say that $\delta Q_{abs(p)} \to \infty$. The only perturbation that is expected to affect these resonances is a close proximity of large metallic structures.

Self-resonant coils can be more sensitive than capacitively-loaded coils, since for the former the electric field extends over a much larger region in space (the entire coil) rather than for the latter Oust inside the capacitor). On the other hand, self-resonant coils can be simple to make and can withstand much larger voltages than most lumped capacitors. Inductively-loaded conducting rods can also be more sensitive than capacitively-loaded coils, since they rely on the electric field to achieve the coupling.

6.2 Dielectric Disks

For dielectric disks, small, low-index, low-material-loss or far-away stray objects will induce small scattering and absorption. In such cases of small perturbations these extrinsic loss mechanisms can be quantified using respectively the analytical first-order perturbation theory formulas $$[67 \, Q_{1,rad(p)}]^{-1} \equiv 2\delta\Gamma_{1,rad(p)}/\omega_1 \propto \int d^3r [RE\{\in_p(r)\}|E_1(r)|^2/W$$

$$[\delta Q_{1,abs(p)}]^{-1} \equiv 2\delta\Gamma_{1,abs(p)}/\omega_1 = \int d^3r Im\{\in_p(r)\}|E_1(r)|^2/2W$$

where $W = \int d^3r \in(r)|E_1(r)|^2/2$ is the total resonant electromagnetic energy of the unperturbed mode. As one can see, both of these losses depend on the square of the resonant electric field tails E1 at the site of the extraneous object. In contrast, the coupling factor from object 1 to another resonant object 2 is, as stated earlier, $$k_{12} = 2\kappa_{12}/\sqrt{\omega_1\omega_2} \approx \int d^3r \in_2(r)E_2^*(r)E_1(r)/\int d^3r \in(r)|E_1(r)|^2$$

and depends linearly on the field tails $E_1$ of 1 inside 2. This difference in scaling gives us confidence that, for, for example, exponentially small field tails, coupling to other resonant objects should be much faster than all extrinsic loss rates ($\kappa_{12} \gg \delta\Gamma_{1,2(p)}$), at least for small perturbations, and thus the energy-transfer scheme is expected to be sturdy for this class of resonant dielectric disks.

Figure 30B:
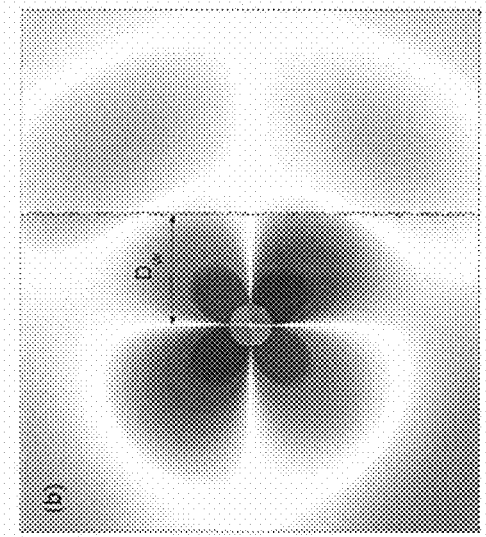
FIGS. 30(a)-(c) illustrate a wireless energy transfer scheme using two dielectric disks in the presence of various extraneous objects.
Figure 30A:
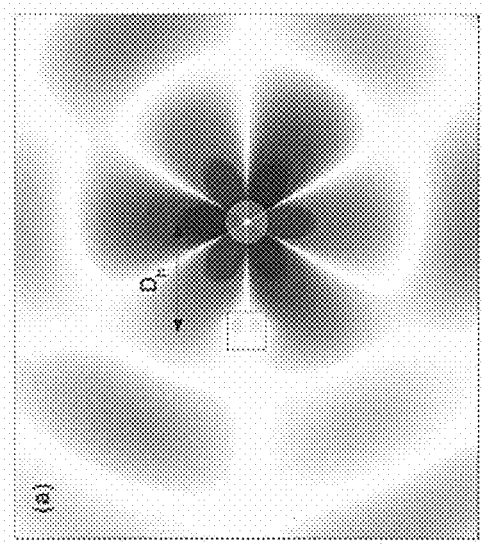
Figure 30C:
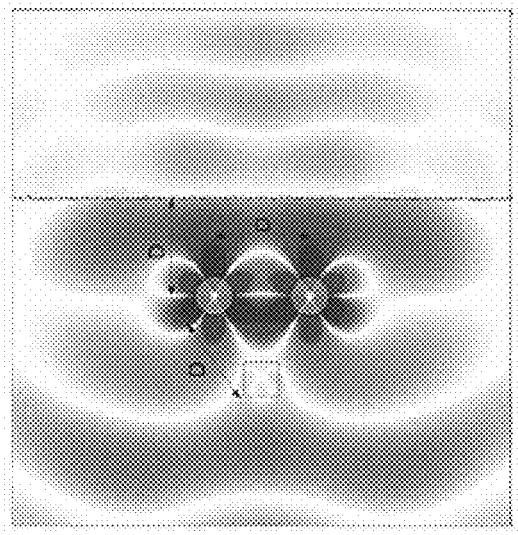

However, we also want to examine certain possible situations where extraneous objects cause perturbations too strong to analyze using the above first-order perturbation theory approach. For example, we place a dielectric disk close to another off-resonance object of large Re{∈}, Im{∈} and of same size but different shape (such as a human being h), as shown in FIG. 30a, and a roughened surface of large extent but of small Re{∈}, Im{∈} (such as a wall w), as shown in FIG. 30b. For distances $D_{h,w}/r = 10-3$ between the disk-center and the "human"-center or "wall", the numerical FDFD simulation results presented in FIGS. 30a and 30b suggest that, the disk resonance seems to be fairly robust, since it is not detrimentally disturbed by the presence of extraneous objects, with the exception of the very close proximity of high-loss objects. To examine the influence of large perturbations on an entire energy-transfer system we consider two resonant disks in the close presence of both a "human" and a "wall". Comparing Table 8 to the table in FIG. 30c, the numerical FDFD simulations show that the system performance deteriorates from U~1-50 to $U_{(hw)} \sim 0.5-10$, i.e. only by acceptably small amounts.

In general, different examples of resonant systems have different degree of sensitivity to external perturbations, and the resonant system of choice depends on the particular application at hand, and how important matters of sensitivity or safety are for that application. For example, for a medical implantable device (such as a wirelessly powered artificial heart) the electric field extent must be minimized to the highest degree possible to protect the tissue surrounding the device. In such cases where sensitivity to external objects or safety is important, one should design the resonant systems so that the ratio of electric to magnetic energy density $w_e/w_m$ is reduced or minimized at most of the desired (according to the application) points in the surrounding space.

7 Applications

The non-radiative wireless energy transfer techniques described above can enable efficient wireless energy-exchange between resonant objects, while suffering only modest transfer and dissipation of energy into other extraneous off-resonant objects. The technique is general, and can be applied to a variety of resonant systems in nature. In this Section, we identify a variety of applications that can benefit from or be designed to utilize wireless power transmission.

Remote devices can be powered directly, using the wirelessly supplied power or energy to operate or run the devices, or the devices can be powered by or through or in addition to a battery or energy storage unit, where the battery is occasionally being charged or re-charged wirelessly. The devices can be powered by hybrid battery/energy storage devices such as batteries with integrated storage capacitors and the like. Furthermore, novel battery and energy storage devices can be designed to take advantage of the operational improvements enabled by wireless power transmission systems.

Devices can be turned off and the wirelessly supplied power or energy used to charge or recharge a battery or energy storage unit. The battery or energy storage unit charging or recharging rate can be high or low. The battery or energy storage units can be trickle charged or float charged. It would be understood by one of ordinary skill in the art that there are a variety of ways to power and/or charge devices, and the variety of ways could be applied to the list of applications that follows.

Some wireless energy transfer examples that can have a variety of possible applications include for example, placing a source (e.g. one connected to the wired electricity network) on the ceiling of a room, while devices such as robots, vehicles, computers, PDAs or similar are placed or move freely within the room. Other applications can include powering or recharging electric-engine buses and/or hybrid cars and medical implantable devices. Additional example applications include the ability to power or recharge autonomous electronics (e.g. laptops, cell-phones, portable music players, house-hold robots, GPS navigation systems, displays, etc), sensors, industrial and manufacturing equipment, medical devices and monitors, home appliances (e.g. lights, fans, heaters, displays, televisions, counter-top appliances, etc.), military devices, heated or illuminated clothing, communications and navigation equipment, including equipment built into vehicles, clothing and protective-wear such as helmets, body armor and vests, and the like, and the ability to transmit power to physically isolated devices such as to implanted medical devices, to hidden, buried, implanted or embedded sensors or tags, to and/or from roof-top solar panels to indoor distribution panels, and the like.

In some examples, far-field interference can be utilized by a system designer to suppress total radiation loss and/or to increase the system efficiency. In some examples, systems operating optimally closer to the radiative regime can benefit more from the presence of far-field interference, which leads to reduced losses for the sub-radiant normal mode of the coupled objects, and this benefit can be substantial.

A number of examples of the invention have been described. Nevertheless, it will be understood that various modifications can be made without departing from the spirit and scope of the invention.

What is claimed is:

1. An apparatus for use in wireless energy transfer, the apparatus comprising:
    a first resonator structure configured for energy transfer with a second resonator structure, over a distance D larger than a characteristic size $L_1$ of said first resonator structure and larger than a characteristic size $L_2$ of said second resonator structure,
    wherein the energy transfer has a rate $\kappa$ and is mediated by evanescent-tail coupling of a resonant field of the first resonator structure and a resonant field of the second resonator structure, wherein
    said resonant field of the first resonator structure has a resonance angular frequency $\omega_1$, a resonance frequency-width $\Gamma_1$, and a resonance quality factor $Q_1=\omega_1/2\Gamma_1$ at least larger than 100, and
    said resonant field of the second resonator structure has a resonance angular frequency $\omega_2$, a resonance frequency-width $\Gamma_2$, and a resonance quality factor $Q_2=\omega_2/2\Gamma_2$ at least larger than 100,
    wherein the absolute value of the difference of said angular frequencies $\omega_1$ and $\omega_2$ is smaller than the broader of said resonant widths $\Gamma_1$ and $\Gamma_2$,
    and further comprising a power supply coupled to the first resonator structure and configured to drive the first resonator structure or the second resonator structure at an angular frequency away from the resonance angular frequencies and shifted towards a frequency corresponding to an odd normal mode for the resonator structures to reduce radiation from the resonator structures by destructive far-field interference.

2. The apparatus of claim 1, wherein the power supply is configured to drive the first resonator structure or the second resonator structure at the angular frequency away from the resonance angular frequencies and shifted towards the frequency corresponding to an odd normal mode for the resonator structures to substantially suppress radiation from the resonator structures by destructive far-field interference.

3. A method for wireless energy transfer involving a first resonator structure configured for energy transfer with a second resonator structure, over a distance D larger than a characteristic size $L_1$ of said first resonator structure and larger than a characteristic size $L_2$ of said second resonator structure, wherein the energy transfer has a rate $\kappa$ and is mediated by evanescent-tail coupling of a resonant field of the first resonator structure and a resonant field of the second resonator structure, wherein said resonant field of the first resonator structure has a resonance angular frequency $\omega_1$, a resonance frequency-width $\Gamma_1$, and a resonance quality factor $Q_1=\omega_1/2\Gamma_1$ at least larger than 100, and said resonant field of the second resonator structure has a resonance angular frequency $\omega_2$, a resonance frequency-width $\Gamma_2$, and a resonance quality factor $Q_2=\omega_2/2\Gamma_2$ at least larger than 100, wherein the absolute value of the difference of said angular frequencies $\omega_1$ and $\omega_2$ is smaller than the broader of said resonant widths $\Gamma_1$ and $\Gamma_2$, the method comprising:
    driving the first resonator structure or the second resonator structure at an angular frequency away from the resonance angular frequencies and shifted towards a frequency corresponding to an odd normal mode for the resonator structures to reduce radiation from the resonator structures by destructive far-field interference.

4. The method of claim 3, wherein the first resonator structure or the second resonator structure is driven at the angular frequency away from the resonance angular frequencies and shifted towards the frequency corresponding to an odd normal mode for the resonator structures to substantially suppress radiation from the resonator structures by destructive far-field interference.

5. An apparatus for use in wireless energy transfer, the apparatus comprising:
    a first resonator structure configured for energy transfer with a second resonator structure, over a distance D larger than a characteristic size $L_1$ of said first resonator structure and larger than a characteristic size $L_2$ of said second resonator structure,
    wherein the energy transfer has a rate $\kappa$ and is mediated by evanescent-tail coupling of a resonant field of the first resonator structure and a resonant field of the second resonator structure, wherein
    said resonant field of the first resonator structure has a resonance angular frequency $\omega_1$, a resonance frequency-width $\Gamma_1$, and a resonance quality factor $Q_1=\omega_1/2\Gamma_1$ at least larger than 100, and
    said resonant field of the second resonator structure has a resonance angular frequency $\omega_2$, a resonance frequency-width $\Gamma_2$, and a resonance quality factor $Q_2=\omega_2/2\Gamma_2$ at least larger than 100,
    wherein the absolute value of the difference of said angular frequencies $\omega_1$ and $\omega_2$ is smaller than the broader of said resonant widths $\Gamma_1$ and $\Gamma_2$,
    and wherein for a desired range of the distances D, the resonance angular frequencies for the resonator structures increase transmission efficiency T by accounting for radiative interference, wherein the increase is relative to a transmission efficiency T calculated without accounting for the radiative interference.

6. The apparatus of claim 5, wherein the resonance angular frequencies for the resonator structures are selected by optimizing the transmission efficiency T to account for both a resonance quality factor U and an interference factor V.

7. A method for designing a wireless energy transfer apparatus, the apparatus including a first resonator structure configured for energy transfer with a second resonator structure, over a distance D larger than a characteristic size $L_1$ of said first resonator structure and larger than a characteristic size $L_2$ of said second resonator structure, wherein the energy transfer has a rate $\kappa$ and is mediated by evanescent-tail coupling of a resonant field of the first resonator structure and a resonant field of the second resonator structure, wherein said resonant field of the first resonator structure has a resonance angular frequency $\omega_1$, a resonance frequency-width $\Gamma_1$, and a resonance quality factor $Q_1=\omega_1/2\Gamma_1$ at least larger than 100, and said resonant field of the second resonator structure has a resonance angular frequency $\omega_2$, a resonance frequency-width $\Gamma_2$, and a resonance quality factor $Q_2=\omega_2/2\Gamma_2$ at least larger than 100, wherein the absolute value of the difference of said angular frequencies $\omega_1$ and $\omega_2$ is smaller than the broader of said resonant widths $\Gamma_1$ and $\Gamma_2$, the method comprising:
  selecting the resonance angular frequencies for the resonator structures to substantially optimize the transmission efficiency by accounting for radiative interference between the resonator structures.

8. The method of claim 7, wherein the resonance angular frequencies for the resonator structures are selected by optimizing the transmission efficiency T to account for both a resonance quality factor U and an interference factor V.

9. An apparatus for use in wireless energy transfer, the apparatus comprising:
  a first resonator structure configured for energy transfer with a second resonator structure over a distance D,
  wherein the energy transfer is mediated by evanescent-tail coupling of a resonant field of the first resonator structure and a resonant field of the second resonator structure, with a coupling factor k, wherein
  said resonant field of the first resonator structure has a resonance angular frequency $\omega_1$, a resonance frequency-width $\Gamma_1$, and a resonance quality factor $Q_1=\omega_1/2\Gamma_1$, and is radiative in the far field, with an associated radiation quality factor $Q_{1,rad} \geq Q_1$, and
  said resonant field of the second resonator structure has a resonance angular frequency $\omega_2$, a resonance frequency-width $\Gamma_2$, and a resonance quality factor $Q_2=\omega_2/2\Gamma_2$ and is radiative in the far field, with an associated radiation quality factor $Q_{2,rad} \geq Q_2$,
  wherein an absolute value of a difference of said angular frequencies $\omega_1$ and $\omega_2$ is smaller than broader of said resonant widths $\Gamma_1$ and $\Gamma_2$, and a strong-coupling factor being defined as $U=k\sqrt{Q_1 Q_2}$,
  wherein the apparatus is configured to employ interference between said radiative far fields of the resonant fields of the first and second resonator, with an interference factor $V_{rad}$, to reduce a total amount of radiation from the apparatus compared to an amount of radiation from the apparatus in the absence of interference, a strong-interference factor being defined as $V=V_{rad}\sqrt{(Q_1/Q_{1,rad})(Q_2/Q_{2,rad})}$.

10. The apparatus of claim 9, wherein $Q_1/Q_{1,rad} \geq 0.01$ and $Q_2/Q_{2,rad} \geq 0.01$.

11. The apparatus of claim 9, wherein $Q_1/Q_{1,rad} \geq 0.1$ and $Q_2/Q_{2,rad} \geq 0.1$.

12. The apparatus of claim 9, wherein $D/\lambda_o$ is larger than 0.001 and the strong-interference factor V is larger than 0.01, wherein an average resonant angular frequency is defined as $\omega_o=\sqrt{\omega_1\omega_2}$, corresponding to an average resonant wavelength $\lambda_o=2\pi c/\omega_o$, where c is the speed of light in free space.

13. The apparatus of claim 9, wherein $D/\lambda_o$ is larger than 0.001 and the strong-interference factor V is larger than 0.1, wherein an average resonant angular frequency is defined as $\omega_o=\sqrt{\omega_1\omega_2}$, corresponding to an average resonant wavelength $\lambda_o=2\pi c/\omega_o$, where c is the speed of light in free space.

14. The apparatus of claim 9, further comprising the second resonator structure and a power load coupled to the second resonator structure with a coupling rate $\kappa_l$, wherein $U_l$ is defined as $\kappa_l/\Gamma_2$, and configured to receive from the second resonator structure a usable power.

15. The apparatus of claim 14, further comprising a power generator coupled to the first resonator structure with a coupling rate $\kappa_g$, wherein $U_g$ is defined as $\kappa_g/\Gamma_1$, and configured to drive the first resonator structure at a driving frequency f, corresponding to a driving angular frequency $\omega=2\pi f$.

16. The apparatus of claim 15, wherein the driving frequency is different from the resonance frequencies of the first and second resonator structures and is closer to a frequency corresponding to an odd normal mode of the system of the two resonator structures,
  wherein the detuning of the first resonator from the driving frequency is defined as $D_1=(\omega-\omega_1)/\Gamma_1$ and the detuning of the second resonator structure from the driving frequency is defined as $D_2=(\omega-\omega_2)/\Gamma_2$.

17. The apparatus of claim 16, wherein $D_1$ is approximately equal to $UV_{rad}$ and $D_2$ is approximately equal to $UV_{rad}$.

18. The apparatus of claim 15, wherein $U_g$ is chosen to maximize the ratio of the efficiency of power transmission from the power generator to the power load to the radiation efficiency.

19. The apparatus of claim 17, wherein $D_1$ is approximately equal to $UV_{rad}$ and $D_2$ is approximately equal to $UV_{rad}$, and $U_g$ is approximately equal to $\sqrt{1+U^2-V_{rad}^2 U^2+V^2-2VV_{rad}}$.

20. The apparatus of claim 15, wherein f is at least larger than 100 kHz and smaller than 500 MHz.

21. The apparatus of claim 15, wherein f is at least larger than 1 MHz and smaller than 50 MHz.

22. The apparatus of claim 9, wherein $Q_1>100$ or $Q_2>100$.

23. The apparatus of claim 9, wherein $Q_1>100$ or $Q_2>100$.

24. The apparatus of claim 15, wherein at least one of $U_g$ and $U_l$ is chosen to maximize the ratio of the efficiency of power transmission from the power generator to the power load to the radiation efficiency.

25. The apparatus of claim 24, wherein the driving frequency is different from the resonance frequencies of the first and second resonator structures and is closer to a frequency corresponding to an odd normal mode of the system of the two resonator structures,
  wherein the detuning of the first resonator from the driving frequency is defined as $D_1=(\omega-\omega_1)/\Gamma_1$ and is approximately equal to $UV_{rad}$, and the detuning of the second resonator structure from the driving frequency is defined as $D_2=(\omega-\omega_2)/\Gamma_2$ and is approximately equal to $UV_{rad}$, and $U_l$ is approximately equal to $\sqrt{1+U^2-V_{rad}^2 U^2+V^2-2VV_{rad}}$.

26. The apparatus of claim 9, wherein at least one of the first and second resonator structures comprises a capacitively loaded loop or coil of at least one of a conducting wire, a conducting Litz wire, and a conducting ribbon.

27. The apparatus of claim 26, where the characteristic size of said loop or coil is less than 30 cm and the width of said conducting wire or Litz wire or ribbon is less than 2 cm.

28. The apparatus of claim 26, where the characteristic size of said loop or coil is less than 1 m and the width of said conducting wire or Litz wire or ribbon is less than 2 cm.

29. The apparatus of claim 9, further comprising a feedback mechanism for maintaining the resonant frequency of one or more of the resonant objects.

30. The apparatus of claim 29, wherein the feedback mechanism comprises an oscillator with a fixed driving frequency and is configured to adjust the resonant frequency of the one or more resonant objects to be detuned by a fixed amount with respect to the fixed frequency.

31. An apparatus for use in wireless energy transfer, the apparatus comprising:
  a first resonator structure configured for energy transfer with a second resonator structure over a distance D, wherein the energy transfer is mediated by evanescent-tail coupling of a resonant field of the first resonator structure and a resonant field of the second resonator structure, with a coupling factor k, wherein said resonant field of the first resonator structure has a resonance angular frequency $\omega_1$, a resonance frequency-width $\Gamma_1$, and a resonance quality factor $Q_1=\omega_1/2\Gamma_1$, and is radiative in the far field, with an associated radiation quality factor $Q_{1,rad} \geq Q_1$, and said resonant field of the second resonator structure has a resonance angular frequency $\omega_2$, a resonance frequency-width $\Gamma_2$, and a resonance quality factor $Q_2=\omega_2/2\Gamma_2$, and is radiative in the far field, with an associated radiation quality factor $Q_{2,rad} \geq Q_2$, wherein an absolute value of a difference of said angular frequencies $\omega_1$ and $\omega_2$ is smaller than the broader of said resonant widths $\Gamma_1$ and $\Gamma_2$, and an average resonant angular frequency is defined as $\omega_o = \sqrt{\omega_1 \omega_2}$, corresponding to an average resonant wavelength $\lambda_o = 2\pi c/\omega_o$, where c is the speed of light in free space, and a strong-coupling factor is defined as $U = k\sqrt{Q_1 Q_2}$, wherein the apparatus is configured to employ interference between said radiative far fields of the resonant fields of the first and second resonator, with an interference factor $V_{rad}$, to increase efficiency of energy transfer for the apparatus compared to efficiency for the apparatus in the absence of interference, the strong-interference factor being defined as $V = V_{rad}\sqrt{(Q_1/Q_{1,rad})(Q_2/Q_{2,rad})}$.

32. The apparatus of claim 31, wherein $Q_1/Q_{1,rad} \geq 0.05$ and $Q_2/Q_{2,rad} \geq 0.05$.

33. The apparatus of claim 31, wherein $Q_1/Q_{1,rad} \geq 0.5$ and $Q_2/Q_{2,rad} \geq 0.5$.

34. The apparatus of claim 31, wherein $D/\lambda_o$ is larger than 0.01 and the strong-interference factor V is larger than 0.05.

35. The apparatus of claim 31, wherein $D/\lambda_o$ is larger than 0.01 and the strong-interference factor V is larger than 0.5.

36. The apparatus of claim 31, further comprising the second resonator structure and a power load coupled to the second resonator structure with a coupling rate $\kappa_1$, wherein $U_1$ is defined as $\kappa_1/\Gamma_2$, and configured to receive from the second resonator structure a usable power.

37. The apparatus of claim 36, further comprising a power generator coupled to the first resonator structure with a coupling rate $\kappa_g$, wherein $U_g$ is defined as $\kappa_g/\Gamma_1$, and configured to drive the first resonator structure at a driving frequency f, corresponding to a driving angular frequency $\omega = 2\pi f$.

38. The apparatus of claim 37, wherein the driving frequency is different from the resonance frequencies of the first and second resonator structures and is closer to a frequency corresponding to an odd normal mode of the system of the two resonator structures, wherein the detuning of the first resonator from the driving frequency is defined as $D_1=(\omega-\omega_1)/\Gamma_1$ and the detuning of the second resonator structure from the driving frequency is defined as $D_2=(\omega-\omega_2)/\Gamma_2$.

39. The apparatus of claim 38, wherein $D_1$ is approximately equal to UV and $D_2$ is approximately equal to UV.

40. The apparatus of claim 37, wherein $U_g$ is chosen to maximize the efficiency of power transmission from the power generator to the power load.

41. The apparatus of claim 39, wherein $U_g$ is approximately equal to $\sqrt{(1+U^2)(1-V^2)}$.

42. The apparatus of claim 37, wherein f is at least larger than 100 kHz and smaller than 500 MHz.

43. The apparatus of claim 37, wherein f is at least larger than 1 MHz and smaller than 50 MHz.

44. The apparatus of claim 37, wherein $Q_1>100$ or $Q_2>100$.

45. The apparatus of claim 37, wherein $Q_1>100$ and $Q_2>100$.

46. The apparatus of claim 37, wherein at least one of $U_g$ and $U_1$ is chosen to maximize the efficiency of power transmission from the power generator to the power load.

47. The apparatus of claim 37,
wherein the detuning of the first resonator from the driving frequency is defined as $D_1=(\omega-\omega_1)/\Gamma_1$ and is approximately equal to UV, and the detuning of the second resonator structure from the driving frequency is defined as $D_2=(\omega-\omega_2)/\Gamma_2$ and is approximately equal to UV, and $U_g$ is approximately equal to $\sqrt{(1+U^2)(1-V^2)}$ and $U_1$ is approximately equal to $\sqrt{(1+U^2)(1-V^2)}$.

48. The apparatus of claim 31, wherein at least one of the first and second resonator structures comprises a capacitively loaded loop or coil of at least one of a conducting wire, a conducting Litz wire, and a conducting ribbon.

49. The apparatus of claim 48, where the characteristic size of said loop or coil is less than 30 cm and the width of said conducting wire or Litz wire or ribbon is less than 2 cm.

50. The apparatus of claim 48, where the characteristic size of said loop or coil is less than 1 m and the width of said conducting wire or Litz wire or ribbon is less than 2 cm.

51. The apparatus of claim 31, further comprising a feedback mechanism for maintaining the resonant frequency of one or more of the resonant objects.

52. The apparatus of claim 51, wherein the feedback mechanism comprises an oscillator with a fixed driving frequency and is configured to adjust the resonant frequency of the one or more resonant objects to be detuned by a fixed amount with respect to the fixed frequency.

53. The apparatus of claim 51, where the feedback mechanism is configured to monitor an efficiency of the energy transfer, and adjust the resonant frequency of the one or more resonant objects to maximize the efficiency.

54. The apparatus of claim 31, wherein the resonance angular frequencies for the resonator structures are selected to optimize the efficiency of power transmission from the power generator to the power load by accounting for both the strong-coupling factor U and the strong-interference interference factor V.

55. A method for wireless energy transfer, the method comprising:

providing a first resonator structure configured for energy transfer with a second resonator structure over a distance D, wherein the energy transfer is mediated by evanescent-tail coupling of a resonant field of the first resonator structure and a resonant field of the second resonator structure, with a coupling factor k, wherein said resonant field of the first resonator structure has a resonance angular frequency $\omega_1$, a resonance frequency-width $\Gamma_1$, and a resonance quality factor $Q_1=\omega_1/2\Gamma_1$, and is radiative in the far field, with an associated radiation quality factor $Q_{1,rad} \geq Q_1$, and said resonant field of the second resonator structure has a resonance angular frequency $\omega_2$, a resonance frequency-width $\Gamma_2$, and a resonance quality factor $Q_2=\omega_2/2\Gamma_2$, and is radiative in the far field, with an associated radiation quality factor $Q_{2,rad} \geq Q_2$, wherein an absolute value of a difference of said angular frequencies $\omega_1$ and $\omega_2$ is smaller than broader of said resonant widths $\Gamma_1$ and $\Gamma_2$, and the strong-coupling factor is defined as $U = k\sqrt{Q_1 Q_2}$, and employing interference between said radiative far fields of the resonant fields of the first and second resonator, with an interference factor $V_{rad}$, to reduce a total amount of radiation from the first and second resonator compared to an amount of radiation from the first and second resonator in the absence of interference, a strong-interference factor being defined as $V=V_{rad}\sqrt{(Q_1/Q_{1,rad})(Q_2/Q_{2,rad})}$.

56. The method of claim 55, wherein $Q_1/Q_{1,rad} \geq 0.01$ and $Q_2/Q_{2,rad} \geq 0.01$.

57. The method of claim 55, wherein, during operation, a power generator is coupled to one of the first and second resonant structure and is configured to drive the resonator structure, to which it is coupled, at a driving frequency f, corresponding to a driving angular frequency $\omega=2\pi f$, wherein the driving frequency is different from the resonance frequencies of the first and second resonator structures and is closer to a frequency corresponding to an odd normal mode of the system of the two resonator structures.

58. The method of claim 57, wherein, during operation, a power load is coupled to the resonant structure to which the power generator is not coupled and is configured to receive from the resonator structure, to which it is coupled, a usable power.

59. A method for wireless energy transfer, the method comprising:

providing a first resonator structure configured for energy transfer with a second resonator structure over a distance D, wherein the energy transfer is mediated by evanescent-tail coupling of a resonant field of the first resonator structure and a resonant field of the second resonator structure, with a coupling factor k, wherein said resonant field of the first resonator structure has a resonance angular frequency $\omega_1$, a resonance frequency-width $\Gamma_1$, and a resonance quality factor $Q_1=\omega_1/2\Gamma_1$, and is radiative in the far field, with an associated radiation quality factor $Q_{1,rad} \geq Q_1$, and said resonant field of the second resonator structure has a resonance angular frequency $\omega_2$, a resonance frequency-width $\Gamma_2$, and a resonance quality factor $Q_2=\omega_2/2\Gamma_2$, and is radiative in the far field, with an associated radiation quality factor $Q_{2,rad} \geq Q_2$, wherein an absolute value of the difference of said angular frequencies $\omega_1$ and $\omega_2$ is smaller than the broader of said resonant widths $\Gamma_1$ and $\Gamma_2$, and an average resonant angular frequency is defined as $\omega_o=\sqrt{\omega_1\omega_2}$, corresponding to an average resonant wavelength $\lambda_o=2\pi c/\omega_o$, where c is the speed of light in free space, and the strong-coupling factor is defined as $U=k\sqrt{Q_1 Q_2}$, and employing interference between said radiative far fields of the resonant fields of the first and second resonator, with an interference factor $V_{rad}$, to increase efficiency of energy transfer between the first and second resonator compared to efficiency of energy transfer between the first and second resonator in the absence of interference, a strong-interference factor being defined as $V=V_{rad}\sqrt{(Q_1/Q_{1,rad})(Q_2/Q_{2,rad})}$.

60. The method of claim 59, wherein $Q_1/Q_{1,rad} \geq 0.05$ and $Q_2/Q_{2,rad} \geq 0.05$.

61. The method of claim 59, wherein, during operation, a power generator is coupled to one of the first and second resonant structure and is configured to drive the resonator structure, to which it is coupled, at a driving frequency f, corresponding to a driving angular frequency $\omega=2\pi f$, wherein the driving frequency is different from the resonance frequencies of the first and second resonator structures and is closer to a frequency corresponding to an odd normal mode of the system of the two resonator structures.

62. The method of claim 61, wherein, during operation, a power load is coupled to the resonant structure to which the power generator is not coupled and is configured to receive from the resonator structure, to which it is coupled, a usable power.

63. The method of claim 59, wherein the resonance angular frequencies for the resonator structures are selected to optimize the efficiency of power transmission from the power generator to the power load by accounting for both the strong-coupling factor U and the strong-interference interference factor V.

64. The apparatus of claim 14, wherein the power load is a battery or energy storage unit.

65. The apparatus of claim 14, wherein the power load is a component of an electric vehicle.

66. The method of claim 62, wherein the power load is a battery or energy storage unit.

67. The method of claim 62, wherein the power load is a component of an electric vehicle.

* * * * *

UNITED STATES PATENT AND TRADEMARK OFFICE
CERTIFICATE OF CORRECTION

PATENT NO. : 8,076,801 B2
APPLICATION NO. : 12/466065
DATED : December 13, 2011
INVENTOR(S) : Aristeidis Karalis et al.

It is certified that error appears in the above-identified patent and that said Letters Patent is hereby corrected as shown below:

Column 53
Line 64, delete "resonater" and insert --resonator--

Column 54
Line 28, delete "or" and insert --and--

Column 58
Line 2, delete " $\omega_o = \sqrt{\omega_{1\omega 2}}$ ," and insert -- $\omega_o = \sqrt{\omega_1 \omega_2}$ --

Signed and Sealed this
Tenth Day of July, 2012

David J. Kappos
*Director of the United States Patent and Trademark Office*